United States Patent
Rahman et al.

(10) Patent No.: US 11,381,295 B2
(45) Date of Patent: Jul. 5, 2022

(54) METHOD AND APPARATUS TO ENABLE CSI REPORTING IN WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/304,360

(22) Filed: Jun. 18, 2021

(65) Prior Publication Data

US 2022/0069880 A1 Mar. 3, 2022

Related U.S. Application Data

(63) Continuation of application No. 16/683,070, filed on Nov. 13, 2019, now abandoned.

(Continued)

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0417* (2013.01); *H04B 7/0469* (2013.01);
(Continued)

(58) Field of Classification Search
CPC .. H04B 7/0626; H04B 7/0486; H04B 7/0639; H04L 5/0051
See application file for complete search history.

(56) References Cited

U.S. PATENT DOCUMENTS

2016/0359538 A1* 12/2016 Onggosanusi ....... H04B 7/0478
2017/0288751 A1* 10/2017 Faxér .................. H04B 7/0456
(Continued)

OTHER PUBLICATIONS

Supplementary European Search Report dated Nov. 5, 2021, in connection with European Application No. 19884443.3, 16 pages.

(Continued)

*Primary Examiner* — Jaison Joseph

(57) ABSTRACT

A user equipment (UE) in a wireless communication system receives, from a base station (BS), CSI feedback configuration information; and deriving, based on the CSI feedback configuration information, the CSI feedback including a precoding matrix indicator (PMI), transmitting, to the BS via an uplink channel, the CSI feedback including the PMI, wherein, for each layer $l=1, 2, \ldots, v$, the PMI indicates $K_{NZ,l}$ non-zero (NZ) coefficients out of a total of $2LM_v$ coefficients, each of which is represented as $c_{l,i,m} = p_{l,i,m}^{(1)} p_{l,i,m}^{(2)} \phi_{l,i,m}$, the $K_{NZ,l}$ NZ coefficients are partitioned into two groups ($G_0$ and $G_1$), and for each group $G_r$, $r \in \{0,1\}$, one $p_{l,i,m}^{(1)}$ value is indicated, where v is a rank value, $p_{l,i,m}^{(1)}$ is a first amplitude coefficient, $p_{l,i,m}^{(2)}$ is a second amplitude coefficient, and $\phi_{l,i,m}$ is a phase coefficient.

15 Claims, 15 Drawing Sheets

Related U.S. Application Data

(60) Provisional application No. 62/928,574, filed on Oct. 31, 2019, provisional application No. 62/928,321, filed on Oct. 30, 2019, provisional application No. 62/823,145, filed on Mar. 25, 2019, provisional application No. 62/809,110, filed on Feb. 22, 2019, provisional application No. 62/807,512, filed on Feb. 19, 2019, provisional application No. 62/807,484, filed on Feb. 19, 2019, provisional application No. 62/806,441, filed on Feb. 15, 2019, provisional application No. 62/802,513, filed on Feb. 7, 2019, provisional application No. 62/796,121, filed on Jan. 24, 2019, provisional application No. 62/795,475, filed on Jan. 22, 2019, provisional application No. 62/778,712, filed on Dec. 12, 2018, provisional application No. 62/767,810, filed on Nov. 15, 2018.

(51) Int. Cl.
*H04B 7/0417* (2017.01)
*H04L 5/00* (2006.01)

(52) U.S. Cl.
CPC ......... *H04B 7/0486* (2013.01); *H04B 7/0639* (2013.01); *H04L 5/0051* (2013.01)

(56) References Cited

U.S. PATENT DOCUMENTS

| | | | |
|---|---|---|---|
| 2017/0302353 A1* | 10/2017 | Rahman | H04B 7/0469 |
| 2018/0309490 A1 | 10/2018 | Rahman et al. | |
| 2022/0045729 A1* | 2/2022 | Li | H04W 72/1263 |

OTHER PUBLICATIONS

CATT, "Discussions on Type II CSE enhancement," R1-1900338, 3GPP TSG RAN WG1 Ad-Hoc Meeting 1901, Taipei, Taiwan, Jan. 21-25, 2019, 16 pages.

Fraunhofer Iis, et al., "Enhancements on Type-II CSE reporting," R1-1900360, 3GPP TSG-RAN WG1 AH-1901, Taipei, Taiwan, Jan. 21-25, 2019, 17 pages.

Huawei, et al., "Enhancement on CSI reporting and codebook design," R1-1808949, 3GPP TSG RAN WG1 Meeting #94, Gothenburg, Sweden, Aug. 20-24, 2018, 7 pages.

Qualcomm Incorporated, "CSI Enhancement for MU-MIMO Support," R1-1900904, 3GPP TSG RAN WG1 Meeting #NRAH1901, Taipei, Taiwan, Jan. 21-25, 2019, 15 pages.

* cited by examiner

US 11,381,295 B2

METHOD AND APPARATUS TO ENABLE CSI REPORTING IN WIRELESS COMMUNICATION SYSTEMS

CROSS-REFERENCE TO RELATED APPLICATIONS AND CLAIM OF PRIORITY

This application is a continuation of U.S. Non-Provisional patent application Ser. No. 16/683,070 filed on Nov. 13, 2019, and claims priority to: U.S. Provisional Patent Application No. 62/767,810 filed on Nov. 15, 2018; U.S. Provisional Patent Application No. 62/778,712 filed on Dec. 12, 2018; U.S. Provisional Patent Application No. 62/795,475 filed on Jan. 22, 2019; U.S. Provisional Patent Application No. 62/796,121 filed on Jan. 24, 2019; U.S. Provisional Patent Application No. 62/802,513 filed on Feb. 7, 2019; U.S. Provisional Patent Application No. 62/806,441 filed on Feb. 15, 2019; U.S. Provisional Patent Application No. 62/807,484 filed on Feb. 19, 2019; U.S. Provisional Patent Application No. 62/807,512 filed on Feb. 19, 2019; U.S. Provisional Patent Application No. 62/809,110 filed on Feb. 22, 2019; U.S. Provisional Patent Application No. 62/823,145 filed on Mar. 25, 2019; U.S. Provisional Patent Application No. 62/928,321 filed on Oct. 30, 2019; and U.S. Provisional Patent Application No. 62/928,574 filed on Oct. 31, 2019. The content of the above-identified patent documents is incorporated herein by reference.

TECHNICAL FIELD

The present disclosure relates generally to CSI reporting in wireless communication systems.

BACKGROUND

Understanding and correctly estimating the channel in an advance wireless communication system between a user equipment (UE) and an gNode B (gNB) is important for efficient and effective wireless communication. In order to correctly estimate the channel conditions, the UE may report (e.g., feedback) information about channel measurement, e.g., CSI, to the gNB. With this information about the channel, the gNB is able to select appropriate communication parameters to efficiently and effectively perform wireless data communication with the UE.

SUMMARY

Embodiments of the present disclosure provide methods and apparatuses to enable CSI reporting in wireless communication systems.

In one embodiment, a user equipment (UE) for a channel state information (CSI) feedback in a wireless communication system is provided. The UE comprises a transceiver configured to receive, from a base station (BS), CSI feedback configuration information. The UE further comprises a processor operably connected to the transceiver, the processor configured to derive, based on the CSI feedback configuration information, the CSI feedback including a precoding matrix indicator (PMI). The UE comprises the transceiver that is further configured to transmit, to the BS via an uplink channel, the CSI feedback including the PMI, wherein, for each layer $l=1, 2, \ldots, v$, the PMI indicates $K_{NZ,l}$ non-zero (NZ) coefficients out of a total of $2LM_v$ coefficients, each of which is represented as $c_{l,i,m} = p_{l,i,m}^{(1)} p_{l,i,m}^{(2)} \phi_{l,i,m}$, the $K_{NZ,l}$ NZ coefficients are partitioned into two groups ($G_0$ and $G_1$), and for each group $G_r$, $r \in \{0,1\}$, one $p_{l,i,m}^{(1)}$ value is indicated, where v is a rank value, $p_{l,i,m}^{(1)}$ is a first amplitude coefficient, $p_{l,i,m}^{(2)}$ is a second amplitude coefficient, and $\phi_{l,i,m}$ is a phase coefficient.

In another embodiment, a base station (BS) in a wireless communication system is provided. The BS comprises a transceiver configured to transmit, to a user equipment (UE), CSI feedback configuration information and receive, from the UE via an uplink channel, a CSI feedback including a precoding matrix indicator (PMI), wherein, for each layer $l=1, 2, \ldots, v$, the PMI indicates $K_{NZ,l}$ non-zero (NZ) coefficients out of a total of $2LM_v$ coefficients, each of which is represented as the $c_{l,i,m} = p_{l,i,m}^{(1)} p_{l,i,m}^{(2)} \phi_{l,i,m}$, $K_{NZ,l}$ NZ coefficients are partitioned into two groups ($G_0$ and $G_1$), and for each group $G_r$, $r \in \{0,1\}$, one $p_{l,i,m}^{(1)}$ value is indicated, where v is a rank value, $p_{l,i,m}^{(1)}$ a first amplitude coefficient, $p_{l,i,m}^{(2)}$ is a second amplitude coefficient, and $\phi_{l,i,m}$ is a phase coefficient, and wherein the CSI feedback including the PMI is based on the CSI feedback configuration information.

In yet another embodiment, a method of a user equipment (UE) in a wireless communication system is provided. The method comprises receiving, from a base station (BS), CSI feedback configuration information, deriving, based on the CSI feedback configuration information, the CSI feedback including a precoding matrix indicator (PMI), and transmitting, to the BS via an uplink channel, the CSI feedback including the PMI, wherein, for each layer $l=1, 2, \ldots, v$, the PMI indicates $K_{NZ,l}$ non-zero (NZ) coefficients out of a total of $2LM_v$ coefficients, each of which is represented as $c_{l,i,m} = p_{l,i,m}^{(1)} p_{l,i,m}^{(2)} \phi_{l,i,m}$, the $K_{NZ,l}$ NZ coefficients are partitioned into two groups ($G_0$ and $G_1$), and for each group $G_r$, $r \in \{0,1\}$, one $p_{l,i,m}^{(1)}$ value is indicated, where v is a rank value, $p_{l,i,m}^{(1)}$ is a first amplitude coefficient, $p_{l,i,m}^{(2)}$ is a second amplitude coefficient, and $\phi_{l,i,m}$ is a phase coefficient.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
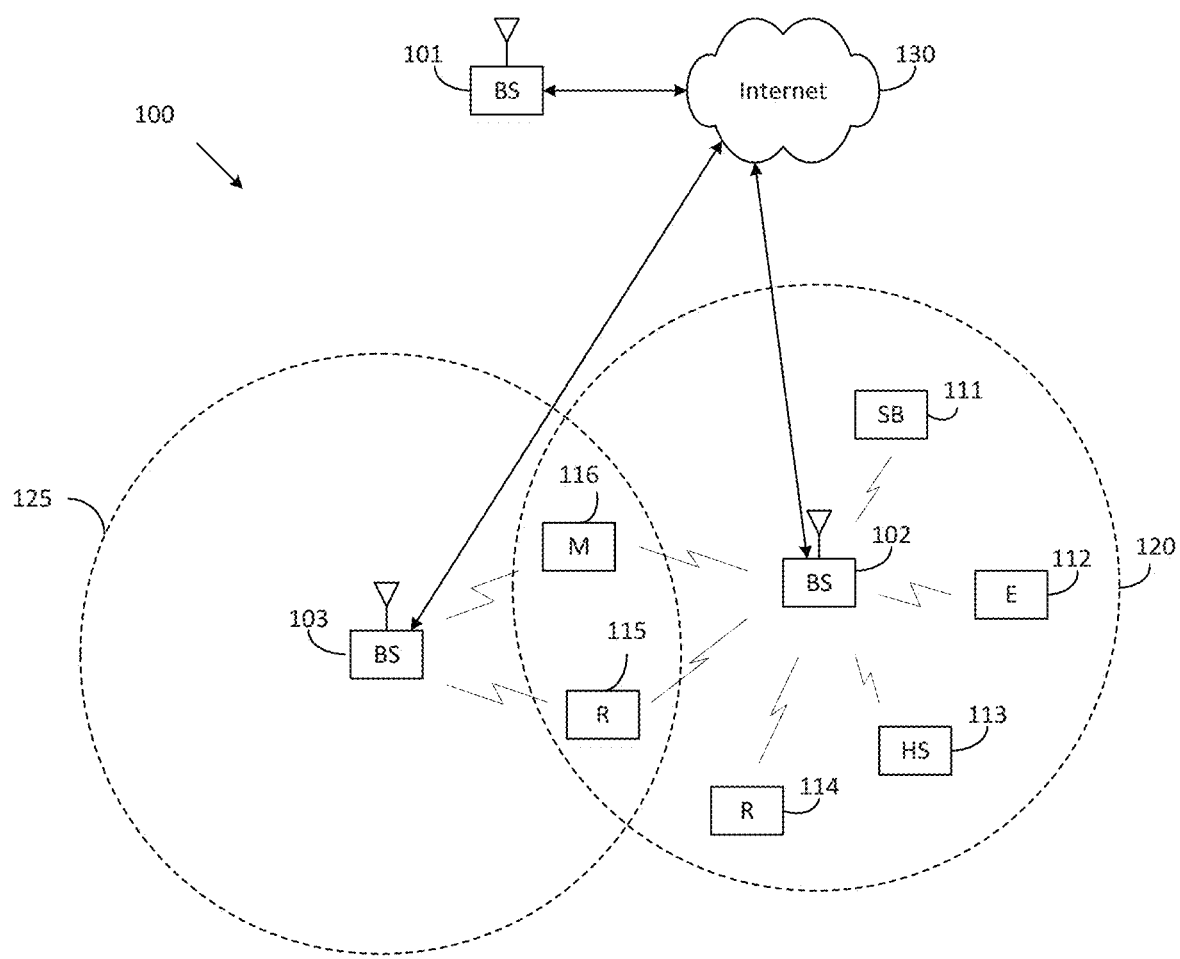
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.7.0, "E-UTRA, Physical channels and modulation;" 3GPP TS 36.212 v15.7.0, "E-UTRA, Multiplexing and Channel coding;" 3GPP TS 36.213 v15.7.0, "E-UTRA, Physical Layer Procedures;" 3GPP TS 36.321 v15.7.0, "E-UTRA, Medium Access Control (MAC) protocol specification;" 3GPP TS 36.331 v15.7.0, "E-UTRA, Radio Resource Control (RRC) Protocol Specification;" 3GPP TR 22.891 v14.2.0, "Study on New Services and Markets Technology Enablers;" 3GPP TS 38.212 v15.7.0, "E-UTRA, NR, Multiplexing and Channel coding;" and 3GPP TS 38.214 v15.7.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
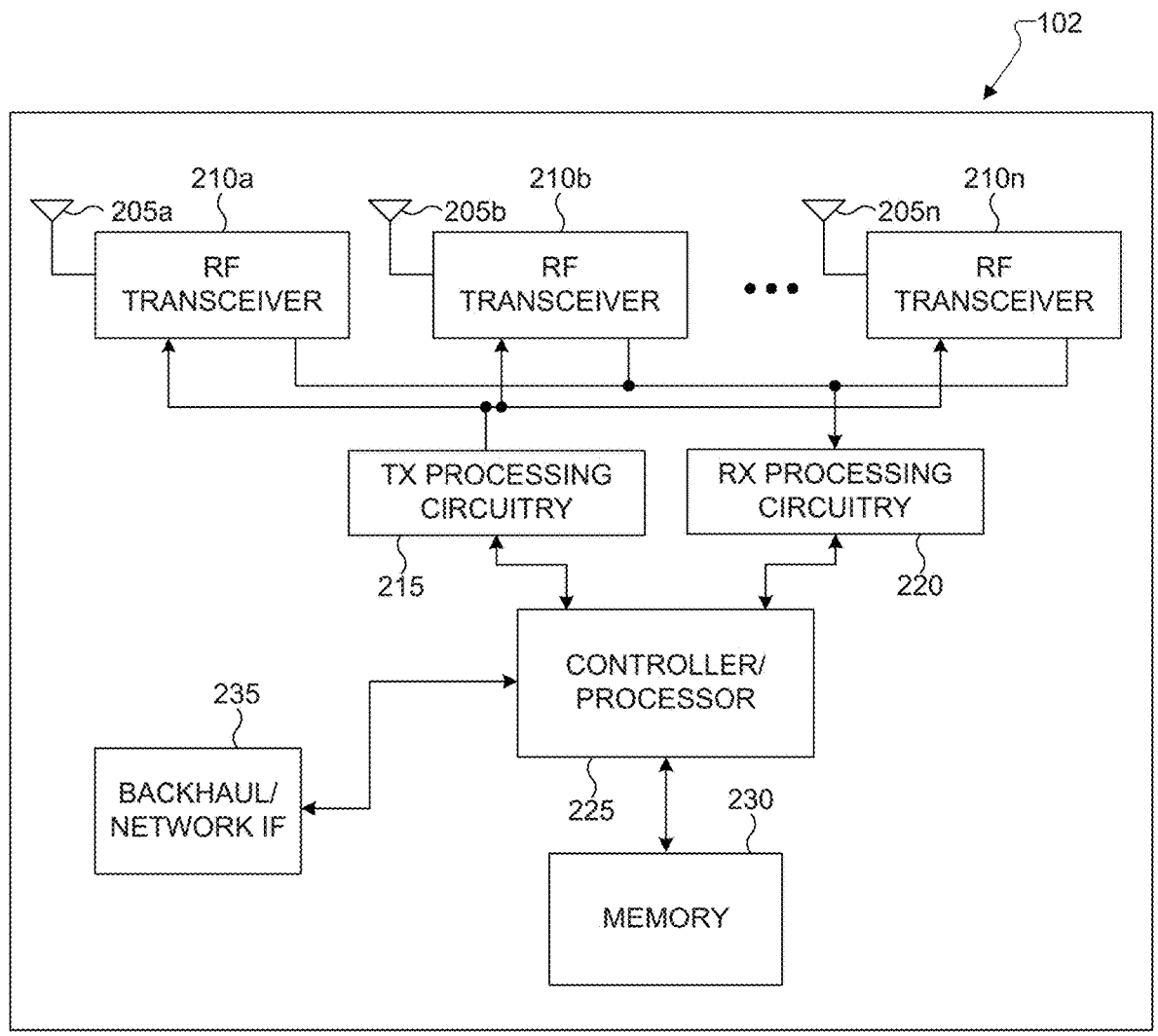
FIG. 2 illustrates an example gNB according to embodiments of the present disclosure.
Figure 3:
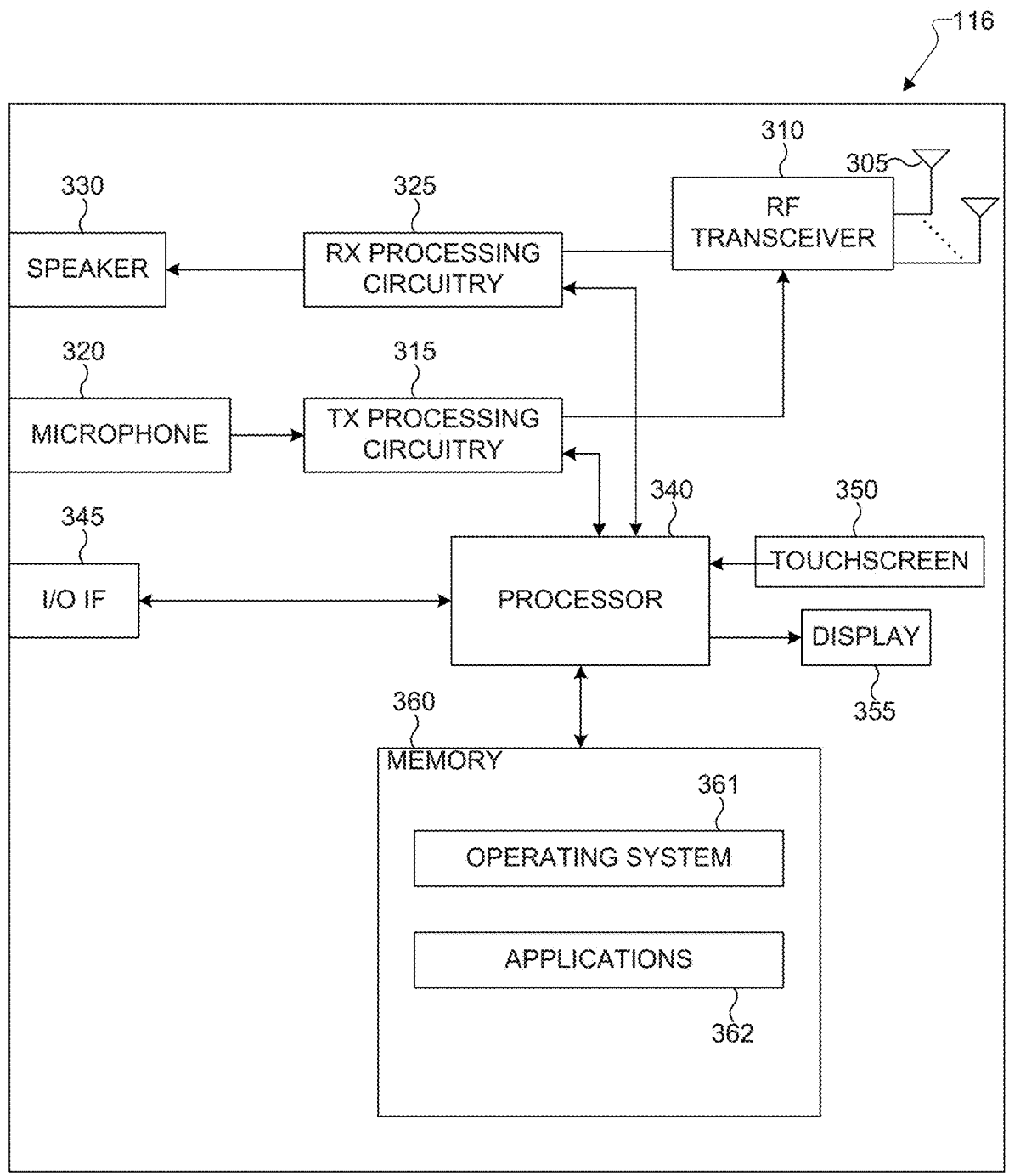
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "B S" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programming, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
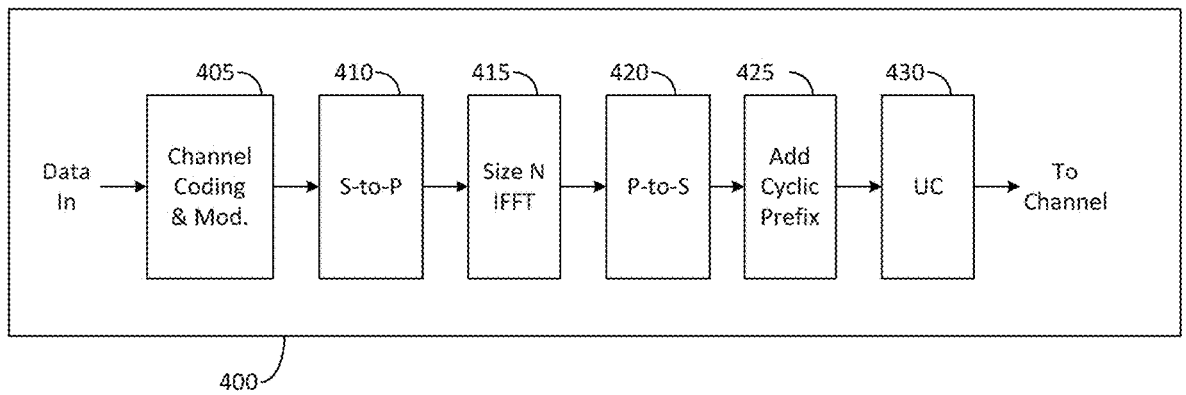
FIG. 4A illustrates a high-level diagram of an orthogonal frequency division multiple access transmit path according to embodiments of the present disclosure.
Figure 4B:
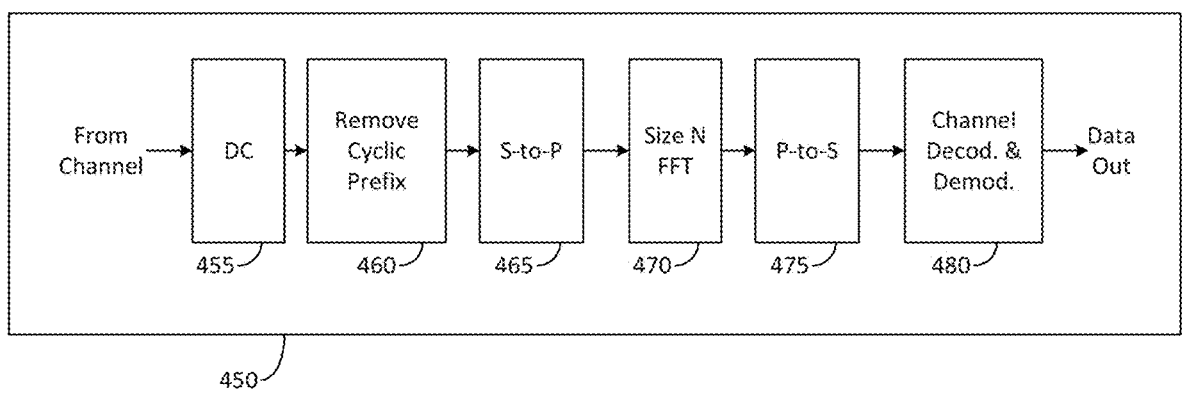
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$, sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH}\cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
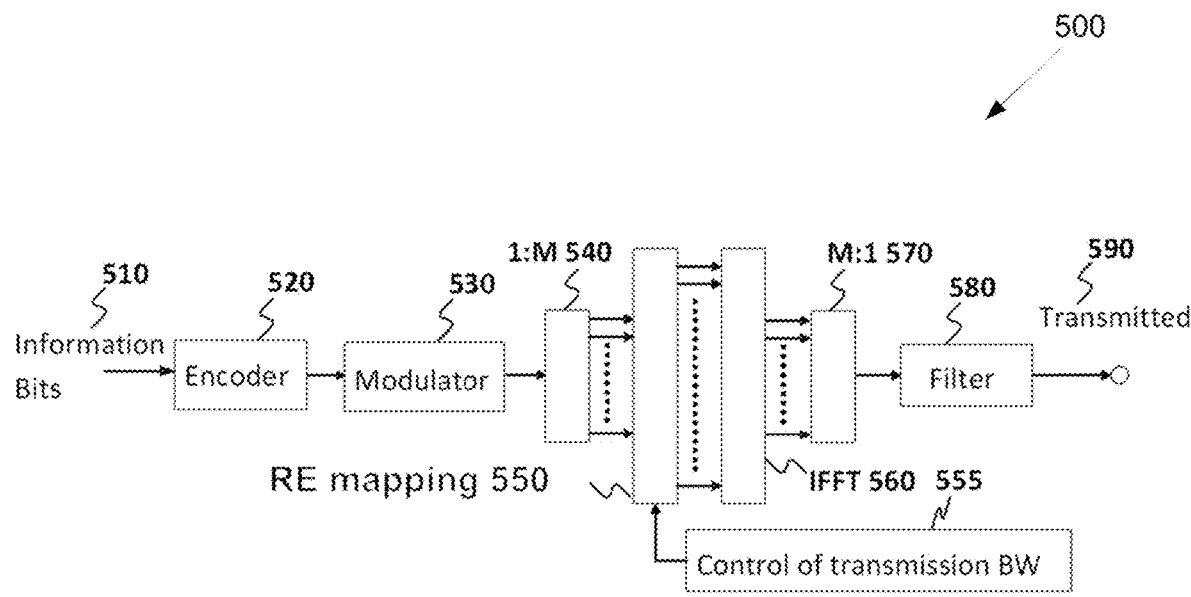
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
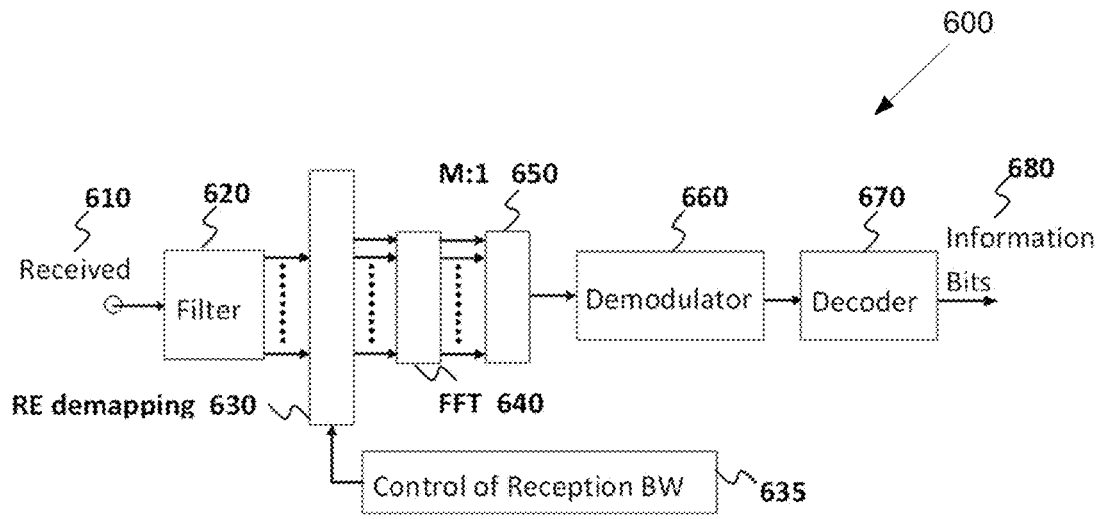
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
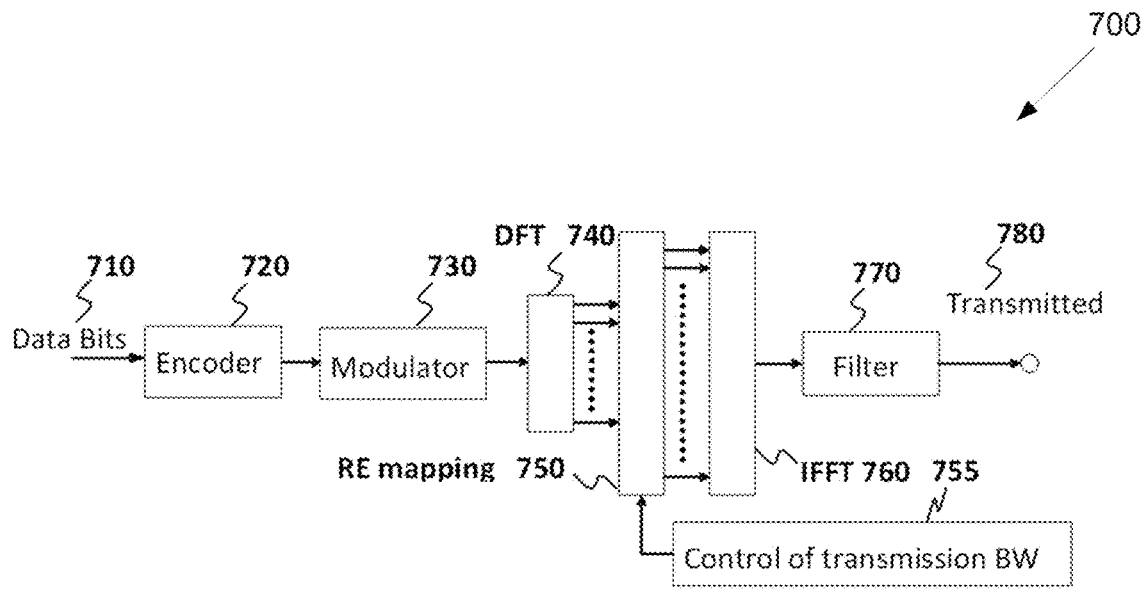
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
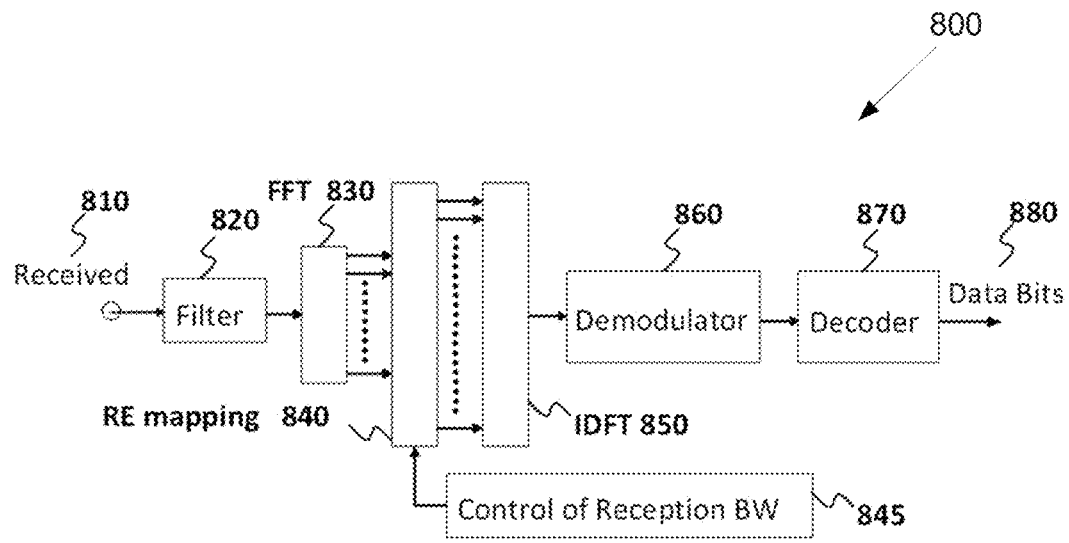
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 745G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
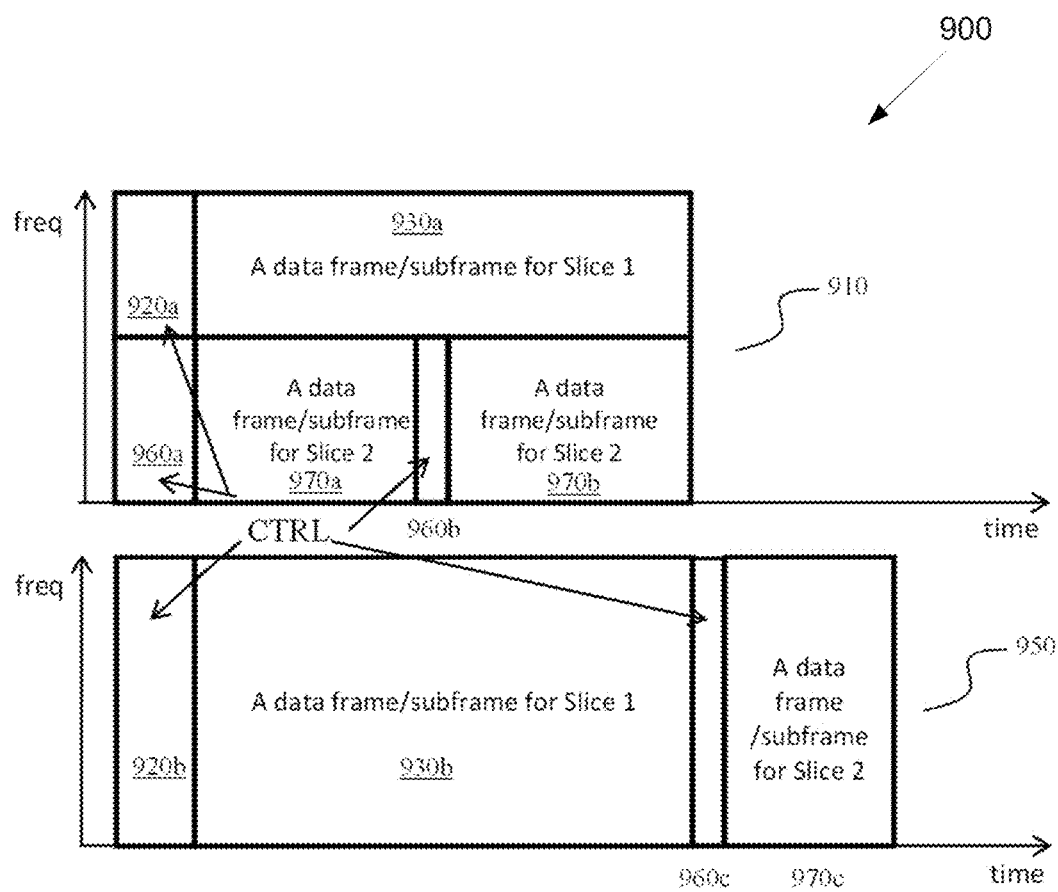
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of the present disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
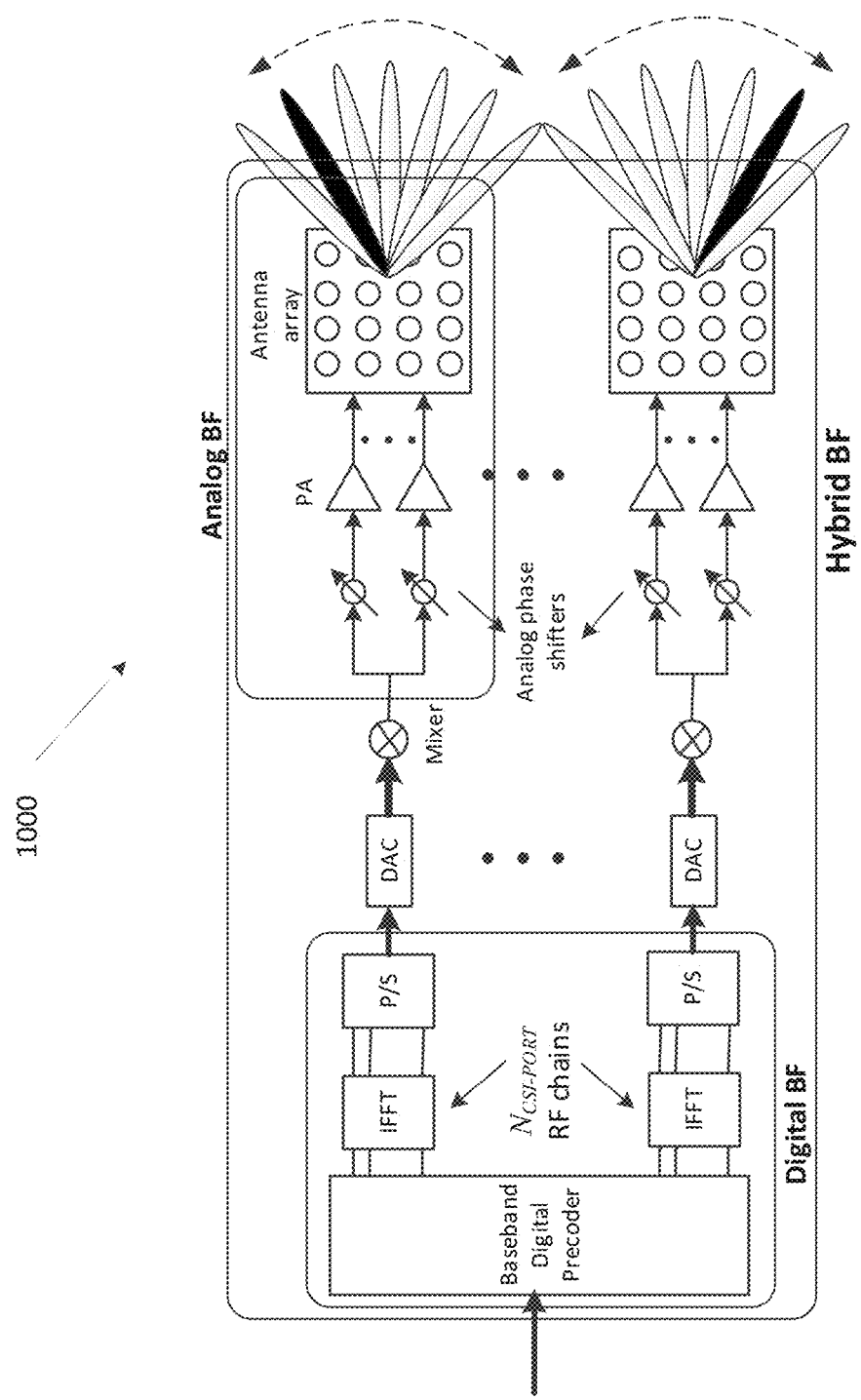
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of the present disclosure to any particular implementation of the antenna blocks 1000.

For mmWave bands, although the number of antenna elements can be larger for a given form factor, the number of CSI-RS ports which can correspond to the number of digitally precoded ports tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or sub-frames. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported in LTE: (1) "CLASS A" CSI reporting which corresponds to non-precoded CSI-RS, (2) "CLASS B" reporting with K=1 CSI-RS resource which corresponds to UE-specific beamformed CSI-RS, and (3) "CLASS B" reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

From LTE Rel. 8 to Rel. 14 eFD-MIMO, MIMO has been identified as an essential feature in order to achieve high system throughput requirements and it may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In legacy (up to LTE Rel. 13) FDD systems, the CSI feedback framework is 'implicit' in the form of CQI/PMI/RI (and CRI in Rel. 13) derived from a codebook assuming SU transmission from eNB.

For 5G or NR systems (Rel. 15), [REFI, REFS], the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. In general, the Type I or Type II CSI reported using a PMI codebook, where the PMI has two components, the first PMI i1 and the second PMI i2. If the subband CSI reporting is configured, then the UE reports a single wideband first PMI i1 which indicates a group of beams/pre-coders, and one second PMI i2 for each subband which indicates a precoder belonging to the group of precoders indicated by the reported first PMI i1. The subband CSI reporting is generally configured for use cases such as MU-MIMO transmission since the precoding is known to be frequency-selective (i.e., varies from one subband to another subband). The system performance depends on the PMI codebook. For example, the PMI codebook for Type I CSI reporting performs worse than that for Type II CSI reporting, but the performance is proportional to the size of the PMI codebook which determines the CSI reporting payload (number of feedback bits). In fact, the Type I CSI reporting payload is much smaller than the Type II CSI reporting payload. So, the system performance gain is directly proportional to the PMI codebook and hence to the CSI reporting payload.

Figure 11:
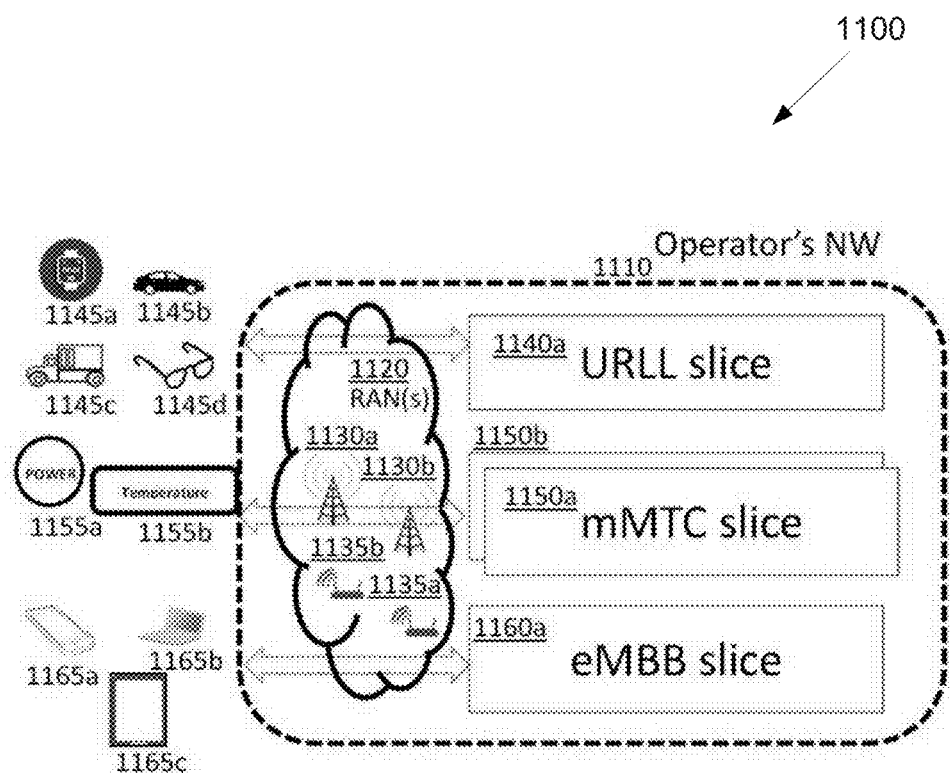
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of the present disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

Throughout the present disclosure, a CSI-RS resource refers to a non-zero power (NZP) CSI-RS resource, unless stated otherwise.

Figure 12:
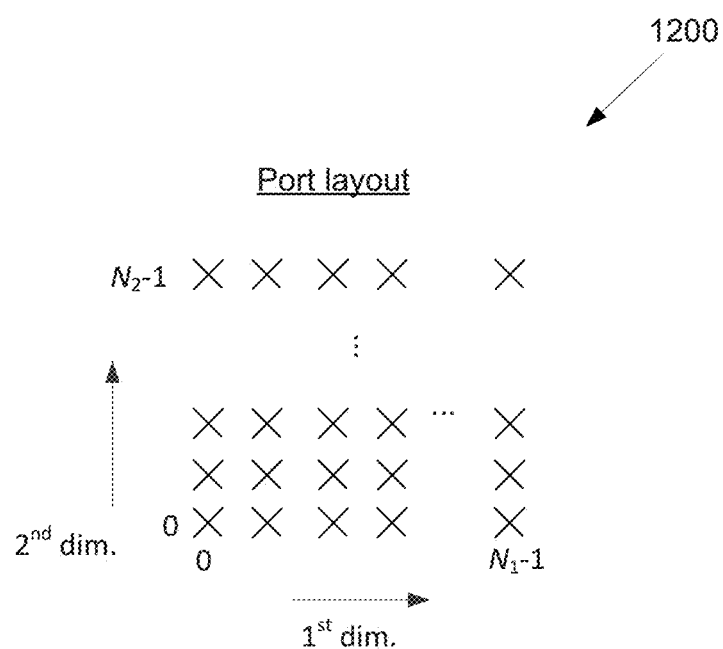
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of the present disclosure to any particular implementation.

In the following, it may be assumed that $N_1$ and $N_2$ are the number of antenna ports with the same polarization in the first and second dimensions, respectively. For 2D antenna port layouts, it may have $N_1>1$, $N_2>1$, and for 1D antenna port layouts $N_1>1$ and $N_2=1$. So, for a dual-polarized antenna port layout, the total number of antenna ports is $2N_1N_2$. An illustration is shown in FIG. 12.

Figure 13:
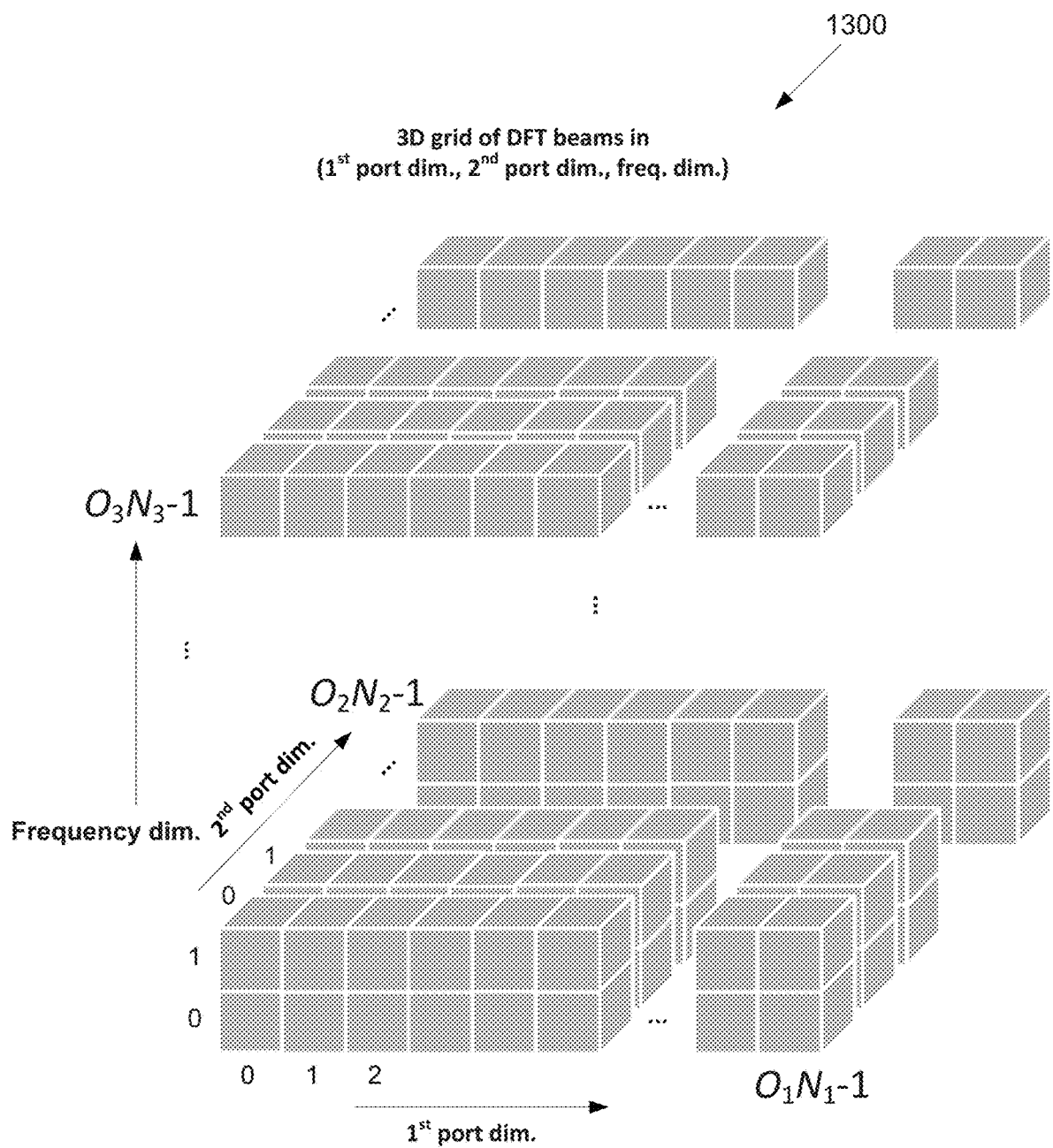
FIG. 13 illustrates an example 3D grid of DFT beams according to embodiments of the present disclosure.

FIG. 13 illustrates an example 3D grid of DFT beams 1300 according to embodiments of the present disclosure. The embodiment of the 3D grid of DFT beams 1300 illustrated in FIG. 13 is for illustration only. FIG. 13 does not limit the scope of the present disclosure to any particular implementation.

In one embodiment, a UE is configured with high-resolution (e.g., Type II) CSI reporting in which the linear combination based Type II CSI reporting framework is extended to include frequency dimension in addition to the 1st and 2nd antenna port dimensions. An illustration of the 3D grid of the oversampled DFT beams (1st port dim., 2nd port dim., freq. dim.) is shown in FIG. 13 in which: 1st dimension is associated with the 1st port dimension; 2nd dimension is associated with the 2nd port dimension; and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to "TypeII-Compression" or "Type III" for an enhanced Type II CSI reporting in which the pre-coders for all SBs and for a given layer i=1, . . . , v, where v is the associated RI value, is given by either:

$$W^l = AC_l B^H = \\ [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \\ [b_0 b_1 \ldots b_{M-1}]^H = \\ \sum_{m=0}^{M-1} \sum_{i=0}^{L-1} c_{l,i,m}(a_i b_m^H) = \sum_{i=0}^{L-1} \sum_{m=0}^{M-1} c_{l,i,m}(a_i b_m^H)$$

Equation 1 or

-continued $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix}$$ Equation 2

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\begin{bmatrix} \sum_{m=0}^{M-1} \sum_{i=0}^{L-1} c_{l,i,m}(a_i b_m^H) \\ \sum_{m=0}^{M-1} \sum_{i=0}^{L-1} c_{l,i+L,m}(a_i b_m^H) \end{bmatrix}$$

where $N_1$ is a number of antenna ports in a first antenna port dimension, $N_2$ is a number of antenna ports in a second antenna port dimension, $N_3$ is a number of SBs or frequency domain (FD) units/components for PMI reporting (that comprise the CSI reporting band), $a_i$ is a $2N_1N_2 \times 1$ (Eq. 1) or $N_1N_2 \times 1$ (Eq. 2) column vector, $b_k$ is a $N_3 \times 1$ column vector, and $c_{l,i,k}$ is a complex coefficient.

In one example, when the UE reports a subset $K\lceil \beta 2LM\rceil < 2LM$ coefficients (where K or is either fixed, configured by the gNB or reported by the UE), then the coefficient in precoder equations Equation 1 or Equation 2 is replaced with $v_{l,i,k} \times c_{l,i,m}$, where $v_{l,i,m} = 1$ if the coefficient $c_{l,i,m}$ is reported by the UE according to some embodiments of the present disclosure. $v_{l,i,m} = 0$ otherwise (i.e., $c_{l,i,m}$ is not reported by the UE).

The indication whether $v_{l,i,m} = 1$ or 0 is according to some embodiments of the present disclosure. In one example, the reporting of K coefficients is via a bitmap of length 2LM.

In one example, the precoder equations Equation 1 or Equation 2 are respectively generalized to:

$$W^l = \sum_{i=0}^{L-1} \sum_{m=0}^{M_i-1} c_{l,i,m}(a_i b_{i,m}^H)$$ Equation 3 and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}$$ Equation 4 where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($\upsilon = R$), the pre-coding matrix is given by $$W^{(R)} = \frac{1}{\sqrt{R}} [W^1 \ W^2 \ldots W^R].$$

Equation 2 is assumed in the rest of the present disclosure. The embodiments of the present disclosure, however, are general and are also application to Equation 1, Equation 3, and Equation 4.

Here $L \leq 2N_1N_2$ and $K \leq N_3$. If $L = 2N_1N_2$, then A is an identity matrix, and hence not reported. Likewise, if $K = N_3$, then B is an identity matrix, and hence not reported. Assuming $L < 2N_1N_2$, in an example, to report columns of A, the oversampled DFT codebook is used. For instance, $a_i = v_{l,m}$, where the quantity $v_{l,m}$ is given by:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

Similarly, assuming $K < N_3$, in an example, to report columns of B, the oversampled DFT codebook is used. For instance, $b_k = w_k$, where the quantity $w_k$ is given by:

$$w_k = \begin{bmatrix} 1 & e^{j\frac{2\pi k}{O_3 N_3}} & \cdots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by:

$$[W_f]_{nm} = \begin{cases} \frac{1}{\sqrt{K}}, & n = 0 \\ \sqrt{\frac{2}{K}} \cos \frac{\pi(2m+1)n}{2K}, & n = 1, \ldots, K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The present disclosure is applicable to any other basis vectors to construct/report A and B.

Also, in an alternative, for reciprocity-based Type II CSI reporting, a UE is configured with higher layer parameter CodebookType set to "TypeII-PortSelection-Compression" or "TypeIII-PortSelection" for an enhanced Type II CSI reporting with port selection in which the pre-coders for all SBs and for a given layer $l = 1, \ldots, \upsilon$, where $\upsilon$ is the associated RI value, is given by $W^l = AC_l B^H$, where $N_1$, $N_2$, $N_3$, and $c_{l,i,m}$ are defined as above except that the matrix A comprises port selection vectors.

For instance, the L antenna ports per polarization or column vectors of A are selected by the index $q_l$, where $$q_1 \in \left\{ 0, 1, \ldots, \left\lceil \frac{P_{CSI-RS}}{2d} \right\rceil - 1 \right\}$$

(this requires $$\left\lceil \log_2 \left\lceil \frac{P_{CSI-RS}}{2d} \right\rceil \right\rceil$$

bits), and the value of d is configured with the higher layer parameter PortSelectionSamplingSize, where $d \in \{1,2,3,4\}$ and $$d \leq \min\left(\frac{P_{CSI-RS}}{2}, L\right).$$

To report columns of A, the port selection vectors are used. For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as given by:

$$W = AC_l B^H = W_1 \tilde{W}_2 W_f^H \qquad \text{Equation 5.}$$

In such equation, $A = W_1$ corresponds to the Rel. 15 $W_1$ in Type II CSI codebook, and $B = W_f$. The $C = \tilde{W}_2$ matrix includes the required linear combination coefficients (e.g. amplitude and phase or real or imaginary). The present disclosure provides a few example embodiments about quantization and reporting of linear combination coefficients $c_{l,i,m}$ composing the $\tilde{W}_2$ matrix.

In the rest of the present disclosure, several quantization schemes are provided for the coefficients ($c_{l,i,m}$) in $\tilde{W}_2$ that are reported by the UE. The coefficients that are not reported by the UE are assumed to be zero.

In one embodiment of scheme 1, each reported coefficient ($c_{l,i,m} = p_{l,i,m} \phi_{l,i,m}$) in $\tilde{W}_2$ is quantized as amplitude coefficient ($p_{l,i,m}$) and phase coefficient ($\phi_{l,i,m}$) according to the at least one of the following alternatives (Alt).

In one example of Alt 1A, the amplitude coefficient is reported using a A-bit amplitude codebook, and the phase coefficient is reported using P-bit phase codebook. In one example, A=3 and the amplitude codebook corresponds to the 3-bit amplitude codebook for WB amplitude reporting as shown in TABLE 1. In an example, for phase coefficient reporting, the value of $N_{PSK}$ (alphabet size), where $P = \log_2 N_{PSK}$ or $\lceil \log_2 N_{PSK} \rceil$ is configured with the higher layer parameter PhaseAlphabetSize, where $N_{PSK} \in \{4,8\}$ and the phase coefficient (corresponding to coefficient $c_{l,i,m}$) is $\phi_{l,i,m} = e^{j2\pi d_{l,i,m}/N_{PSK}}$, where $d_{l,i,m} \in \{0, 1, \ldots, N_{PSK}-1\}$.

In one example of Alt 1B, the amplitude and phase coefficients are reported according to Alt 1A except that $N_{PSK} \in \{8,16\}$.

In one example of Alt 1C, the amplitude and phase coefficients are reported according to Alt 1A except that $N_{PSK} \in \{4,8,16\}$.

In one example of Alt 1D, the amplitude and phase coefficients are reported according to Alt 1A except that the value of $N_{PSK}$ is fixed, for example to $N_{PSK}=8$ or $N_{PSK}=16$.

TABLE 1

Mapping of elements: $k_{l,i,m}{}^{(1)}$ to $p_{l,i,m}{}^{(1)}$

| Index $k_{l,i,m}{}^{(1)}$ | Amplitude value $p_{l,i,m}{}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 2

Mapping of elements: $k_{l,i,m}{}^{(2)}$ to $p_{l,i,m}{}^{(2)}$

| Index $k_{l,i,m}{}^{(2)}$ | Amplitude value $p_{l,i,m}{}^{(2)}$ |
|---|---|
| 0 | 0 |
| 1 | $\sqrt{1/4}$ |
| 2 | $\sqrt{1/2}$ |
| 3 | 1 |

TABLE 3

Mapping of elements: $k_{l,i,m}{}^{(2)}$ to $p_{l,i,m}{}^{(2)}$

| Index $k_{l,i,m}{}^{(2)}$ | Amplitude value $p_{l,i,m}{}^{(2)}$ |
|---|---|
| 0 | $\sqrt{1/2}$ |
| 1 | 1 |

In one embodiment of scheme 2, the reported coefficients ($c_{l,i,m} = p_{l,i,m}{}^{(1)} p_{l,i,m}{}^{(2)} \phi_{l,i,m}$) in $\tilde{W}_2$ are quantized in row-wise differential manner for the amplitudes as WB amplitude coefficient ($p_{l,i,m}{}^{(1)}$), SB amplitude coefficient ($p_{l,i,m}{}^{(2)}$) and phase coefficient ($\phi_{l,i,m}$) according to the at least one of the following alternatives (Alt).

In one example of Alt 2A, for each spatial domain beam (row index i), WB amplitude, SB amplitude, and phase are reported as follows.

In one instance, a WB amplitude coefficient ($p_{l,i,m}{}^{(1)}$) is reported common for all frequency domain components (column indices m=0, 1, . . . , M−1) using an A1-bit amplitude codebook. In one example, A1=3 and the amplitude codebook corresponds to the 3-bit amplitude codebook for WB amplitude reporting as shown in TABLE 1.

In one instance, a SB amplitude coefficient ($p_{l,i,m}{}^{(2)}$) is reported for each frequency domain component (for each column index m=0, 1, . . . , M−1) using a A2-bit amplitude codebook. In one example, A2=3 and the amplitude codebook corresponds to the 3-bit amplitude codebook for WB amplitude reporting as shown in TABLE 1. In one example, A2=2 and the amplitude codebook is as shown in TABLE 2. In one example, A2=1 and the amplitude codebook is as shown in TABLE 3.

In one instance, a phase coefficient is reported for each frequency domain component (for each column index m=0, 1, . . . , M−1) using P-bit phase codebook. In an example, for phase coefficient reporting, the value of $N_{PSK}$ (alphabet size) where $P = \log_2 N_{PSK}$ or $\lceil \log_2 N_{PSK} \rceil$ is configured with the higher layer parameter PhaseAlphabetSize, where $N_{PSK} \in \{4,8\}$ and the phase coefficient (corresponding to coefficient $c_{l,i,m}$) is $\phi_{l,i,m} = e^{j2\pi d_{l,i,m}/N_{PSK}}$, where $d_{l,i,m} \in \{0, 1, \ldots, N_{PSK}-1\}$.

In one example of Alt 2B, the amplitude and phase coefficients are reported according to Alt 2A except that $N_{PSK} \in \{8,16\}$.

In one example of Alt 2C, the amplitude and phase coefficients are reported according to Alt 2A except that $N_{PSK} \in \{4,8,16\}$.

In one example of Alt 2D, the amplitude and phase coefficients are reported according to Alt 2A except that the value of $N_{PSK}$ is fixed, for example to $N_{PSK}=8$ or $N_{PSK}=16$.

In one embodiment of scheme 3, the reported coefficients ($c_{l,i,m} = p_{l,i,m}{}^{(1)} p_{l,i,m}{}^{(2)} \phi_{l,i,m}$) in $\tilde{W}_2$ are quantized in column-wise differential manner for the amplitudes as common amplitude coefficient ($p_{l,i,m}{}^{(1)}$), independent amplitude coefficient ($p_{l,i,m}^{(2)}$) and phase coefficient ($\phi_{l,i,m}$) according to the at least one of the following alternatives (Alt).

In one example of Alt 3A, for each frequency domain beam (column index m), common amplitude, independent amplitude, and phase are reported as follows.

In one instance, a common amplitude coefficient ($p_{l,i,m}^{(1)}$) is reported common for all spatial domain components (row indices i=0, 1, . . . , 2L–1) using an A1-bit amplitude codebook. In one example, A1=3 and the amplitude codebook corresponds to the 3-bit amplitude codebook for WB amplitude reporting as shown in TABLE 1.

In one instance, an independent amplitude coefficient ($p_{l,i,m}^{(2)}$) is reported for each spatial domain component (for each row index i=0, 1, . . . , 2L–1) using a A2-bit amplitude codebook. In one example, A2=3 and the amplitude codebook corresponds to the 3-bit amplitude codebook for WB amplitude reporting as shown in TABLE 1. In one example, A2=2 and the amplitude codebook is as shown in TABLE 2. In one example, A2=1 and the amplitude codebook is as shown in TABLE 3.

In one instance, a phase coefficient is reported for each frequency domain component (for each column index m=0, 1, . . . , M–1) using P-bit phase codebook. In an example, for phase coefficient reporting, the value of $N_{PSK}$ (alphabet size) where P=$\log_2 N_{PSK}$ or $\lceil \log_2 N_{PSK} \rceil$ is configured with the higher layer parameter PhaseAlphabetSize, where $N_{PSK} \in \{4,8\}$ and the phase coefficient (corresponding to coefficient $c_{l,i,m}$) is $\phi_{l,i,m} = e^{j2\pi d_{l,i,m}/N_{PSK}}$, where $d_{l,i,m} \in \{0, 1, \ldots, N_{PSK}-1\}$.

In one example of Alt 3B, the amplitude and phase coefficients are reported according to Alt 3A except that $N_{PSK} \in \{8,16\}$.

In one example of Alt 3C, the amplitude and phase coefficients are reported according to Alt 3A except that $N_{PSK} \in \{4,8,16\}$.

In one example of Alt 3D, the amplitude and phase coefficients are reported according to Alt 3A except that the value of $N_{PSK}$ is fixed, for example to $N_{PSK}=8$ or $N_{PSK}=16$.

In one embodiment of scheme 4, the reported coefficients ($c_{l,i,m} = p_{l,i,m}^{(1)} p_{l,i,m}^{(2)} \phi_{l,i,m}$) in $\tilde{W}_2$ are first grouped into G groups and each group is then quantized in differential manner for the) independent amplitude as common amplitude coefficient ($p_{l,i,m}^{(1)}$), amplitude coefficient ($p_{l,i,m}^{(2)}$) and phase coefficient ($\phi_{l,i,m}$) according to the at least one of the following alternatives (Alt).

In one example of Alt 4A, for each coefficient group (index g=0, 1, . . . , G–1), common amplitude, independent amplitude, and phase are reported as follows.

In one instance, a common amplitude coefficient ($p_{l,i,m}^{(1)}$) is reported common for all coefficients comprising the g-th coefficient group using an A1-bit amplitude codebook. In one example, A1=3 and the amplitude codebook corresponds to the 3-bit amplitude codebook for WB amplitude reporting as shown in TABLE 1.

In one instance, an independent amplitude coefficient ($p_{l,i,m}^{(2)}$) is reported for each coefficient comprising the g-th coefficient group using a A2-bit amplitude codebook. In one example, A2=3 and the amplitude codebook corresponds to the 3-bit amplitude codebook for WB amplitude reporting as shown in TABLE 1. In one example, A2=2 and the amplitude codebook is as shown in TABLE 2. In one example, A2=1 and the amplitude codebook is as shown in TABLE In one instance, a phase coefficient is reported for each coefficient comprising the g-th coefficient group using P-bit phase codebook. In an example, for phase coefficient reporting, the value of $N_{PSK}$ (alphabet size) where P=$\log_2 N_{PSK}$ or $\lceil \log_2 N_{PSK} \rceil$ is configured with the higher layer parameter PhaseAlphabetSize, where $N_{PSK} \in \{4,8\}$ and the phase coefficient (corresponding to coefficient $c_{l,i,m}$) is $\phi_{l,i,m} = e^{j2\pi d_{l,i,m}/N_{PSK}}$, where $d_{l,i,m} \in \{0, 1, \ldots, N_{PSK}-1\}$.

In one example of Alt 4B, the amplitude and phase coefficients are reported according to Alt 4A except that $N_{PSK} \in \{8,16\}$.

In one example of Alt 4C, the amplitude and phase coefficients are reported according to Alt 4A except that $N_{PSK} \in \{4,8,16\}$.

In one example of Alt 4D, the amplitude and phase coefficients are reported according to Alt 4A except that the value of $N_{PSK}$ is fixed, for example to $N_{PSK}=8$ or $N_{PSK}=16$.

In one example, the G groups are constructed as follows. The 2L spatial domain beams (corresponding to rows of $\tilde{W}_2$) and M frequency domain beams (corresponding to columns of $\tilde{W}_2$) are sorted in decreasing order of amplitude/power. Let $Q = q_0, q_1, \ldots, q_{2L-1}$ be a sequence of sorted indices i that sorts the spatial domain beams, i.e., $p_{l,q_m} \geq p_{l,q_n}$ for all m<n and m and n in $\{0, 1, \ldots, 2L-1\}$ and $R = r_0, r_1, \ldots r_{M-1}$ be a sequence of sorted indices k that sorts the frequency domain beams, i.e., $p_{l,r_m} \geq p_{l,r_n}$ for all m<n and m and n in $\{0, 1, \ldots, M-1\}$.

As an example, to sort beams, averaging is performed separately in both the spatial domain (i.e., across ports or columns of basis matrix $W_1$ or indices i of $c_{l,i,m}$) and the frequency domain (i.e., across SBs or columns of basis matrix $W_f$ or indices k of $c_{l,i,m}$). Let $$p_{l,m} = \frac{1}{2L} \sum_{i=0}^{2L-1} |c_{l,i,m}|^2 \text{ and}$$

$$p_{l,i} = \frac{1}{M} \sum_{k=0}^{M-1} |c_{l,i,m}|^2.$$

The average power $p_{l,i}$ for i=0, 1, . . . , 2L–1 is used to sort coefficients in descending or non-increasing order in spatial domain. Likewise, the average power $p_{l,m}$ for m=0, 1, . . . , M–1 is used to sort coefficients in descending or non-increasing order in frequency domain. The G=2L+M–1 groups of coefficients are then constructed using Q and R according to at least one of the following examples.

In one example of Ex 4-0, for g=0, 1, . . . , 2L+M–2, the g-th coefficient group comprises (sorted) coefficients $\{c_{l,q_i,r_m}\}$ such that i+m=g, where i$\in\{0, 1, \ldots, 2L-1\}$ and i$\in\{0, 1, \ldots, M-1\}$.

In one example of Ex 4-1, for g=0, 1, . . . , 2L+M–2, the g-th coefficient group comprises (sorted) coefficients $\{c_{l,q_i,r_m}\}$ such that $\gamma$i+m=g, where and $\gamma$>1, i$\in\{0, 1, \ldots, 2L-1\}$ and i$\in\{0, 1, \ldots, M-1\}$.

In one example of Ex 4-2, for g=0, 1, . . . , 2L+M–2, the g-th coefficient group comprises (sorted) coefficients $\{c_{l,q_i,r_m}\}$ such that $\gamma$i+m=g, where and $\gamma$<1, i$\in\{0, 1, \ldots, 2L-1\}$ and i$\in\{0, 1, \ldots, M-1\}$.

Figure 14:
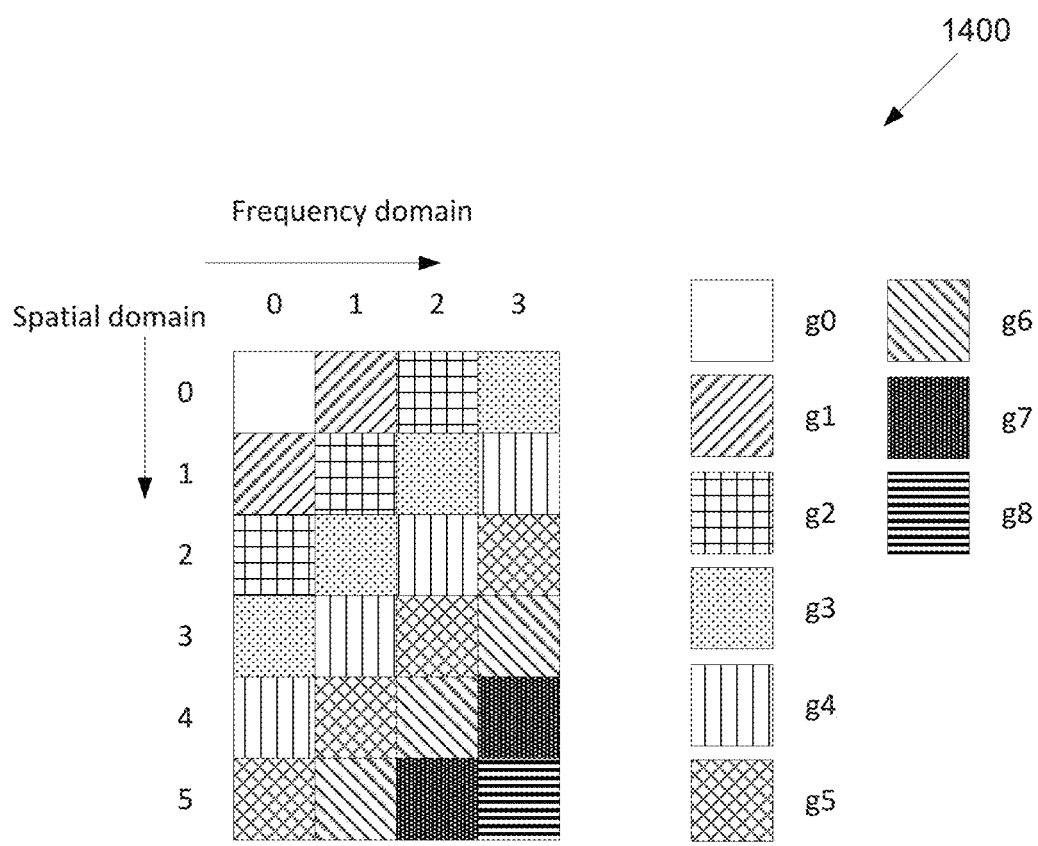
FIG. 14 illustrates an example coefficient groups according to embodiments of the present disclosure.

FIG. 14 illustrates an example coefficient groups 1400 according to embodiments of the present disclosure. The embodiment of the coefficient groups 1400 illustrated in FIG. 14 is for illustration only. FIG. 14 does not limit the scope of the present disclosure to any particular implementation.

The value $\gamma$ is either fixed (e.g. to 1) or configured via higher layer signaling or reported by the UE. An illustration of coefficient grouping according to Ex 4-0 is illustrated in FIG. 14 in which L=3, M=4, where it is assumed that coefficients are sorted according to Q and R.

In one embodiment of scheme 5, the reported coefficients ($c_{l,i,m} = p_{l,i,m}^{(1)} p_{l,i,m}^{(2)} \phi_{l,i,m}^{(1)} \phi_{l,i,m}^{(2)}$) in $\tilde{W}_2$ are quantized in row-wise differential manner for both amplitudes and phases as WB amplitude coefficient ($p_{l,i,m}^{(1)}$), SB amplitude coefficient ($p_{l,i,m}^{(2)}$) WB phase coefficient ($\phi_{l,i,m}^{(1)}$) and SB phase coefficient ($\phi_{l,i,m}^{(2)}$) according to the at least one of the following alternatives (Alt).

In one example of Alt 5A, this alternative is the same as Alt 2A for the WB and SB amplitude reporting. For each spatial domain beam (row index i), WB phase and SB phase are reported as follows.

In one instance, a WB phase coefficient ($\phi_{l,i,m}^{(1)}$) is reported common for all frequency domain components (column indices m=0, 1, . . . , M−1) using a P1-bit WB phase codebook. In one example, P1=2 or 3 and the WB phase codebook corresponds $\{\phi_{l,i,m}=\alpha e^{j2\pi d_{l,i,m}/N_{PSK,1}}\}$, where $d_{l,i,m} \in \{0, 1, \ldots, N_{PSK,1}-1\}$, and $N_{PSK,1}=2^{P1}=4$ or 8 for P1=2 and 3 respectively. In one example, $\alpha=1$. In another example, $\alpha=e^{j\pi/4}$. In another example, $\alpha=e^{j\pi/N_{PSK,1}}$. In an example, the value of $N_{PSK,1}$ (alphabet size) is configured with the higher layer parameter PhaseAlphabetSize, where $N_{PSK,1} \in \{4,8\}$.

In one instance, a SB phase coefficient ($\phi_{l,i,m}^{(2)}$) is reported for each frequency domain component (for each column index m=0, 1, . . . , M−1) using a P2-bit SB phase codebook. In one example, P2=1 or 2 or P1 and the SB phase codebook corresponds to $\{\phi_{l,i,m}=\beta e^{j2\pi d_{l,i,m}/N_{PSK,2}}\}$, where $d_{l,i,m} \in \{0, 1, \ldots, N_{PSK,2}-1\}$, and $N_{PSK,2}=2^{P2}=2$ or 4 or 8 for P2=1, 2 and 3 respectively. In one example, $\beta=1$. In another example, $\beta=e^{-j\pi/4}$. In another example, $\beta=e^{-j\pi/N_{PSK,2}}$. In an example, the value of $N_{PSK,2}$ (alphabet size) is configured with the higher layer parameter PhaseAlphabetSize2, where $N_{PSK,2} \in \{2,4\}$.

In one example of Alt 5B, the amplitude and phase coefficients are reported according to Alt 5A except that $N_{PSK,1} \in \{8,16\}$.

In one example of Alt 5C, the amplitude and phase coefficients are reported according to Alt 5A except that $N_{PSK,1} \in \{4,8,16\}$.

In one example of Alt 5D, the amplitude and phase coefficients are reported according to Alt 5A except that the value of $N_{PSK,1}$ is fixed, for example to $N_{PSK,1}=8$ or $N_{PSK,1}=16$.

In one example of Alt 5E, the amplitude and phase coefficients are reported according to Alt 5A except that $N_{PSK,2} \in \{4,8\}$.

In one example of Alt 5F, the amplitude and phase coefficients are reported according to Alt 5A except that $N_{PSK,2} \in \{2,4,8\}$.

In one example of Alt 5G, the amplitude and phase coefficients are reported according to Alt 5A except that the value of $N_{PSK,2}$ is fixed, for example to $N_{PSK,2}=2$ or $N_{PSK,2}=4$ or $N_{PSK,2}=8$ In one embodiment of scheme 6, the reported coefficients ($c_{l,i,m}=p_{l,i,m}^{(1)}p_{l,i,m}^{(2)}\phi_{l,i,m}^{(1)}\phi_{l,i,m}^{(2)}$) in $\tilde{W}_2$ are quantized in column-wise differential manner for both amplitudes and phases as common amplitude coefficient ($p_{l,i,m}^{(1)}$), independent amplitude coefficient ($p_{l,i,m}^{(2)}$), common phase coefficient ($\phi_{l,i,m}^{(1)}$) and independent phase coefficient ($\phi_{l,i,m}^{(2)}$) according to the at least one of the following alternatives (Alt).

In one example of Alt 6A, this alternative is the same as Alt 6A for the common and independent amplitude reporting. For each frequency domain beam (column index m), common phase and independent phase are reported as follows.

In one instance, a common phase coefficient ($\phi_{l,i,m}^{(1)}$) is reported common for all spatial domain components (row indices i=0, 1, . . . , 2L−1) using a P1-bit phase codebook. In one example, P1=2 or 3 and the phase codebook corresponds $\{\phi_{l,i,m}=\alpha e^{j2\pi d_{l,i,m}/N_{PSK,1}}\}$, where $d_{l,i,m} \in \{0, 1, \ldots, N_{PSK,1}-1\}$, and $N_{PSK,1}=2^{P1}=4$ or 8 for P1=2 and 3 respectively. In one example, $\alpha=1$. In another example, $\alpha=e^{j\pi/4}$. In another example, $\alpha=e^{j\pi/N_{PSK,1}}$. In an example, the value of $N_{PSK,1}$ (alphabet size) is configured with the higher layer parameter PhaseAlphabetSize, where $N_{PSK,1} \in \{4, 8\}$.

In one instance, an independent phase coefficient ($\phi_{l,i,m}^{(1)}$) is reported for each spatial domain component (for each row index i=0, 1, . . . , 2L−1) using a P2-bit phase codebook. In one example, P2=1 or 2 or P1 and the phase codebook corresponds to $\{\phi_{l,i,m}=\beta e^{j2\pi d_{l,i,m}/N_{PSK,2}}\}$, where $d_{l,i,m} \in \{0, 1, \ldots, N_{PSK,2}-1\}$, and $N_{PSK,2}=2^{P2}=2$ or 4 or 8 for P2=1, 2 and 3 respectively. In one example, $\beta=1$. In another example, $\beta=e^{-j\pi/4}$. In another example, $\beta=e^{-j\pi/N_{PSK,2}}$. In an example, the value of $N_{PSK,2}$ (alphabet size) is configured with the higher layer parameter PhaseAlphabetSize2, where $N_{PSK,2} \in \{2,4\}$.

In one example of Alt 6B, the amplitude and phase coefficients are reported according to Alt 6A except that $N_{PSK,1} \in \{8,16\}$.

In one example of Alt 6C, the amplitude and phase coefficients are reported according to Alt 6A except that $N_{PSK,1} \in \{4,8,16\}$.

In one example of Alt 6D, the amplitude and phase coefficients are reported according to Alt 6A except that the value of $N_{PSK,1}$ is fixed, for example to $N_{PSK,1}=8$ or $N_{PSK,1}=16$.

In one example of Alt 6E, the amplitude and phase coefficients are reported according to Alt 6A except that $N_{PSK,2} \in \{4,8\}$.

In one example of Alt 6F, the amplitude and phase coefficients are reported according to Alt 6A except that $N_{PSK,2} \in \{2,4,8\}$.

In one example of Alt 6G, the amplitude and phase coefficients are reported according to Alt 6A except that the value of $N_{PSK,2}$ is fixed, for example to $N_{PSK,2}=2$ or $N_{PSK,2}=4$ or $N_{PSK,2}=8$ In one embodiments of scheme 7, the reported coefficients ($c_{l,i,m}=p_{l,i,m}^{(1)}p_{l,i,m}^{(2)}\phi_{l,i,m}^{(1)}\phi_{l,i,m}^{(2)}$) in $\tilde{W}_2$ are first grouped into G groups and each group is then quantized in differential manner for both amplitudes and phases as common amplitude coefficient ($p_{l,i,m}^{(1)}$), independent amplitude coefficient ($p_{l,i,m}^{(2)}$), common phase coefficient ($\phi_{l,i,m}^{(1)}$) and independent phase coefficient ($\phi_{l,i,m}^{(2)}$) according to the at least one of the following alternatives (Alt).

In one example of Alt 7A, this alternative is the same as Alt 4A for the common and independent amplitude reporting. For each coefficient group (index g=0, 1, . . . , G−1), common phase and independent phase are reported as follows.

In one instance, a common phase coefficient ($\phi_{l,i,m}^{(1)}$) is reported common for all coefficients comprising the g-th coefficient group using a P1-bit phase codebook. In one example, P1=2 or 3 and the phase codebook corresponds $\{\phi_{l,i,m}=\alpha e^{j2\pi d_{l,i,m}/N_{PSK,1}}\}$, where $d_{l,i,m} \in \{0, 1, \ldots, N_{PSK,1}-1\}$, and $N_{PSK,1}=2^{P1}=4$ or 8 for P1=2 and 3 respectively. In one example, $\alpha=1$. In another example, $\alpha=e^{j\pi/4}$. In another example, $\alpha=e^{j\pi/N_{PSK,1}}$. In an example, the value of $N_{PSK,1}$ (alphabet size) is configured with the higher layer parameter PhaseAlphabetSize, where $N_{PSK,1} \in \{4,8\}$.

In one instance, an independent phase coefficient ($\phi_{l,i,m}^{(2)}$) is reported for each coefficient comprising the g-th coefficient group using a P2-bit phase codebook. In one example, P2=1 or 2 or P1 and the phase codebook corresponds to $\{\phi_{l,i,m}=\beta e^{j2\pi d_{l,i,m}/N_{PSK,2}}\}$, where $d_{l,i,m} \in \{0, 1, \ldots, N_{PSK,2}-1\}$, and $N_{PSK,2}=2^{P2}=2$ or 4 or 8 for P2=1, 2 and 3 respectively. In one example, $\beta=1$. In another example, $\beta=e^{-j\pi/4}$. In another example, $\beta=e^{-j\pi/N_{PSK,2}}$. In an example, the value of $N_{PSK,2}$ (alphabet size) is configured with the higher layer parameter PhaseAlphabetSize2, where $N_{PSK,2} \in \{2,4\}$.

In one example of Alt 7B, the amplitude and phase coefficients are reported according to Alt 7A except that $N_{PSK,1} \in \{8,16\}$.

In one example of Alt 7C, the amplitude and phase coefficients are reported according to Alt 7A except that/ $V_{PSK,1} \in \{4,8,16\}$.

In one example of Alt 7D, the amplitude and phase coefficients are reported according to Alt 7A except that the value of $N_{PSK,1}$ is fixed, for example to $N_{PSK,1}=8$ or $N_{PSK,1}=16$.

In one example of Alt 7E, the amplitude and phase coefficients are reported according to Alt 7A except that $N_{PSK,2} \in \{4,8\}$.

In one example of Alt 7F, the amplitude and phase coefficients are reported according to Alt 7A except that $N_{PSK,2} \in \{2,4,8\}$.

In one example of Alt 7G, the amplitude and phase coefficients are reported according to Alt 7A except that the value of $N_{PSK,2}$ is fixed, for example to $N_{PSK,2}=2$ or $N_{PSK,2}=4$ or $N_{PSK,2}=8$.

In one embodiment of scheme 8, the reported coefficients $(c_{l,i,m}=p_{l,i,m}^{(1)}p_{l,i,m}^{(2)}\phi_{l,i,m})$ in $\tilde{W}_2$ are quantized in differential manner for the amplitudes as common amplitude coefficient $(p_{l,i,m}^{(1,1)})$ for 2L spatial domain beams, common amplitude coefficient $(p_{l,i,m}^{(1,2)})$ for M frequency domain beams, independent amplitude coefficient $(p_{l,i,m}^{(2)})$, and phase coefficient $(\phi_{l,i,m})$ according to the at least one of the following alternatives (Alt).

In one example of Alt 8A, the phase reporting is according to Alt 2A in scheme 2. The amplitude reporting is as follows.

In one instance, for each spatial domain beam $i \in \{0, 1, \ldots, 2L-1\}$, a common amplitude coefficient $(p_{l,i,m}^{(1,1)})$ is reported common for all frequency domain components (column indices $m=0, 1, \ldots, M-1$) using a A11-bit amplitude codebook. In one example, A11=3 and the amplitude codebook corresponds to the 3-bit amplitude codebook for WB amplitude reporting as shown in TABLE 1.

In one instance, for each frequency domain beam $m \in \{0, 1, \ldots, M-1\}$, a common amplitude coefficient $(p_{l,i,m}^{(1,2)})$ is reported common for all spatial domain components (row indices $i=0, 1, \ldots, 2L-1$) using a A12-bit amplitude codebook. In one example, A12=3 and the amplitude codebook corresponds to the 3-bit amplitude codebook for WB amplitude reporting as shown in TABLE 1.

In one instance, an independent amplitude coefficient $(p_{l,i,m}^{(2)})$ is reported for each coefficient $c_{l,i,m}$ using a A2-bit amplitude codebook. In one example, A2=3 and the amplitude codebook corresponds to the 3-bit amplitude codebook for WB amplitude reporting as shown in TABLE 1. In one example, A2=2 and the amplitude codebook is as shown in TABLE 2. In one example, A2=1 and the amplitude codebook is as shown in TABLE 3. In one example, A2=1 and the amplitude codebook is $\{0,1\}$ indicating the selection of coefficients. The total number of amplitude coefficients reported are $2L+M+2LM_v$ and the total number of bits=$2L \times A11+M \times A12+2LM \times A2$.

In one example of Alt 8B, the phase reporting is according to Alt 2B and amplitude reporting is the same as in Alt 8A.

In one example of Alt 8C, the phase reporting is according to Alt 2C and amplitude reporting is the same as in Alt 8A.

In one example of Alt 8D, the phase reporting is according to Alt 2D and amplitude reporting is the same as in Alt 8A.

In one embodiment of scheme 9, the reported coefficients $(c_{l,i,m}=p_{l,i,m}^{(1,1)}p_{l,i,m}^{(1,2)}p_{l,i,m}^{(2)}\phi_{l,i,m}^{(1,1)}\phi_{l,i,m}^{(1,2)}\phi_{l,i,m}^{(2)})$ in $\tilde{W}_2$ are quantized in differential manner for both amplitudes and phases as common amplitude coefficient $(p_{l,i,m}^{(1,1)})$ for 2L spatial domain beams, common amplitude coefficient $(p_{l,i,m}^{(1,2)})$ for M frequency domain beams, independent amplitude coefficient $(p_{l,i,m}^{(2)})$, and common phase coefficient $(\phi_{l,i,m}^{(1,1)})$ for 2L spatial domain beams, common phase coefficient $(\phi_{l,i,m}^{(1,2)})$ for M frequency domain beams and independent phase coefficient $(\phi_{l,i,m}^{(2)})$ according to the at least one of the following alternatives (Alt).

In one example of Alt 9A, the amplitude reporting is according to Alt 8A. The phase reporting is as follows.

In one instance, for each spatial domain beam $i \in \{0, 1, \ldots, 2L-1\}$, a common phase coefficient $(\phi_{l,i,m}^{(1,1)})$ is reported common for all frequency domain components (column indices $m=0, 1, \ldots, M-1$) using a P11-bit phase codebook. In one example, the phase codebook corresponds to $\{\phi_{l,i,m}=\beta e^{j2\pi d_{l,i,m}/N_{PSK,1,1}}\}$, where $d_{l,i,m} \in \{0, 1, \ldots, N_{PSK,1,1}-1\}$ and $N_{PSK,1,1}=2^{P11}$. In one example, P11=3.

In one instance, for each frequency domain beam $m \in \{0, 1, \ldots, M-1\}$, a common phase coefficient $(\phi_{l,i,m}^{(1,2)})$ is reported common for all spatial domain components (row indices $i=0, 1, \ldots, 2L-1$) using a P12-bit phase codebook. In one example, the phase codebook corresponds to $\{\phi_{l,i,m}=\beta e^{j2\pi d_{l,i,m}/N_{PSK,1,2}}\}$, where $d_{l,i,m} \in \{0, 1, \ldots, N_{PSK,1,2}-1\}$ and $N_{PSK,1,2}=2^{P12}$. In one example, P12=3.

In one instance, an independent phase coefficient $(\phi_{l,i,m}^{(2)})$ is reported for each coefficient $c_{l,i,m}$ using a P2-bit phase codebook. In one example, the phase codebook corresponds to $\{\phi_{l,i,m}=\beta e^{j2\pi d_{l,i,m}/N_{PSK,2}}\}$, where $d_{l,i,m} \in \{0, 1, \ldots, N_{PSK,2}-1\}$ and $N_{PSK,2}=2^{P2}$. In one example, P2=1 or 2. The total number of phase coefficients reported are $2L+M+2LM$, and the total number of bits=$2L \times P11+M \times P12+2LM \times P2$.

In one example of Alt 9C, this alternative is the same as Alt 9A except that the $N_{PSK,1,1}=N_{PSK,1,2}$ is configured (via a common higher layer signaling parameter) where $N_{PSK,1,1} \in \{4,8\}$.

In one example of Alt 9C, this alternative is the same as Alt 9A except that the $N_{PSK,1,1}=N_{PSK,1,2}$ is configured (via a common higher layer signaling parameter) where $N_{PSK,1,1} \in \{8,16\}$.

In one example of Alt 9D, this alternative is the same as Alt 9A except that the $N_{PSK,1,1}=N_{PSK,1,2}$ is configured (via a common higher layer signaling parameter) where $N_{PSK,1,1} \in \{4,8,16\}$.

In one example of Alt 9E, this alternative is the same as Alt 9A except that the $N_{PSK,1,1}$ and $N_{PSK,1,2}$ are configured (via two independent higher layer signaling parameters) where $N_{PSK,1,1} \in \{4,8\}$ and $N_{PSK,1,2} \in \{4,8\}$.

In one example of Alt 9F, this alternative is the same as Alt 9A except that the $N_{PSK,1,1}$ and $N_{PSK,1,2}$ are configured (via two independent higher layer signaling parameters) where $N_{PSK,1,1} \in \{8,16\}$ and $N_{PSK,1,2} \in \{8,16\}$.

In one example of Alt 9G, this alternative is the same as Alt 9A except that the $N_{PSK,1,1}$ and $N_{PSK,1,2}$ are configured (via two independent higher layer signaling parameters) where $N_{PSK,1,1} \in \{4,8,16\}$ and $N_{PSK,1,2} \in \{4,8,16\}$.

In one example of Alt 9H, $N_{PSK,1,1}$ and $N_{PSK,1,2}$ are according to one of Alt 9A-9G, and the $N_{PSK,2}$ is configured (via a higher layer signaling parameter) where $N_{PSK,2} \in \{1,2\}$ or $\{2,4\}$ or $\{2,4,8\}$.

In one example of Alt 9I, this alternative is the same as Alt 9A except that the $N_{PSK,1,1}=N_{PSK,1,2}$ is configured (via a common higher layer signaling parameter) where $N_{PSK,1,1} \in \{4,8\}$ and $$N_{PSK,2} = \frac{N_{PSK,1,1}}{2} \text{ or } \frac{N_{PSK,1,1}}{4}.$$

In one embodiment of scheme 9, the reported coefficients ($c_{l,i,m}$) are quantized using a bit-size table of size 2L×M whose (i, m)-th entry corresponds to the number of bits used to quantize coefficient $c_{l,i,m}$. In one example, the bit-size table is only for the amplitude coefficients, and the phase quantization (number of bits or/and phase codebook) is according to at least one of the schemes in the present disclosure. In another example, the bit-size table is only for the phase coefficients, and the amplitude quantization (number of bits or/and amplitude codebook) is according to at least one of the schemes in the present disclosure. In another example, the bit-size table is for both amplitude and phase coefficients either as two separate tables, or as parts of a table or as a pair bit-size pair ($b_i$, $b_m$) where $b_i$ is bit-size for amplitude coefficient and $b_m$ is bit-size for phase coefficient. For a given bit-size for amplitude/phase, the amplitude/phase codebook mentioned in some of the schemes in the present disclosure.

In one embodiment of scheme 10, for each spatial domain beam (i∈{0, 1, . . . , 2L−1}): $B_0$-bit amplitude and $C_0$-bit phase codebooks are used for the $P_0$ strongest coefficients; $B_1$-bit amplitude and $C_1$-bit phase codebooks are used for the $P_1$ $2^{nd}$ strongest coefficients; . . . ; and $B_{Q-1}$-bit amplitude and $C_{Q-1}$-bit phase codebooks are used for the $P_{Q-1}$ $Q^{th}$ strongest coefficients.

The indices of $P_0$ strongest coefficients, $P_1$ $2^{nd}$ strongest coefficients, . . . , $P_{Q-1}$ $Q^{th}$ strongest coefficients are either reported by the UE (e.g. as part of the CSI report) or fixed or configured by the gNB.

In one example, $B_i \geq B_j$ for all i<j. In one example, $C_i \geq C_j$ for all i<j. In one example, $B_i > B_j$ for all i<j. In one example, $C_i > C_j$ for all i<j. As an alternative, the amplitude/phase can be replaced with real/imaginary parts of coefficients. As an example, Q=2, $B_0 = C_0 = 3$; $B_1 = C_1 = 2$.

In one embodiment of scheme 11, the reported coefficients ($c_{l,i,m} = p_{l,i,m}\phi_{l,i,m}$) are first grouped in two groups, $G_1$ and $G_2$, and coefficients in group $G_i$, i∈{1,2} are then quantized using $A_i$ bits for amplitude ($p_{l,i,m}$) and $P_i$ bits for phase ($\phi_{l,i,m}$). At least one of the following alternatives is used for grouping.

In one example of Alt 11-0 (row-wise grouping), the grouping is performed across rows. The SD beams i=0, 1, . . . , 2L−1 are sorted into a stronger group comprising K SD beams and a weaker group comprising remaining 2L−K SD beams. Then, the group $G_1$ comprises coefficients $c_{l,i,m}$ whose index i corresponds to a stronger SD beam and index m∈{0, 1, . . . , M−1}. Likewise, the group $G_2$ comprises coefficients $c_{l,i,m}$ whose index i corresponds to a weaker SD beam and index m∈{0, 1, . . . , M−1}. In one example, the grouping information is indicated as part of CSI report using $$\left\lceil \log_2 \binom{2L}{K} \right\rceil$$

bits. In another example, the grouping information is not reported explicitly and is derived from the reported SD beam indices. For example, the SD beams with the smallest SD indices i=0, 1, . . . , K−1 comprises the group $G_1$. A few examples of K values are as follows.

In one instance of Ex 11-0-0, the K value in Rel. 15 Type II CSI reporting is used for grouping. That is, K=4, 4, and 6 for L=2, 3, and 4, respectively. If L=6 can also be configured, then K=6 or 8.

In one instance of Ex 11-0-1, K is fixed, e.g., K=1.

In one instance of Ex 11-0-2, K is configured, e.g., via higher layer signaling.

In one instance of Ex 11-0-3, K is reported by the UE, e.g., as part of the WB CSI report.

In one example of Alt 11-1 (column-wise grouping), the grouping is performed across columns. The FD beams m=0, 1, . . . , M−1 are sorted into a stronger group comprising Q FD beams and a weaker group comprising remaining M Q FD beams. Then, the group $G_1$ comprises coefficients $c_{l,i,m}$ whose index m corresponds to a stronger FD beam and index i∈{0, 1, . . . , 2L−1}. Likewise, the group $G_2$ comprises coefficients $c_{l,i,m}$ whose index m corresponds to a weaker FD beam and index i∈{0, 1, . . . , 2L−1}. In one example, the grouping information is indicated as part of CSI report using $$\left\lceil \log_2 \binom{M}{Q} \right\rceil$$

bits. In another example, the grouping information is not reported explicitly and is derived from the reported FD beam indices (or components). For example, the FD beams (or components) with the smallest FD indices m=0, 1, . . . , Q−1 comprises the group $G_1$. A few examples of Q values are as follows.

In one instance of Ex 11-1-0, the value Q depends on the value of M, e.g., Q=⌈M/2⌉ or ⌊M/2⌋.

In one instance of Ex 11-1-1, Q is fixed, e.g., Q=1.

In one instance of Ex 11-1-2, Q is configured, e.g., via higher layer signaling.

In one instance of Ex 11-1-3, Q is reported by the UE, e.g., as part of the WB CSI report.

In one example of Alt 11-2 (both row-wise and column-wise grouping), the grouping is performed across both rows and columns. The K and Q values in Alt 11-0 and 11-1 are used to form groups $G_1$ and $G_2$. For example, the group $G_1$ comprises coefficients $c_{l,i,m}$ whose index i corresponds to a stronger SD beam and index m corresponds to a stronger FD beam and the group $G_2$ comprises the rest of the coefficients. In another example, the group $G_1$ comprises coefficients whose index i corresponds to a stronger SD beam or index m corresponds to a stronger FD beam and the group $G_2$ comprises the rest of the coefficients. The details such as how to report the grouping information and the values of K and Q are as explained in Alt 13-0 and Alt 13-1.

In one example of Alt 11-3, the strongest coefficient (out of 2LM coefficients) is used for grouping. The index of the strongest coefficient is reported by the UE. Let be the strongest coefficient where (i*, m*) is the index of the strongest coefficient for layer l. At least one of the sub-alternatives is used for grouping.

In one example of Alt 11-3-0, the group $G_1$ comprises coefficients $c_{l,i,m}$ whose row index i=i* or column index m=m*, and the group $G_2$ comprises the rest of the coefficients.

In one example of Alt 11-3-1, the group $G_1$ comprises coefficients $c_{l,i,m}$ whose row index i=i*, and the group $G_2$ comprises the rest of the coefficients.

In one example of Alt 11-3-2, the group $G_1$ comprises coefficients $c_{l,i,m}$ whose column index m=m*, and the group $G_2$ comprises the rest of the coefficients.

In one example of Alt 11-4, the selection of $G_1$ and $G_2$ is free (unrestricted). For example, the group $G_1$ comprises $g_1 < 2LM$ coefficients, the group $G_2$ comprises $g_2 = 2LM - g_1$ coefficients. The indices of $g_1$ coefficients are indicated either via a bitmap of length $2LM$ or via a combinatorial index indication using $$\left\lceil \log_2 \binom{2LM}{g_1} \right\rceil$$

bits.

A few examples of bit combinations for amplitude and phase reporting are as follows.

In one instance of Ex 11-0, $(A_1,P_1)=(4,4)$ and $(A_2,P_2)=(3,3)$.

In one instance of Ex 11-1, $(A_1,P_1)=(3,4)$ and $(A_2,P_2)=(3,3)$.

In one instance of Ex 11-2, $(A_1,P_1)=(3,3)$ and $(A_2,P_2)=(2,2)$.

In one instance of Ex 11-3, $(A_1,P_1)=(4,P)$ and $(A_2,P_2)=(3,P)$ where $P \in \{2,3,4\}$ or $\{3,4\}$ is configured.

In one instance of Ex 11-4, $(A_1,P_1)=(3,P)$ and $(A_2,P_2)=(2,P)$ where $P \in \{2,3,4\}$ or $\{3,4\}$ is configured.

In one instance of Ex 11-5, $(A_1,P_1)=(A, P)$ and $(A_2,P_2)=(A-1,P)$ where $P \in \{2,3,4\}$ or $\{3,4\}$ is configured, and $A \in \{2, 3\}$ is also configured.

In one instance of Ex 11-6, $(A_1,P_1)=(3,P)$ and $(A_2,P_2)=(3-A, P)$ where $P \in \{2,3,4\}$ or $\{3,4\}$ is configured, and $A \in \{0,1\}$ is also configured. Note that if Ex 11-6 is used for bit allocation, and $A=0$ is configured, then there is no need for reporting any grouping information (since the quantization is equal-bit), and the quantization scheme reduces to simple scalar quantization scheme (Scheme 1) In other words, the role of parameter A is equivalent to switching between two quantization schemes (Scheme 1 and Scheme 11).

A few examples of the amplitude codebooks are as follows. The 4-bit amplitude codebook is:

$$\left\{ 0, \sqrt{\frac{1}{x^{14}}}, \sqrt{\frac{1}{x^{13}}}, \sqrt{\frac{1}{x^{12}}}, \sqrt{\frac{1}{x^{11}}}, \sqrt{\frac{1}{x^{10}}}, \sqrt{\frac{1}{x^9}}, \sqrt{\frac{1}{x^8}}, \sqrt{\frac{1}{x^7}}, \sqrt{\frac{1}{x^6}}, \sqrt{\frac{1}{x^5}}, \sqrt{\frac{1}{x^4}}, \sqrt{\frac{1}{x^3}}, \sqrt{\frac{1}{x^2}}, \sqrt{\frac{1}{x}}, 1 \right\}.$$

In one example, $x=10^{1.5/10}=1.4125 \cong 1.41$ or $1.42$. In another example, $x=2$. The 3-bit amplitude codebook is $\{0, \sqrt{1/x^6}, \sqrt{1/x^5}, \sqrt{1/x^4}, \sqrt{1/x^3}, \sqrt{1/x^2}, \sqrt{1/x}, 1\}$. In one example, the Rel. 15 amplitude codebook, i.e., $\{0, \sqrt{1/64}, \sqrt{1/32}, \sqrt{1/16}, \sqrt{1/18}, \sqrt{1/4}, \sqrt{1/2}, 1\}$, where $x=2$ is used.

The 2-bit amplitude codebook is $$\left\{ 0, \frac{1}{4}, \frac{1}{2}, 1 \right\}$$

or $\{0, \sqrt{1/4}=1/2, \sqrt{1/2}, 1\}$. Let $N_{PSK}=2^{P_1}$ (or $2^{P_2}$) be the phase alphabet size. Then the phase codebook is given by $\{e^{j2\pi d/N_{PSK}}: d=0, 1, \ldots, N_{PSK}-1\}$.

In one example of Scheme 11A, a UE is configured to report a size-$K_0$ subset of coefficients comprising a maximum of $K_0$, where $K_0 < 2LM$, coefficients. The UE reports the indices of the selected $K_0$ coefficients as part of the CSI report. The coefficients that are not selected by the UE are set to zero. Among the selected $K_0$ coefficients, some of the coefficients can have zero amplitude if zero is included in the amplitude codebook, and hence their phase doesn't need to be reported. Then, the UE can indicate a number non-zero coefficients $K_1 \leq K_0$ (e.g. in UCI part of a two-part UCI to report CSI). Note that the indices of selected coefficients whose amplitudes are zero can be jointly indicated using the subset selection indication $K_1 \leq K_0$ indices that are non-zero. At least one of the following is used to form groups $G_1$ and $G_2$ as explained in Scheme 11.

In one example of Alt 11A-0, the grouping is according to at least one alternative in Scheme 11. The size-$K_0$ subset or size-$K_1$ subset selection and the grouping are performed independently, and hence some of the coefficients in either $G_1$ or $G_2$ can be zero.

In one example of Alt 11A-1, the grouping is according to at least one alternative in Scheme 11. The coefficients comprising the stronger group $G_1$ are included into the size-$K_0$ subset or size-$K_1$ subset selection. In this case, the CSI report includes the following two components.

In one example, the first component is the indication of indices of coefficients comprising the stronger group $G_1$. Let $g_1$ be the number of coefficients comprising the stronger group $G_1$. The payload (number of bits) of this indication is according to the alternatives in Scheme 11.

In one example, the second component is the indication of the remaining $g_2=\max(K_1-g_1, 0)$ or $\max(K_0-g_1, 0)$ indices comprising the weaker group $G_2$ that are reported by the UE. If $g_2 > 1$, then this indication can be either via using a bitmap of length $2LM-g_1$ comprising $g_2$ ones or via a combinatorial index indication using $$\left\lceil \log_2 \binom{2LM - g_1}{g_2} \right\rceil$$

bits indicating reported (non-zero) coefficients in $G_2$.

In one example of Alt 11A-2, the size-$K_0$ subset or size-$K_1$ subset selection and reporting is performed as explained above. Then, $g_1$ out of $K_0$ (or $K_1$) coefficients are selected freely to form the stronger group. This selection can be via a bitmap of length $K_0$ (or $K_1$ or $\max(K_0, g_1)$ or $\max(K_1, g_1)$) comprising $g_1$ ones or via a combinatorial index indication using $$\left\lceil \log_2 \binom{K_0}{g_1} \right\rceil \text{ or}$$

$$\left\lceil \log_2 \binom{K_1}{g_1} \right\rceil \text{ or } \left\lceil \log_2 \binom{\max(K_0, g_1)}{g_1} \right\rceil \text{ or } \left\lceil \log_2 \binom{\max(K_1, g_1)}{g_1} \right\rceil$$

bits indicating selected coefficients. The remaining $g_2=\max(K_1-g_1, 0)$ or $\max(K_0-g_1, 0)$ indices comprising the weaker group $G_2$.

The value $g_1$ (in Scheme 11 or 12 or other embodiments of the present disclosure) is determined according to at least one of the following alternatives.

In one example of Alt 11AA-0, the value $g_1$ is fixed, e.g., $g_1=2L$ or $\min(K_0, 2L)$ or $\min(K_0, 2L)$ or $\min(K_1, 2L)$ or $\min(K_1, 2L)$.

In one example of Alt 11AA-1, the value $g_1$ is configured via higher layer signaling.

In one example of Alt 11AA-2, the value $g_1$ is reported by the UE as part of the CSI report.

In one embodiment of scheme 12, the reported coefficients are grouped in two groups, $G_1$ and $G_2$, where: the stronger group of coefficients $G_1$ are quantized as $c_{l,i,m} = p_{l,i,m}^{(1)} p_{l,i,m}^{(2)} \phi_{l,i,m}$ where the first amplitude component (e.g. WB amplitude) $p_{l,i,m}^{(1)}$ is reported for each coefficients comprising the stronger group, and the second amplitude component (e.g. SB amplitude) $p_{l,i,m}^{(2)}=1$ is fixed (not reported); and the weaker group of coefficients $G_2$ are quantized as $c_{l,i,m} = p_{l,i,m}^{(1)} p_{l,i,m}^{(2)} \phi_{l,i,m}$ where the first amplitude component (e.g. WB amplitude) $p_{l,i,m}^{(1)}$ equals one of $p_{l,i,m}^{(1)}$ reported for the stronger group of coefficients, and the second amplitude component (e.g. SB amplitude) $p_{l,i,m}^{(2)}$ is reported for each coefficients comprising the weaker group.

Let $(A_i^{(1)}, A_i^{(2)}, P_i)$ be number of bits to quantize each reported coefficient in group $G_i$. Then, a few examples of bit combinations for amplitude and phase reporting are as follows.

In one example of Ex 12-0, $(A_1^{(1)}, A_1^{(2)}, P_1) = (4,0,4)$ and $(A_2^{(1)}, A_2^{(2)}, P_2) = (4,3,3)$.

In one example of Ex 12-1, $(A_1^{(1)}, A_1^{(2)}, P_1) = (3,0,4)$ and $(A_2^{(1)}, A_2^{(2)}, P_2) = (3,3,3)$.

In one example of Ex 12-2, $(A_1^{(1)}, A_1^{(2)}, P_1) = (3,0,3)$ and $(A_2^{(1)}, A_2^{(2)}, P_2) = (3,2,2)$.

In one example of Ex 12-3, $(A_1^{(1)}, A_1^{(2)}, P_1) = (4,0,P)$ and $(A_2^{(1)}, A_2^{(2)}, P_2) = (4,3,P)$ where $P \in \{2,3,4\}$ or $\{3,4\}$ is configured.

In one example of Ex 12-4, $(A_1^{(1)}, A_1^{(2)}, P_1) = (3,0,P)$ and $(A_2^{(1)}, A_2^{(2)}, P_2) = (3,2,P)$ where $P \in \{2,3,4\}$ or $\{3,4\}$ is configured.

In one example of Ex 12-5, $(A_1^{(1)}, A_1^{(2)}, P_1) = (A,0,P)$ and $(A_2^{(1)}, A_2^{(2)}, P_2) = (A,A-1,P)$ where $P \in \{2,3,4\}$ or $\{3,4\}$ is configured, and $A \in \{2,3\}$ is also configured.

In one example of Ex 12-6, $(A_1^{(1)}, A_1^{(2)}, P_1) = (3,0,P)$ and $(A_2^{(1)}, A_2^{(2)}, P_2) = (3*A, 3-A, P)$ where $P \in \{2,3,4\}$ or $\{3,4\}$ is configured, and $A \in \{0,1\}$ is also configured.

Note that if Ex 12-6 is used for bit allocation, and A=0 is configured, then there is no need for reporting any grouping information (since the quantization is equal-bit), and the quantization scheme reduces to simple scalar quantization scheme (Scheme 1) In other words, the role of parameter A is equivalent to switching between two quantization schemes (Scheme 1 and Scheme 12).

The examples of amplitude and phase codebooks are as in Scheme 11. The rest of the details (components) are according to Scheme 11. In particular, the grouping is according to at least one of alternatives 11-0 to 11-4 (or sub-alternatives therein). Also, the details of size-K0 subset or size-K1 subset selection is applicable in this scheme in a straightforward manner.

In particular, if Alt 11-3-2 is used for grouping (the strongest coefficient (out of 2LM coefficients) is used for grouping), then the group $G_1$ comprises coefficients $c_{l,i,m}$ whose column index m=m*, and the group $G_2$ comprises the rest of the coefficients, where m* is s the column index (FD component) of the strongest coefficient $C_{l,i^*,m^*}$ for layer 1 that is reported by the UE. Then for each SD beam i, there is a common amplitude (e.g. WB amplitude) component $A^{(1)}$. For the stronger group, the amplitude equals this component amplitude. For the weaker group, this common amplitude component is used to obtain a differential amplitude component ($A_2$).

In particular, if m=m*, then $(A_1^{(1)}, A_1^{(2)}, P_1) = (A^{(1)}, 0, P_1)$ bit allocation is used for quantization; and if m≠m*, then $(A_2^{(1)}, A_2^{(2)}, P_2) = (A^{(1)}, A_2, P_2)$ bit allocation is used for quantization.

In one example of Scheme 12A, the reported coefficients are grouped in two groups, $G_1$ and $G_2$, but the grouping information is not reported explicitly by the UE. Rather, the grouping is performed implicitly based on the first amplitude component (e.g., WB amplitude) $p_{l,i}^{(1)}$ for each SD beam $i \in \{0, 1, \ldots, 2L-1\}$. For example, when the stronger group $G_1$ comprises $g_1=1$ coefficient for each SD beam $i \in \{0, 1, \ldots, 2L-1\}$, (i.e., $g_1=2L$ in total, one per SD beams i), then for each SD beam i, the strongest coefficient (out of M coefficients), the one with the maximum amplitude) can be used as reference and its quantized amplitude (using $A^{(1)}$ bits) is used as the first amplitude component (e.g., WB amplitude) $p_{l,i}^{(1)}$ for that SD beam i. The M coefficients of the same SD beam i can then be normalized (divided) by the amplitude of the strongest coefficient, and then quantized using $A^{(2)}$ bits to obtain the second amplitude component $p_{l,i}^{(2)}$ for M coefficients. The phase of all coefficients $\phi_{l,i,m}$ are quantized using P bits.

In summary, each coefficient is quantized and reported as $c_{l,i,m} = p_{l,i}^{(1)} p_{l,i,m}^{(2)} \phi_{l,i,m}$ where: $p_{l,i}^{(1)}$=a first amplitude component (e.g. WB amplitude) that is reported common (a single value) for all M SD coefficients of a SD beam i; $p_{l,i,m}^{(2)}$=a second amplitude component (e.g. SB amplitude) that is reported for each of M SD coefficients of a SD beam i; and $\phi_{l,i,m}$=a phase value that is reported for a SD beam i and FD beam m.

Let $(A^{(1)}, A^{(2)}, P)$ be number of bits to quantize each reported coefficient. Then, a few examples of bit combinations for amplitude and phase reporting are as follows.

In one instance of Ex 12A-0, $(A^{(1)}, A^{(2)}, P) = (4,3,P)$, where $P \in \{2,3,4\}$ or $\{3,4\}$ is configured.

In one instance of Ex 12A-1, $(A^{(1)}, A^{(2)}, P) = (4,2,P)$, where $P \in \{2,3,4\}$ or $\{3,4\}$ is configured.

In one instance of Ex 12A-2, $(A^{(1)}, A^{(2)}, P) = (3,2,P)$, where $P \in \{2,3,4\}$ or $\{3,4\}$ is configured.

In one instance of Ex 12A-3, $(A^{(1)}, A^{(2)}, P) = (3,3,P)$, where $P \in \{2,3,4\}$ or $\{3,4\}$ is configured.

In one instance of Ex 12A-4, $(A^{(1)}, A^{(2)}, P) = (2,2,P)$, where $P \in \{2,3,4\}$ or $\{3,4\}$ is configured.

In one instance of Ex 12A-5, $(A^{(1)}, A^{(2)}, P) = (3,1,P)$, where $P \in \{2,3,4\}$ or $\{3,4\}$ is configured.

In one instance of Ex 12A-6, $(A^{(1)}, A^{(2)}, P) = (2,1,P)$, where $P \in \{2,3,4\}$ or $\{3,4\}$ is configured.

In one instance of Ex 12A-7, $(A^{(1)}, A^{(2)}, P) = (A, A-1, P)$, where $P \in \{2,3,4\}$ or $\{3,4\}$ is configured, and $A \in \{2,3\}$ or $\in \{2,3,4\}$ is also configured.

In one instance of Ex 12A-8, $(A^{(1)}, A^{(2)}, P) = (A, A-2, P)$, where $P \in \{2,3,4\}$ or $\{3,4\}$ is configured, and $A \in \{2,3\}$ or $\in \{2,3,4\}$ is also configured.

In one instance of Ex 12A-9: $(A^{(1)}, A^{(2)}, P) = (A*a, A-\alpha, P)$, where $P \in \{2,3,4\}$ or $\{3,4\}$ is configured, and $\alpha \in \{0,1\}$ is also configured, and A is fixed (e.g., 3 or 4) or configured. Note that if Ex 12A-9 is used for bit allocation, and $\alpha=0$ is configured, then there is first amplitude component that is reported, and the quantization scheme reduces to simple scalar quantization scheme (Scheme 1). In other words, the role of parameter a is equivalent to switching between two quantization schemes (Scheme 1 and Scheme 12A).

The examples of amplitude and phase codebooks are as in Scheme 11. The rest of the details (components) are according to Scheme 11. In particular, the details of size-K0 subset or size-K1 subset selection is applicable in this scheme in a straightforward manner.

In one embodiment of scheme 13, the reported coefficients are grouped into two groups. For example, a first group $G_1$ comprises $g_1$ coefficients. The reported coefficients are quantized as $c_{l,i,m}=p_{l,i,m}^{(1)}p_{l,i,m}^{(2)}\phi_{l,i,m}$, and a second group $G_2$ comprises $g_2$ coefficients. The reported coefficients are quantized as $c_{l,i,m}=p_{l,i,m}\phi_{l,i,m}$ or $p_{l,i,m}^{(1)}p_{l,i,m}^{(2)}\phi_{l,i,m}$ where $p_{l,i,m}^{(1)}=1$.

In one example of Scheme 13A, the grouping is based on SD index i. At least of the following alternatives is used for grouping.

In one example of Alt 13A-0, $g_1$ is fixed (not reported). The UE reports SD indices comprising the first group $G_1$.

In one instance of Ex 13A-0-0, in LTE specification, K value for Type II CSI reporting is used as $g_1$ value, i.e., $g_1=K$. Hence, $g_1=4, 4,$ and 6, for L=2, 3, and 4, respectively. If L=6 is also supported, the K=6 is used.

In one instance of Ex 13A-0-1, $g_1=L$.

In one instance of Ex 13A-0-2, $g_1=2L$.

In one instance of Ex 13A-0-3, $g_1=2L$ for L=2, and $g_1=L$ for L>2.

In one example of Alt 13A-1, the UE reports both $g_1$ and SD indices comprising the stronger group $G_1$. The UE reports number of stronger SD beams $g_1$, where $0<g_1<K$ or $2L$.

In one example of Alt 13A-2, $g_1$ is configured. The UE reports SD indices comprising the stronger group $G_1$.

At least one of the alternatives is used for quantization of the first group.

In one example of Alt 13A-3, for each SD index i in $G_1$, the reported coefficients are quantized as $c_{l,i,m}=p_{l,i,m}^{(1)}p_{l,i,m}^{(2)}\phi_{l,i,m}$. So, the first amplitude value $p_{l,i,m}^{(1)}$ is reported for each SD index i in $G_1$.

In one example of Alt 13A-2, for each SD index in $G_1$, the reported coefficients are quantized as $c_{l,i,m}=p_{l,i,m}^{(1)}p_{l,i,m}^{(2)}\phi_{l,i,m}$. So, a single first amplitude value $p_{l,i,m}^{(1)}$ is reported common for all SD indices i in $G_1$.

In one embodiment of Scheme 13B, the grouping is based on FD index m. At least of the following alternatives is used for grouping.

In one example of Alt 13B-0, $g_1$ is fixed (not reported). The UE reports FD indices comprising the first group $G_1$.

In one instance of Ex 13B-0, $g_1=M$.

In one instance of Ex 13A-0-2, $g_1=\lceil M/2 \rceil$.

In one instance of Ex 13A-0-3, $g_1=M$ for $M \leq M_1$, and $g_1=\lceil M/2 \rceil$ for $M \leq M_1$, where $M_1$ is a fixed number.

In one example of Alt 13B-1, the UE reports both $g_1$ and FD indices comprising the stronger group $G_1$. The UE reports number of stronger FD beams $g_1$, where $0<g_1<M$.

In one example of Alt 13B-2, $g_1$ is configured. The UE reports FD indices comprising the stronger group $G_1$.

At least one of the alternatives is used for quantization of the first group.

In one example of Alt 13B-3, for each FD index m in $G_1$, the reported coefficients are quantized as $c_{l,i,m}=p_{l,i,m}^{(1)}p_{l,i,m}^{(2)}\phi_{l,i,m}$. So, the first amplitude value $p_{l,i,m}^{(1)}$ is reported for each FD index m in $G_1$.

In one example of Alt 13B-2, for each FD index in $G_1$, the reported coefficients are quantized as $c_{l,i,m}=p_{l,m}^{(1)}p_{l,i,m}^{(2)}\phi_{l,i,m}$. So, a single first amplitude value $p_{l,m}^{(1)}$ is reported common for all FD indices m in $G_1$.

In one embodiment of Scheme 13C, the grouping is based on both SD index i and FD index m. At least one of alternatives in Scheme 13A and 14B, or their combinations can be used for grouping and quantization.

In one embodiment of Scheme 13D, the quantization of the first and the second groups are swapped, i.e., a second group $G_2$ comprises $g_2$ coefficients. The reported coefficients are quantized $c_{l,i,m}=p_{l,i,m}^{(1)}p_{l,i,m}^{(2)}\phi_{l,i,m}$; and a first group $G_1$ comprises $g_1$ coefficients. The reported coefficients are quantized $c_{l,i,m}=p_{l,i,m}\phi_{l,i,m}$ or $p_{l,i,m}^{(1)}p_{l,i,m}^{(2)}\phi_{l,i,m}$ where $p_{l,i,m}^{(1)}=1$.

In one embodiment of scheme 14, the reported coefficient ($c_{l,i,m}$) are quantized/reported as $c_{l,i,m}=p_{l,i,m}^{(1)}p_{l,i,m}^{(2)}\phi_{l,i,m}$, where $p_{l,i,m}^{(1)}$ is a "reference" or first amplitude value, $p_{l,i,m}^{(2)}$ is a "differential" or second amplitude value, and $\phi_{l,i,m}$ is a phase value. Let $K_{NZ}$ out of $K_0<2LM$ be number of non-zero coefficients whose amplitude/phase are reported by the UE. At least one of the alternatives is used for the two amplitude values.

In one example of Alt 14-0, there is only one reference amplitude value for all $K_{NZ}$ reported coefficients. In this case, the quantized amplitude can be expressed as $c_{l,i,m}=p_{l,i,m}^{(1)}p_{l,i,m}^{(2)}\phi_{l,i,m}$ where $p_l^{(1)}$ is the reference amplitude value. At least one of the following sub-alternatives is used for the reference amplitude value.

In one example of Alt 14-0-0, the reference amplitude value is indicated (reported) explicitly as part of the CSI report. For example, this reference corresponds to the strongest coefficient out of all ($K_{NZ}$) reported coefficients which is indicated as strongest coefficient indicator. At least one of the following examples is used.

In one instance of Ex 14-0-0-0, the strongest coefficient equals one, and its amplitude and phase are assumed to be one, hence, they are not reported. Note that in this example, $p_l^{(1)}=1$. For the remaining ($K_{NZ}-1$) coefficients, $p_{l,i,m}^{(2)}$ and $\phi_{l,i,m}$ are reported using A2-bit amplitude codebook and P2-bit phase codebook, respectively. In one example, A2 is fixed or configured from 3 or 4. In one example, P2 in configured from 3 or 4.

In one instance of Ex 14-0-0-0, the amplitude and phase of the strongest coefficient (in addition to the indicator) are reported. For the strongest coefficient, $c_{l,i,m}=p_l^{(1)}p_{l,i,m}^{(2)}\phi_{l,i,m}$, i.e., $p_{l,i,m}^{(2)}=1$, and $p_l^{(1)}$ and $\phi_{l,i,m}$ are reported using A1-bit amplitude codebook and P1-bit phase codebook, respectively. For the remaining ($K_{NZ}-1$) coefficients, $c_{l,i,m}=p_l^{(1)}p_{l,i,m}^{(2)}\phi_{l,i,m}$, i.e., $p_{l,i,m}^{(2)}$ and $\phi_{l,i,m}$ are reported using A2-bit amplitude codebook and P2-bit phase codebook, respectively, and $p_l^{(1)}$ is as reported for the strongest coefficient. In one example, A1 is fixed or configured from 3 or 4. In one example, P1 in configured from 3 or 4. In one example, A2 is fixed or configured from 2 or 3. In one example, P2 in configured from 2 or 3 or 4.

In one example of Alt 14-0-1, the reference amplitude value may or may not correspond to the strongest coefficient out of all reported coefficients, and hence there is no such explicit indication in the CSI report. For example, the reference amplitude value $p_l^{(1)}$ is reported using a A1-bit amplitude codebook, and for all $K_{NZ}$ coefficients, $p_{l,i,m}^{(2)}$ and $\phi_{l,i,m}$ are reported using A2-bit amplitude codebook and P2-bit phase codebook, respectively. In one example, A1 is fixed or configured from 3 or 4. In one example, A2 is fixed or configured from 2 or 3. In one example, P2 in configured from 2 or 3 or 4.

In one example of Alt 14-0-2, the strongest coefficient (out of $K_{NZ}$ coefficients) is indicated/reported as part of the CSI report. Note that the strongest coefficient equals one, i.e., its amplitude and phase are one, hence, they are not reported. The remaining ($K_{NZ}-1$) coefficients are quantized/reported according to at least one of the following examples.

In one instance of Ex 14-0-2-0, the reference is indicated (reported) explicitly as part of the CSI report. This indication indicates a coefficient out of $K_{NZ}-1$ coefficients which serves as a reference. The amplitude and phase of the reference (in addition to the indicator) are reported. For the reference coefficient, $c_{l,i,m}=p_l^{(1)}\phi_{l,i,m}$, i.e., $p_{l,i,m}^{(2)}=1$, and $p_l^{(1)}$ and $\phi_{l,i,m}$ are reported using A1-bit amplitude codebook and P1-bit phase codebook, respectively.

For the remaining ($K_{NZ}-2$) coefficients, $c_{l,i,m}=p_l^{(1)}p_{l,i,m}^{(2)}\phi_{l,i,m}$, i.e., $p_{l,i,m}^{(2)}$ and $\phi_{l,i,m}$ are reported using A2-bit amplitude codebook and P2-bit phase codebook, respectively, and $p_l^{(1)}$ is as reported for the reference coefficient. In one example, A1 is fixed or configured from 3 or 4. In one example, P1 in configured from 3 or 4. In one example, A2 is fixed or configured from 2 or 3. In one example, P2 in configured from 2 or 3 or 4. Also, the indication of the strongest coefficient and the reference can be joint (i.e., they are reported together using one indication for both or two separate indications, but they are reported in the same UCI part, e.g., UCI part 2), or separate (two separate indications, which can be in two different UCI parts, e.g. one in UCI part 1 and the other in UCI part 2).

In one instance of Ex 14-0-2-1, the reference is not reported explicitly in the CSI report (as in previous example). The reference amplitude value $p_l^{(1)}$ is reported using a A1-bit amplitude codebook, and for all $K_{NZ}-1$ coefficients, $p_{l,i,m}^{(2)}$ and $\phi_{l,i,m}$ are reported using A2-bit amplitude codebook and P2-bit phase codebook, respectively. In one example, A1 is fixed or configured from 3 or 4. In one example, A2 is fixed or configured from 2 or 3. In one example, P2 in configured from 2 or 3 or 4.

In one example of Alt 14-1, the set of all $K_{NZ}$ reported coefficients is partitioned into two groups, $G_1$ and $G_2$, and coefficients in each group is quantized/reported as $c_{l,i,m}=p_l^{(1)}p_{l,i,m}^{(2)}\phi_{l,i,m}$ where a reference amplitude value $p_l^{(1)}$ is determined/reported independently for each group. The quantization/reporting of coefficients in each group is according to at least one sub-alternatives or examples in Alt 14-0. In particular, when the strongest coefficient is reported as part of the CSI report and it is also used as reference, then it is used as reference for only one of the two groups. Regarding the two groups, at least one of the following sub-alternatives is used.

In one example of Alt 14-1-0, the two groups correspond to the two antenna polarizations (assuming a dual-polarized antenna port at the gNB). Assuming SD index $i=0, 1, \ldots L-1$ corresponds to one antenna polarization and $i=L, L+1, \ldots 2L-1$ corresponds to another antenna polarization, the two groups of coefficients correspond to $G_1$ comprising coefficients such that $i\in\{0, 1, \ldots, L-1\}$, and $G_2$ comprising coefficients such that $i\in\{L, L+1, \ldots, 2L-1\}$.

In one example of Alt 14-1-1, the group $G_1$ comprises coefficients $c_{l,i,m}$ such that $i\in T_1$, and $G_2$ comprising coefficients $c_{l,i,m}$ such that $i\in T_2=T\backslash T_1$, where $T_1$ is a subset of $T=\{0, 1, 2, \ldots, 2L-1\}$, and $T_2=T\backslash T_1$ is a remaining subset, i.e., index i that are not in $T_1$. The rest of the details are the same as in Scheme 13A.

In one example of Alt 14-1-2, the groups are selected freely. That is, the group $G_1$ comprising $g_1$ coefficients is selected out all $K_{NZ}$ coefficients freely, and the group $G_2$ comprising $g_2$ coefficients corresponds to the remaining $K_{NZ}-g_1$ coefficients. The rest of the details are the same as in scheme 15.

In Alt 14-2, the set of all $K_{NZ}$ reported coefficients is partitioned into L groups, $G_1 \ldots G_L$, and coefficients in each group is quantized/reported as $c_{l,i,m}=p_l^{(1)}p_{l,i,m}^{(2)}\phi_{l,i,m}$ where a reference amplitude value $p_l^{(1)}$ is determined/reported independently for each group. The quantization/reporting of coefficients in each group is according to at least one sub-alternatives or examples in Alt 14-0. In particular, when the strongest coefficient is reported as part of the CSI report and it is also used as reference, then it is used as reference for only one of the L groups. Regarding the L groups, at least one of the following sub-alternatives is used.

In one example of Alt 14-2-0, the L groups are determined based on the L SD basis vectors that are used common for the two antenna polarizations. Assuming SD index $i=0, 1, \ldots L-1$ corresponds to one antenna polarization and $i=L, L+1, \ldots 2L-1$ corresponds to another antenna polarization, the j-th group of coefficients correspond to $G_j$ comprising coefficients $c_{l,i,m}$ such that $i\in\{j-1, j+L-1\}$, where $j\in\{1, \ldots, L\}$.

In one example of Alt 14-2-1, the group $G_j$ comprises coefficients $c_{l,i,m}$ such that $i\in T_j$, where $T_j$ is a subset of $T=\{0, 1, 2, \ldots, 2L-1\}$ such that union of all $T_j$ equals T, and $T_j$ and $T_p$ are disjoint (not common element) for all $j\neq k$. The rest of the details are the same as in scheme 13A.

In one example of Alt 14-2-2, the groups are selected freely. That is, the group $G_j$ comprising $g_j$ coefficients is selected out all $K_{NZ}$ coefficients freely. The rest of the details are the same as in scheme 15.

In one embodiment of scheme 15, the reported coefficients are grouped into multiple groups, which are sorted (ordered) based on power (amplitude). The coefficients in each group is) reported as $c_{l,i,m}=p_{l,i,m}^{(1)}p_{l,i,m}^{(2)}\phi_{l,i,m}$ where $p_{l,i,m}^{(1)}$ is a reference or first amplitude value and $p_{l,i,m}^{(2)}$ is a differential or second amplitude value (as explained in scheme 14). The reference amplitude value for a group is obtained from another group which is higher in power (amplitude). For example, the reference amplitude equals the minimum amplitude reported for a group immediately higher in power. At least following alternatives is used.

In one example of Alt 15-0, the reported coefficients are grouped into two groups $G_1$ comprising $g_1$ coefficients and $G_2$ comprising $g_2=K_{NZ}-g_1$ coefficients. Each coefficient in $G_1$ is reported as $c_{l,i,m}=p_{l,i,m}^{(1)}p_{l,i,m}^{(2)}\phi_{l,i,m}$ according to at least one of the following sub-alternatives.

In one example of Alt 15-0-0, the strongest coefficient (out of $K_{NZ}$ coefficients) is reported explicitly, and it equals one. The strongest coefficient acts as reference for $G_1$, i.e., $p_{l,i,m}^{(1)}=1$, i.e., reference amplitude is not reported. The differential amplitude $p_{l,i,m}^{(2)}$ and phase $\phi_{l,i,m}$ for $g_1$ coefficients are reported using A2 bit amplitude codebook and P2 bit phase codebook, respectively. In one example, A2 is fixed or configured from 2 or 3. In one example, P2 is fixed or configured from 2 or 3 or 4.

In one example of Alt 15-0-1, the reference $p_{l,i,m}^{(1)}$ for $G_1$ is reported explicitly using A1 bit amplitude codebook. In one example, A1 is fixed or configured from 3 or 4. The differential amplitude $p_{l,i,m}^{(2)}$ and phase $\phi_{l,i,m}$ for $g_1$ coefficients are reported using A2 bit amplitude codebook and P2 bit phase codebook, respectively. In one example, A2 is fixed or configured from 2 or 3. In one example, P2 is fixed or configured from 2 or 3 or 4.

In one example of Alt 15-0-2, one out of $g_1$ coefficients is used as reference, and its index is explicitly indicated. The amplitude $p_{l,i,m}^{(1)}$ and phase $\phi_{l,i,m}$ of this reference are reported using A1 bit amplitude codebook and A2 P1 bit phase codebook. In one example, A1 is fixed or configured from 3 or 4. In one example, P1 is fixed or configured from 3 or 4. The differential) amplitude $p_{l,i,m}^{(2)}$ and phase $\phi_{l,i,m}$ for remaining $g_1-1$ coefficients are reported using A2 bit amplitude codebook and P2 bit phase codebook, respectively. In one example, A2 is fixed or configured from 2 or 3. In one example, P2 is fixed or configured from 2 or 3 or 4. The reference amplitude $p_{l,i,m}^{(2)}$ for these remaining $g_1-1$ coefficients equal $p_{l,i,m}^{(1)}$ reported for the reference coefficient.

Each coefficient in $G_2$ is reported as $c_{l,i,m}=p_{l,i,m}^{(1)}p_{l,i,m}^{(2)}\phi_{l,i,m}$ where: the reference amplitude $p_{l,i,m}^{(1)}$ for $g_2$ coefficients in $G_2$ equals the minimum of $p_{l,i,m}^{(1)}p_{l,i,m}^{(2)}$ or minimum of $p_{l,i,m}^{(2)}$ for the coefficients in $G_1$; and the differential amplitude $p_{l,i,m}^{(1)}$ and phase $\phi_{l,i,m}$ for $g_2$ coefficients in $G_2$ are reported using A2 bit amplitude codebook and P2 bit phase codebook, respectively. In one example, A2 is fixed or configured from 2 or 3. In one example, P2 is fixed or configured from 2 or 3 or 4.

The values $g_1$ and $g_2$ are according to at least one of the following alternatives.

In one example of Alt 15-0-3, the values $g_1$ is fixed and $g_2 = K_{NZ} - g_1$.

In one example of Alt 15-0-4, the values $g_1$ is configured and $g_2 = K_{NZ} - g_1$.

In one example of Alt 15-0-5, the values $g_1$ is reported and $g_2 = K_{NZ} - g_1$.

In Alt 15-1, the reported coefficients are grouped into two groups $G_1$ comprising $g_1$ coefficients and $G_2$ comprising $g_2 = K_{NZ} - g_1$ coefficients. The coefficients in $G_1$ are reported as $c_{l,i,m} = p_{l,i,m}^{(1)} p_{l,i,m}^{(2)} \phi_{l,i,m}$ where the group $G_1$ is reported according to at least one of Alt 15-0-0) through Alt 15-0-2. The coefficients in $G_2$ are reported $c_{l,i,m} = p_{l,i,m}^{(1)} p_{l,i,m}^{(2)} \phi_{l,i,m}$ where $p_{l,i,m}^{(1)}$ and $\phi_{l,i,m}$ are determined/reported as explained in Alt 15-0. The differential amplitude $p_{l,i,m}^{(2)}$, however, is reported common for all $g_2$ coefficients in $G_2$, i.e., a single differential amplitude $p_{l,i,m}^{(2)}$ is reported for all coefficients in $G_2$. In one example, such differential coefficients represent an average differential amplitude. The values $g_1$ and $g_2$ are according to at least one alternative Alt 15-0-3 through Alt 15-0-5.

In Alt 15-3, the reported coefficients are grouped into three groups $G_1$ comprising $g_1$ coefficients, $G_2$ comprising $g_2$ coefficients, and $G_3$ comprising $g_3 = K_{NZ} - g_1 - g_2$ coefficients. The coefficients in $G_1$ are reported as $c_{l,i,m} = p_{l,i,m}^{(1)} p_{l,i,m}^{(2)} \phi_{l,i,m}$ where the group $G_1$ is reported according to at least one of Alt 15-0-0 through Alt 15-0-2. The coefficients in $G_2$ are reported $c_{l,i,m} = p_{l,i,m}^{(1)} p_{l,i,m}^{(2)} \phi_{l,i,m}$ as explained in Alt 15-0. The coefficients in $G_3$ are reported $c_{l,i,m} = p_{l,i,m}^{(1)} p_{l,i,m}^{(2)} \phi_{l,i,m}$ where $p_{l,i,m}^{(1)}$ and $\phi_{l,i,m}$ are determined/reported as explained in Alt 15-0. The differential amplitude $p_{l,i,m}^{(2)}$, however, is reported common for all $g_3$ coefficients in $G_3$, i.e., a single differential amplitude $p_{l,i,m}^{(2)}$ is reported for all coefficients in $G_3$. In one example, such differential coefficients represent an average differential amplitude. The values $g_1$, $g_2$, and $g_3$ are according to at least one alternative Alt 15-0-3 through Alt 15-0-5.

Let $K_{NZ}$ be the number of reported non-zero (NZ) coefficients (which for example are reported using a bitmap) for layer l. It may denote the LC coefficient associated with SD beam $i \in \{0, 1, \ldots, 2L-1\}$ and FD unit (component) $m \in \{0, 1, \ldots, M-1\}$ as $c_{l,i,m}$, and let the strongest coefficient (out of the $K_{NZ}$ NZ coefficients) as $c_{l^*,m^*}$.

In one embodiment of scheme 16, the amplitude of the $K_{NZ}$ coefficients is then quantized)) and reported as $p_{l,i,m}^{(1)} p_{l,i,m}^{(2)}$, where $p_{l,i,m}^{(1)}$ is a reference or first amplitude value and $p_{l,i,m}^{(2)}$ is a differential or second amplitude value (as explained in Scheme 14). At least one of the following alternatives is used.

In one example of Alt 16-0, there is no specific indicator in the UCI (such as an indicator indicating the strongest coefficient=1 out of the $K_{NZ}$ coefficients, which normalizes the remaining) $K_{NZ} - 1$ coefficients). For each SD beam $i \in \{0, 1, \ldots, 2L-1\}$: a reference amplitude $p_{l,i,m}^{(1)} = p_{l,i}^{(1)}$ is reported, which is common for all NZ coefficients $\{c_{l,i,m}\}$ have the same SD beam index i; and a differential amplitude $p_{l,i,m}^{(2)}$ is reported for each NZ coefficient that has the same FD beam index i. So, there is up to M+1 amplitudes reported for each SD beam i. In total, there is up to 2L reference amplitudes and up to $K_{NZ}$ differential amplitudes are reported.

In one example of Alt 16-1, there is no specific indicator in the UCI (such as an indicator indicating the strongest coefficient=1 out of the $K_{NZ}$ coefficients, which normalizes the remaining $K_{NZ} - 1$ coefficients). For each antenna polarization $p \in \{0,1\}$, where p=0 corresponds to $i \in \{0, 1, \ldots, L-1\}$ and p=1 corresponds to $i \in \{L, L+1, \ldots, 2L-1\}$: a reference amplitude $p_{l,i,m}^{(1)}$ is reported, which is common for all NZ coefficients $\{c_{l,i,m}\}$ that have the same antenna polarization p; and a differential amplitude $p_{l,i,m}^{(2)}$ is reported for each NZ coefficient that has the same antenna polarization p.

In total, up to 2 reference amplitudes and up to $K_{NZ}$ differential amplitudes are reported.

In one example of Alt 16-2, there is a strongest reference amplitude indicator reported in the UCI which is indicated using $\lceil \log_2 2L \rceil$ bits. In one example, the strongest reference amplitude indicator indicates an index of the SD beam i* whose reference amplitude=1. For the SD beam i*, a reference amplitude $p_{l,i,m}^{(1)} = p_{l,i,m}^{(2)}$ is not reported, and a differential amplitude $p_{l,i,m}^{(2)}$ is reported for each NZ coefficient that has the same FD beam index i*. For remaining SD beams $i \in \{0, 1, \ldots, 2L-1\}$, such that $i \neq i^*$: a reference amplitude $p_{l,i,m}^{(1)} = p_{l,i}^{(1)}$ is reported, which is common for all NZ coefficients $\{c_{l,i,m}\}$ have the same SD beam index i; and a differential amplitude $p_{l,i,m}^{(2)}$ is reported for each NZ coefficient that has the same FD beam index i.

For SD beam i*, up to M amplitudes are reported, and for each SD beam $i \neq i^*$, up to M+1 amplitudes are reported. In total, up to 2L-1 reference amplitudes and up to $K_{NZ}$ differential amplitudes are reported.

In one example of Alt 16-3, there is a strongest reference amplitude indicator reported in the UCI which is indicated using 1 bit. In one example, the strongest reference amplitude indicator indicates an antenna polarization index $p^* \in \{0,1\}$, whose reference amplitude=1, where p=0 corresponds to $i \in \{0, 1, \ldots, L-1\}$ and p=1 corresponds to $i \in \{L, L+1, \ldots, 2L-1\}$. For coefficients with polarization p*, a reference amplitude $p_{l,i,m}^{(1)}$ is not reported, and a differential) amplitude $p_{l,i,m}^{(2)}$ is reported for each NZ coefficient that has the same antenna polarization p*.

For $p \neq p^*$, a reference amplitude $p_{l,i,m}^{(1)}$ is reported, which is common for all NZ coefficients $\{c_{l,i,m}\}$ that have the same antenna polarization p, and a differential amplitude $p_{l,i,m}^{(2)}$ is reported for each NZ coefficient that has the same antenna polarization p.

In total, up to 1 reference amplitude and up to $K_{NZ}$ differential amplitudes are reported.

In one example of Alt 16-4, there is a strongest coefficient $c_{l^*,m^*}$ indicator reported in the UCI which is indicated using $\lceil \log_2 K_{NZ} \rceil$ bits. In one example, the strongest coefficient indicator indicates an index (l*, m*) of the strongest NZ coefficient whose amplitude=1 and which normalizes the remaining $K_{NZ} - 1$ coefficients. For the SD beam i*, a reference amplitude $p_{l,i,m}^{(1)} = p_{l,i}^{(1)}$ is not reported, and a differential amplitude $p_{l,i,m}^{(2)}$ is reported for each NZ coefficient that has the same FD beam index i*.

For remaining SD beams $i \in \{0, 1, \ldots, 2L-1\}$, such that $i \neq i^*$, a reference amplitude $p_{l,i,m}^{(1)} = p_{l,i}^{(1)}$ is reported, which is common for all NZ coefficients $\{c_{l,i,m}\}$ have the same SD beam index i, and a differential amplitude $p_{l,i,m}^{(2)}$ is reported for each NZ coefficient that has the same FD beam index i.

For SD beam i*, up to M amplitudes are reported, and for each SD beam $i \neq i^*$, up to M+1 amplitudes are reported. In total, up to 2L-1 reference amplitudes and up to $K_{NZ}$ differential amplitudes are reported. Optionally, since the location of the strongest coefficient is explicitly indicated with the $\lceil \log_2 K_{NZ} \rceil$-bit indicator, there is no need for including the differential amplitude $p_{l,i^*,m^*}^{(2)}$ (since the location is known and the value is 1). Therefore, in total, up to (2L−1) reference amplitudes and up to ($K_{NZ}$−1) differential amplitudes can be reported.

In one example of Alt 16-5, there is a strongest coefficient indicator reported in the UCI which is indicated using $\lceil \log_2 K_{NZ} \rceil$ bits. In one example, the strongest coefficient indicator indicates an index (l*, m*) of the strongest NZ coefficient whose amplitude=1 and which normalizes the remaining $K_{NZ}$−1 coefficients. Let p* be the antenna polarization of the strongest coefficient $c_{l^*,m^*}$.

For coefficients with polarization p*, a reference amplitude $p_{l,i,m}^{(1)}$ is not reported, and a differential amplitude $p_{l,i,m}^{(2)}$ is reported for each NZ coefficient that has the same antenna polarization p*. For p≠p*, a reference amplitude $p_{l,i,m}^{(1)}$ is reported, which is common for all NZ coefficients $\{c_{l,i,m}\}$ that have the same antenna polarization p, and a differential amplitude $p_{l,i,m}^{(2)}$ is reported for each NZ coefficient that has the same antenna polarization p.

In total, up to 1 reference amplitude and up to $K_{NZ}$ differential amplitudes are reported. Optionally, since the location of the strongest coefficient is explicitly indicated with the $\lceil \log_2 K_{NZ} \rceil$-bit indicator, there is no need for including the differential amplitude $p_{l,i^*,m^*}^{(2)}$ (since the location is known and the value is 1). Therefore, in total, up to 1 reference amplitude and up to ($K_{NZ}$−1) differential amplitudes can be reported.

In one example of Alt 16-6, there is a strongest coefficient $c_{l^*,m^*}$ indicator reported in the UCI which is indicated using $\lceil \log_2 K_{NZ} \rceil$ bits. In one example, the strongest coefficient indicator indicates an index (l*, m*) of the strongest NZ coefficient whose amplitude=1 and which normalizes the remaining $K_{NZ}$−1 coefficients. Let p* be the antenna polarization of the strongest coefficient $c_{l^*,m^*}$.

For remaining coefficients with polarization p=p* (i.e., all NZ coefficients with polarization p=p* but not including the strongest coefficient): a reference amplitude $p_{l,i,m}^{(1)}$ is reported, which is common for all NZ coefficients $\{c_{l,i,m}\}$ that have the same antenna polarization p; and a differential amplitude $p_{l,i,m}^{(2)}$ is reported for each NZ coefficient (not equal to the strongest coefficient) that has the same antenna polarization p.

For coefficients with polarization p≠p*, a reference amplitude $p_{l,i,m}^{(1)}$ is reported, which is common for all NZ coefficients $\{c_{l,i,m}\}$ that have the same antenna polarization p, and a differential amplitude $p_{l,i,m}^{(2)}$ is reported for each NZ coefficient that has the same antenna polarization p.

In total, up to 2 reference amplitudes and up to $K_{NZ}$ differential amplitudes are reported. Optionally, since the location of the strongest coefficient is explicitly indicated with the $\lceil \log_2 K_{NZ} \rceil$-bit indicator, there is no need for including the differential amplitude $p_{l,i^*,m^*}^{(2)}$ (since the location is known and the value is 1). Therefore, in total, up to 2 reference amplitudes and up to ($K_{NZ}$−1) differential amplitudes can be reported.

In one example of Alt 16-7, this alternative is the same as Alt 16-5 except that the reference amplitude is amplitude of a reference NZ coefficient ($c_{l,i,m}$) where the location (i, m) of $c_{l,i,m}$ is determined according to at least one of the following alternatives.

In one example of Alt 16-7-0, the location (i, m) is such that m=m* and i=(i*+L) mod 2L, i.e., the reference NZ coefficient has the same FD component index as the strongest coefficient, and has SD beam index which corresponds to the same SD beam as the strongest coefficient but different antenna polarization. Note that two coefficients with SD beam indices i and (i*+L) mod 2L correspond to the same SD beam applied at the two antenna polarizations. Note that there is no need for any additional indication (reporting) to report the location (index) of this reference NZ coefficient.

In one example of Alt 16-7-1, the location (i, m) is such that m=m* and the SD index i is reported by the UE using $\lceil \log_2 L \rceil$ bits.

In one example of Alt 16-7-2, the location (i, m) is reported by the UE using $\lceil \log_2 K_{NZ,p} \rceil$ bits where $K_{NZ,p}$ equals number of NZ coefficients (reported via bitmap) with the same antenna polarization p.

The differential amplitude of the reference NZ coefficient is not reported. In total, up to 1 reference amplitude and up to $K_{NZ}$−1 differential amplitudes are reported. Optionally, since the location of the strongest coefficient is explicitly indicated with the $\lceil \log_2 K_{NZ} \rceil$-bit indicator, there is no need for including the differential amplitude $p_{l,i^*,m^*}^{(2)}$ (since the location is known and the value is 1). Therefore, in total, up to 1 reference amplitude and up to ($K_{NZ}$−2) differential amplitudes can be reported.

In one example of Alt 16-8, this alternative is the same as Alt 16-6 except that the reference amplitude for polarization p* is amplitude of a reference NZ coefficient which is not the strongest coefficient, and the reference amplitude for other polarization p'≠p* is amplitude of a reference NZ coefficient ($c_{l,i',m'}$), where the location (i, m) of $c_{l,i,m}$ and the location (i',m') of are according to at least one of the following alternatives.

In one example of Alt 16-8-0, the location (i, m) and (i', m') are such that m=m'=m* and i'=(i*+L) mod 2L. Note that there is no need for any additional indication (reporting) to report the location (index) of the reference NZ coefficient ($c_{l,i',m'}$). The index i is either fixed (e.g. i≠i* that is SD index of maximum number of NZ coefficients, where information about maximum number of NZ coefficients can be obtained from the bitmap indicating the location of NZ coefficients) or is indicated (reported) by the UE using $\lceil \log_2(L-1) \rceil$ bits.

In one example of Alt 16-8-1, the location (i, m) and (i', m') are such that m=m'=m* and the SD indices i and i' are reported by the UE using $\lceil \log_2(L-1) \rceil$ and $\lceil \log_2 L \rceil$ bits, respectively (if reported separately) or by using $$\left\lceil \log_2 \binom{2L-1}{2} \right\rceil$$

(if reported jointly).

In one example of Alt 16-8-2, the location (i, m) and (i', m') are reported by the UE using $\lceil \log_2 K_{NZ,p^*} \rceil$ and $\lceil \log_2 K_{NZ,p'} \rceil$ bits, respectively where $K_{NZ,p}$ equals number of NZ coefficients (reported via bitmap) with the same antenna polarization p.

The differential amplitude of the two reference NZ coefficients is not reported. In total, up to 2 reference amplitudes and up to $K_{NZ}$−2 differential amplitudes are reported. Optionally, since the location of the strongest coefficient is explicitly indicated with the $\lceil \log_2 K_{NZ} \rceil$-bit indicator, there is no need for including the differential amplitude $p_{l,i^*,m^*}^{(2)}$ (since the location is known and the value is 1). Therefore, in total, up to 2 reference amplitudes and up to ($K_{NZ}$−3) differential amplitudes can be reported.

In one example of Alt 16-9, this alternative is the same as Alt 16-3 except that for polarization p≠p*, the reference amplitude is amplitude of a reference NZ coefficient ($c_{l,i,m}$) where the location (i, m) of $c_{l,i,m}$ is determined according to at least one of the following alternatives.

In one example of Alt 16-9-0, the location (i, m) is reported by the UE, for example, by using $\lceil \log_2 K_{NZ,p} \rceil$ bits indication where $K_{NZ,p}$ equals number of NZ coefficients (reported via bitmap) with the same antenna polarization p.

In one example of Alt 16-9-1, the location (i, m) is not reported by the UE explicitly, but is derived based on other CSI component reported by the UE, for example, based on the bitmap reported by the UE to indicate the location of NZ coefficients.

In one example of Alt 16-9-2, the index i is not reported by the UE explicitly, but is derived based on other CSI component reported by the UE, for example, based on the bitmap reported by the UE to indicate the location of NZ coefficients, and the index m is reported by the UE, for example, by using $\lceil \log_2 M \rceil$ bits indication.

In one example of Alt 16-9-3, the index m is not reported by the UE explicitly, but is derived based on other CSI component reported by the UE, for example, based on the bitmap reported by the UE to indicate the location of NZ coefficients, and the index i is reported by the UE, for example, by using $\lceil \log_2 2L \rceil$ bits indication.

The differential amplitude of the reference NZ coefficient is not reported. In total, up to 1 reference amplitude and up to $K_{NZ}-1$ differential amplitudes are reported.

In one example of Alt 16-10, this alternative is the same as Alt 16-1 except that for the two polarizations p and p', the reference amplitudes are amplitudes of reference NZ coefficients $c_{l,i,m}$ and where the location (i, m) of and (i', m') of $c_{l,i',m'}$ are determined according to at least one of the following alternatives.

In one example of Alt 16-10-0, the locations (i, m) and (i', m') are reported by the UE, for example, by using $\lceil \log_2 K_{NZ,p} \rceil$ and $\lceil \log_2 K_{NZ,p'} \rceil$ bits, respectively where $K_{NZ,p}$ equals number of NZ coefficients (reported via bitmap) with the same antenna polarization p.

In one example of Alt 16-10-1, the index i=i' is reported by the UE using $\lceil \log_2 2L \rceil$ bits, and the indices m and m' are reported by the UE using $$\left\lceil \log_2 \binom{M}{2} \right\rceil$$

bits.

In one example of Alt 16-10-2, the index m=m' is reported by the UE using $\lceil \log_2 M \rceil$ bits, and the indices i and i' are reported by the UE using $$\left\lceil \log_2 \binom{2L}{2} \right\rceil$$

bits.

In one example of Alt 16-10-3, the index i=i' is not reported and is derived based on the bitmap indicating location of NZ coefficients, and the indices m and m' are reported by the UE using $$\left\lceil \log_2 \binom{M}{2} \right\rceil$$

bits.

In one example of Alt 16-10-4, the index m=m' is not reported and is derived based on the bitmap indicating location of NZ coefficients, and the indices i and are reported by the UE using $$\left\lceil \log_2 \binom{2L}{2} \right\rceil$$

bits.

In one example of Alt 16-10-5, the locations (i, m) and (i', m') are not reported and are derived based on the bitmap indicating location of NZ coefficients.

The differential amplitudes of the two reference NZ coefficients are not reported. In total, up to 2 reference amplitudes and up to $K_{NZ}-2$ differential amplitudes are reported.

In one example of Alt 16-11, this alternative is the same as Alt 16-5, or Alt 16-6, or Alt 16-7, or Alt 16-8 except that the number of bits ($B_{D1}$) to report differential amplitude for the NZ coefficients whose FD index m=m* (i.e., the same as that for the strongest coefficient) is larger than the number of bits ($B_{D2}$) to report differential amplitude for the coefficients whose FD index m≠m*. In one example, $B_{D1}-B_{D2}=1$. For example, $(B_{D1},B_{D2})=(4,3)$.

In one example, "up to" in above alternatives is used to indicate that some of the coefficients or amplitudes can be zero.

In one example, it is assumed that one of the reference amplitudes corresponds to the amplitude $|c_{l*,m*}|$ of the strongest coefficient.

In one example, the coefficient with known index (l*, m*) (e.g. the strongest coefficient) is assumed to be one (hence its amplitude and phase are not reported)

It may be assumed that reference amplitudes are quantized using $B_R$ bits, and differential amplitudes are quantized using to $B_D$ bits. Then at least one of the following alternatives is used.

In one example of Alt 16-6, both $B_R$ and $B_D$ are fixed, e.g. $(B_R, B_D)=(1,3)$, or (2,3), or (3,3), or (4,3) or (4,2).

In one example of Alt 16-7, $B_R$ is fixed (e.g. $B_R=4$ or 3 or 2 or 1) and $B_D$ is higher layer configured, e.g. $B_R$ is configured from 2 or 3.

In one example of Alt 16-8, $B_R$ is configured (e.g. $B_R$ is configured from 4 or 3 or 2 or 1) and $B_D$ is fixed (e.g. $B_D=2$ or 3).

In one example of Alt 16-9, $B_R$ is both $B_R$ and $B_D$ are configured, e.g. from $(B_R,B_D)=(1,3)$, or (2,3), or (3,3), or (4,3) or (4,2).

The phase of the $K_{NZ}$ coefficients is quantized and reported according to some alternatives in scheme 13 through 15. Also, for Alt 16-0, Alt 16-1, Alt 16-2, or, Alt 16-3, up to $K_{NZ}$ phase values are reported. For Alt 16-4 through Alt 16-8, since the location is the strongest coefficient is explicitly indicated with the $\lceil \log_2 K_{NZ} \rceil$-bit indicator, there is no need for including the phase (since the location is known and the value is 1). Therefore, in total, up to $K_{NZ}-1$ phase values are reported.

In one example, the phase values are reported using a P-bit phase codebook where P is either fixed (e.g. to P=3 or 4), or P is higher layer configured from 3 (8PSK) and 4 (16PSK).

In one embodiment of X, if multiple quantization schemes (as provided in the present disclosure) can be used for quantization, then one of them is used for quantization according to at least one of the following alternatives.

In one example of Alt X-0, one of the multiple quantization schemes is used based on a condition or rule. For example, the condition (rule) can be based on at least one of parameters L, M, or $K_0$.

In one example of Alt X-1, one of the multiple quantization schemes is configured to the UE, e.g., via higher layer RRC signalling.

In one example of Alt X-2, one of the multiple quantization schemes is reported (recommended) by the UE.

In one embodiment of Y, an A-bit amplitude codebook (used to quantized amplitude or reference amplitude or differential amplitude of coefficients is according to at least one of the alternatives.

In one example of Alt Y-0, the A-bit amplitude codebook comprises $2^A$ amplitude values, where all values are greater than zero.

In one example of Alt Y-1, the A-bit amplitude codebook comprises $2^A$ amplitude values, where $2^A-1$ values are greater than zero and the one value equals zero.

In one example of Alt Y-2, the A-bit amplitude codebook comprises $2^A+1$ amplitude values, where $2^A$ values are greater than zero and the one value equals zero.

If a UE is configured to report a maximum of $K_0$ number of coefficients, where $K_0<2LM$, then the reports the indices of the $K_0$ coefficients out of a total 2LM coefficients (that comprise coefficient matrix $C_l$). For example, such an indication can be via a bitmap, where for example, the length of the bitmap can be 2LM. If a bit of the bitmap is one, then corresponding coefficient is reported by the UE, and if a bit of the bitmap is zero, then then corresponding coefficient is not reported by the UE (the corresponding coefficient is assumed to be zero). Let S be a set of $K_0$ coefficients which can be quantized/reported by the UE.

Now, if the UE uses an amplitude codebook as in Alt Y-1 or Alt Y-2 (which includes zero as a candidate value) to quantize amplitudes of $K_0$ coefficients in the set S, and if an amplitude of a coefficient (x) in the set S is quantized to the candidate value zero, then the UE reports that coefficient (x) according to one of the following alternatives.

In one example of Alt Y-A, the UE doesn't report (amplitude or phase) of the coefficient (x), and sets the corresponding bit in the bitmap to zero to indicate that the coefficient (x) is quantized to zero indicating that amplitude/phase of coefficients (x) is not reported. Note that the number of ones (indicating number of reported non-zero coefficients) in the bitmap can be less than $K_0$.

In one example of Alt Y-B, the UE report a zero amplitude for the coefficient (x), and keeps the corresponding bit in the bitmap to one to indicate that the coefficient (x) is quantized/reported. The phase of the coefficients (x) may or may not be reported. Note that the number of ones (indicating number of reported zero or non-zero coefficients) in the bitmap equals $K_0$.

Now, if the UE uses an amplitude codebook as in Alt Y-0 (which does not include zero as a candidate value) to quantize amplitudes of $K_0$ coefficients in the set S, and if an amplitude of a coefficient (x) in the set S is below (less than, or less or equal to) a certain threshold value (y), then the UE reports that coefficient (x) according to one of the alternatives, Alt Y-A and Alt Y-B. In one example, the threshold value $$x = \left(\frac{1}{2}\right)^{\frac{2^{A+1}-1}{Z}}$$

where Z=4 or 8.

If A=4, then the amplitude codebook $C_{Amp}$ is at least one of the following.

In one example, if Alt Y-0 is used as amplitude codebook, then $C_{Amp} = \{\sqrt[4]{1/x^{15}}, \ldots, \sqrt[4]{1/x^3}, \sqrt[4]{1/x^2\sqrt{1/x}}, 1\}$ or $$\left\{\left(\frac{1}{2^{15}}\right)^{\frac{1}{4}}, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{\left(\frac{1}{2}\right)^{\frac{15}{4}}, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

Note that $$\left\{\left(\frac{1}{2^{15}}\right)^{\frac{1}{4}}, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\}$$

is equivalent to $$\left\{\left(\frac{1}{32768}\right)^{\frac{1}{4}}, \frac{1}{\sqrt{128}}, \left(\frac{1}{8192}\right)^{1/4}, \frac{1}{8}, \left(\frac{1}{2048}\right)^{1/4}, \frac{1}{2\sqrt{8}}, \left(\frac{1}{512}\right)^{\frac{1}{4}}, \right.$$
$$\left. \frac{1}{4}, \left(\frac{1}{128}\right)^{1/4}, \frac{1}{\sqrt{8}}, \left(\frac{1}{32}\right)^{1/4}, \frac{1}{2}, \left(\frac{1}{8}\right)^{\frac{1}{4}}, \frac{1}{\sqrt{2}}, \left(\frac{1}{2}\right)^{\frac{1}{4}}, 1\right\}.$$

In one example, if Alt Y-1 is used as amplitude codebook, then $C_{Amp} = \{0, \sqrt[4]{1/x^{14}}, \ldots, \sqrt[4]{1/x^3}, \sqrt[4]{1/x^2\sqrt{1/x}}, 1\}$ or $$\left\{0, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

Note that $$\left\{0, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\}$$

is equivalent to $$\left\{0, \frac{1}{\sqrt{128}}, \left(\frac{1}{8192}\right)^{1/4}, \frac{1}{8}, \left(\frac{1}{2048}\right)^{1/4}, \frac{1}{2\sqrt{8}}, \left(\frac{1}{512}\right)^{\frac{1}{4}}, \frac{1}{4}, \left(\frac{1}{128}\right)^{1/4}, \frac{1}{\sqrt{8}}, \left(\frac{1}{32}\right)^{1/4}, \frac{1}{2}, \left(\frac{1}{8}\right)^{\frac{1}{4}}, \frac{1}{\sqrt{2}}, \left(\frac{1}{2}\right)^{\frac{1}{4}}, 1\right\}.$$

In one example, if Alt Y-2 is used as amplitude codebook, then $C_{Amp}=\{0, \sqrt{1/x^{15}}, \ldots, \sqrt{1/x^3}, \sqrt{1/x^2\sqrt{1/x}}, 1\}$ or $$\left\{0, \left(\frac{1}{2^{15}}\right)^{\frac{1}{4}}, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{15}{4}}, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if A=3, then the amplitude codebook $C_{Amp}$ is at least one of the following.

In one example, if Alt Y-0 is used as amplitude codebook, then $C_{Amp}=\{0, \sqrt{1/x^7}, \ldots, \sqrt{1/x^3}, \sqrt{1/x^2\sqrt{1/x}}, 1\}$ or $$\left\{\left(\frac{1}{128}\right)^{\frac{1}{4}}, \left(\frac{1}{64}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{\left(\frac{1}{2}\right)^{\frac{7}{4}}, \left(\frac{1}{2}\right)^{\frac{6}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt Y-1 is used as amplitude codebook, then $C_{Amp}=\{0, \sqrt{1/x^6}, \ldots, \sqrt{1/x^3}, \sqrt{1/x^2\sqrt{1/x}}, 1\}$ or $$\left\{0, \left(\frac{1}{64}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{6}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt Y-2 is used as amplitude codebook, then $C_{Amp}=\{\sqrt{1/x^7}, \ldots, \sqrt{1/x^3}, \sqrt{1/x^2\sqrt{1/x}}, 1\}$ or $$\left\{0, \left(\frac{1}{128}\right)^{\frac{1}{4}}, \left(\frac{1}{64}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{7}{4}}, \left(\frac{1}{2}\right)^{\frac{6}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if A=2, then the amplitude codebook $C_{Amp}$ is at least one of the following.

In one example, if Alt Y-0 is used as amplitude codebook, then $C_{Amp}=\{\sqrt{1/x^3}, \sqrt{1/x^2\sqrt{1/x}}, 1\}$ or $$\left\{\left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or } \left\{\left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt Y-1 is used as amplitude codebook, then $C_{Amp}=\{0, \sqrt{1/x^2\sqrt{1/x}}, 1\}$ or $$\left\{0, \left(\frac{1}{4}\right)^{\frac{1}{4}}, \left(\frac{1}{2}\right)^{\frac{1}{4}}, 1\right\} \text{ or } \left\{0, \left(\frac{1}{2}\right)^{\frac{2}{4}}, \left(\frac{1}{2}\right)^{\frac{1}{4}}, 1\right\}.$$

In one example, if Alt Y-2 is used as amplitude codebook, then $C_{Amp}=\{0, \sqrt{1/x^3}, \sqrt{1/x^2\sqrt{1/x}}, 1\}$ or $$\left\{0, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or } \left\{0, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if A=1, then the amplitude codebook $C_{Amp}$ is at least one of the following.

In one example, if Alt Y-0 is used as amplitude codebook, then $C_{Amp}=\{\sqrt{1/x},1\}$ or $$\left\{\left(\frac{1}{2}\right)^{\frac{1}{4}}, 1\right\}.$$

In one example, if Alt Y-1 is used as amplitude codebook, then $C_{Amp}=\{0,1\}$.

In one example, if Alt Y-2 is used as amplitude codebook, then $C_{Amp}=\{0,\sqrt{1/x},1\}$ or $$\left\{0, \left(\frac{1}{2}\right)^{\frac{1}{4}}, 1\right\}.$$

In one example, $x=10^{(10^{\log_{10}2})/(2\times10)}=10^{1.5/10}=1.4125\approx1.41$ or $1.42$. In another example, $x=2$.

In one embodiment, in Equation 5, where $A=W_1$ corresponds to $W_1$ in Type II CSI codebook, and $B=W_f$. The $C=\tilde{W}_2$ matrix includes the required linear combination coefficients (e.g. amplitude and phase or real or imaginary). Each reported coefficient ($c_{l,i,m}=p_{l,i,m}\phi_{l,i,m}$) in $\tilde{W}_2$ is quantized as amplitude coefficient ($p_{l,i,m}$) and phase coefficient ($\phi_{l,i,m}$). In one example, the amplitude coefficient ($p_{l,i,m}$) is reported using a A-bit amplitude codebook where A belongs to $\{2,3,4\}$.

If multiple values for A are supported, then one value is configured via higher layer signaling. In another example, the amplitude coefficient ($p_{l,i,m}$) is reported as $p_{l,i,m}=p_{l,i,m}^{(1)} p_{l,i,m}^{(2)}$ where: $p_{l,i,m}^{(1)}$ is a reference or first amplitude which is reported using a A1-bit amplitude codebook; A1 belongs to $\{2,3,4\}$; and $p_{l,i,m}^{(2)}$ is a differential or second amplitude which is reported using a A2-bit amplitude codebook where A2≤A1 belongs to $\{2,3,4\}$.

In the present disclosure, several amplitude codebooks are provided to report amplitude coefficient ($p_{l,i,m}$) for the coefficients ($C_{l,i,m}$) in $\tilde{W}_2$ that are reported by the UE. The coefficients that are not reported by the UE are assumed to be zero. The following embodiments/alternatives/examples are applicable for both the A-bit amplitude codebook and the A1-bit or A2-bit amplitude codebook. In the following, A-bit amplitude codebook is provided. The provided codebooks can also be used for A1-bit or A2-bit amplitude codebooks if $p_{l,i,m}=p_{l,i,m}^{(1)} p_{l,i,m}^{(2)}$.

In one embodiment of YY, an A-bit amplitude codebook (used to quantized amplitude of coefficients $c_{l,i,m}$) is according to at least one of the alternatives.

In one example of Alt YY-0, the A-bit amplitude codebook comprises $2^A$ amplitude values, where all values are greater than zero.

In one example of Alt YY-1, the A-bit amplitude codebook comprises $2^A$ amplitude values, where $2^A-1$ values are greater than zero and the one value equals zero.

In one example of Alt YY-2, the A-bit amplitude codebook comprises $2^A+1$ amplitude values, where $2^A$ values are greater than zero and the one value equals zero.

If a UE is configured to report a maximum of $K_0$ number of coefficients, where $K_0 < 2LM$, then the reports the indices of the $K_0$ coefficients out of a total 2LM coefficients (that comprise coefficient matrix $C_l$). For example, such an indication can be via a bitmap, where for example, the length of the bitmap can be 2LM. If a bit of the bitmap is one, then corresponding coefficient is reported by the UE, and if a bit of the bitmap is zero, then then corresponding coefficient is not reported by the UE (the corresponding coefficient is assumed to be zero). Let S be a set of $K_0$ coefficients which can be quantized/reported by the UE.

Now, if the UE uses an amplitude codebook as in Alt YY-1 or Alt YY-2 (which includes zero as a candidate value) to quantize amplitudes of $K_0$ coefficients in the set S, and if an amplitude of a coefficient (x) in the set S is quantized to the candidate value zero, then the UE reports that coefficient (x) according to one of the following alternatives.

In one example of Alt YY-A, the UE doesn't report (amplitude or phase) of the coefficient (x), and sets the corresponding bit in the bitmap to zero to indicate that the coefficient (x) is quantized to zero indicating that amplitude/phase of coefficients (x) is not reported. Note that the number of ones (indicating number of reported non-zero coefficients) in the bitmap can be less than $K_0$.

In one example of Alt YY-B, the UE report a zero amplitude for the coefficient (x), and keeps the corresponding bit in the bitmap to one to indicate that the coefficient (x) is quantized/reported. The phase of the coefficients (x) may or may not be reported. Note that the number of ones (indicating number of reported zero or non-zero coefficients) in the bitmap equals $K_0$.

Now, if the UE uses an amplitude codebook as in Alt YY-0 (which does not include zero as a candidate value) to quantize amplitudes of $K_0$ coefficients in the set S, and if an amplitude of a coefficient (x) in the set S is below (less than, or less or equal to) a certain threshold value (y), then the UE reports that coefficient (x) according to one of the alternatives, Alt YY-A and Alt YY-B. In one example, the threshold value $$x = \left(\frac{1}{2}\right)^{\frac{2^{A+1}-1}{Z}}$$

where Z=4 or 8.

In embodiment Y0, an A-bit (A1 or A2) amplitude codebook (used to quantized amplitude of coefficients $c_{l,i,m}$) comprises $2^A$ or $2^A+1$ amplitude values whose non-zero (NZ) values have uniform spacing in dB domain, i.e., the difference between any two consecutive NZ amplitude values is constant in dB.

If A=4, then the amplitude codebook $C_{Amp}$ is at least one of the following.

In one example, if Alt YY-0 is used as amplitude codebook, then $C_{Amp}=\{\sqrt{1/x^{15}}, \ldots, \sqrt{1/x^3}, \sqrt{1/x^2\sqrt{1/x}}, 1\}$ or $$\left\{\left(\frac{1}{2^{15}}\right)^{\frac{1}{4}}, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{\left(\frac{1}{2}\right)^{\frac{15}{4}}, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt YY-1 is used as amplitude codebook, then $C_{Amp}=\{0, \sqrt{1/x^{14}}, \ldots, \sqrt{1/x^3}, \sqrt{1/x^2\sqrt{1/x}}, 1\}$ or $$\left\{0, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt YY-2 is used as amplitude codebook, then $C_{Amp}=\{0, \sqrt{1/x^{15}}, \ldots, \sqrt{1/x^3}, \sqrt{1/x^2\sqrt{1/x}}, 1\}$ or $$\left\{0, \left(\frac{1}{2^{15}}\right)^{\frac{1}{4}}, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{0, \left(\frac{1}{2}\right)^{\frac{15}{4}}, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$$

In one example, if Alt YY-0 is used as amplitude codebook, then $C_{Amp}=\{\sqrt{1/x^{15}}, \ldots, \sqrt{1/x^3}, \sqrt{1/x^2\sqrt{1/x}}, 1\}$ or $$\left\{\left(\frac{1}{x^{15}}\right)^{\frac{1}{2}}, \left(\frac{1}{x^{14}}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\} \text{ or}$$

$$\left\{\left(\frac{1}{x}\right)^{\frac{15}{2}}, \left(\frac{1}{x}\right)^{\frac{14}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$$

In one example, x=10y/10=10y/10, where $$y = \frac{D}{2^A - 1} = \frac{D}{15}$$

and D is chosen to ensure a fixed dynamic range (in dB). One example is D=18 then x~1.3183 or 1.32. One example is D=21 then x~1.3804 or 1.38.

In one example, if Alt YY-1 is used as amplitude codebook, then $C_{Amp}=\{0, \sqrt{1/x^{14}}, \ldots, \sqrt{1/x^3}, \sqrt{1/x^2\sqrt{1/x}}, 1\}$ or $$\left\{0, \left(\frac{1}{x^{14}}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\} \text{ or}$$

$$\left\{0, \left(\frac{1}{x}\right)^{\frac{14}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$$

In one example, $x=10^{y/10}=10^{y/10}$, where $$y = \frac{D}{2^A - 1} = \frac{D}{15}$$

and D is chosen to ensure a fixed dynamic range (in dB). One example is D=18 then x~1.3183 or 1.32. One example is D=21 then x~1.3804 or 1.38.

In one example, if Alt YY-2 is used as amplitude codebook, then $C_{Amp}=\{0, \sqrt{1/x^{15}}, \ldots, \sqrt{1/x^3}, \sqrt{1/x^2}\sqrt{1/x}, 1\}$ or $$\left\{0, \left(\frac{1}{x^{15}}\right)^{\frac{1}{2}}, \left(\frac{1}{x^{14}}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\} \text{ or }$$

$$\left\{0, \left(\frac{1}{x}\right)^{\frac{15}{2}}, \left(\frac{1}{x}\right)^{\frac{14}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$$

In one example, $x=10^{y/10}=10^{y/10}$, where $$y = \frac{D}{2^A - 1} = \frac{D}{15}$$

and D is chosen to ensure a fixed dynamic range (in dB). One example is D=18 then x~1.3183 or 1.32. One example is D=21 then x~1.3804 or 1.38.

In one example, if A=3, then the amplitude codebook $C_{Amp}$ is at least one of the following.

In one example, if Alt YY-0 is used as amplitude codebook, then $C_{Amp}=\{\sqrt{1/x^7}, \ldots, \sqrt{1/x^3}, \sqrt{1/x^2}\sqrt{1/x}, 1\}$ or $$\left\{\left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\} \text{ or }$$

$$\left\{\left(\frac{1}{2}\right)^{\frac{7}{2}}, \left(\frac{1}{2}\right)^{\frac{6}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, 1\right\}.$$

Note that $$\left\{\left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\}$$

is equivalent to $$\left\{\frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1\right\}.$$

In one example, if Alt YY-1 is used as amplitude codebook, then $C_{Amp}=\{0, \sqrt{1/x^6}, \ldots, \sqrt{1/x^3}, \sqrt{1/x^2}\sqrt{1/x}, 1\}$ or $$\left\{0, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\} \text{ or }$$

$$\left\{0, \left(\frac{1}{2}\right)^{\frac{6}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, 1\right\}.$$

In one example, if Alt YY-2 is used as amplitude codebook, then $C_{Amp}=\{0, \sqrt{1/x^7}, \ldots, \sqrt{1/x^3}, \sqrt{1/x^2}\sqrt{1/x}, 1\}$ or $$\left\{0, \left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\} \text{ or }$$

$$\left\{0, \left(\frac{1}{2}\right)^{\frac{7}{2}}, \left(\frac{1}{2}\right)^{\frac{6}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, 1\right\}.$$

In one example, if Alt YY-0 is used as amplitude codebook, then $C_{Amp}=\{\sqrt{1/x^7}, \ldots, \sqrt{1/x^3}, \sqrt{1/x^2}\sqrt{1/x}, 1\}$ or $$\left\{\left(\frac{1}{x^7}\right)^{\frac{1}{2}}, \left(\frac{1}{x^6}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\} \text{ or }$$

$$\left\{\left(\frac{1}{x}\right)^{\frac{7}{2}}, \left(\frac{1}{x}\right)^{\frac{6}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$$

In one example, $x=10^{y/10}=10^{y/10}$, where $$y = \frac{D}{2^A - 1} = \frac{D}{7}$$

and D is chosen to ensure a fixed dynamic range (in dB). One example is D=18 then x~1.8078 or 1.81. One example is D=21 then x~1.9953 or 2.

In one example, if Alt YY-1 is used as amplitude codebook, then $C_{Amp}=\{0, \sqrt{1/x^6}, \ldots, \sqrt{1/x^3}, \sqrt{1/x^2}\sqrt{1/x}, 1\}$ or $$\left\{0, \left(\frac{1}{x^6}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\} \text{ or }$$

$$\left\{0, \left(\frac{1}{x}\right)^{\frac{6}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$$

In one example, $x=10^{y/10}=10^{y/10}$, where $$y = \frac{D}{2^A - 1} = \frac{D}{7}$$

and D is chosen to ensure a fixed dynamic range (in dB). One example is D=18 then x~1.8078 or 1.81. One example is D=21 then x~1.9953 or 2.

In one example, if Alt YY-2 is used as amplitude codebook, then $C_{Amp}=\{0, \sqrt{1/x^7}, \ldots, \sqrt{1/x^3}, \sqrt{1/x^2}\sqrt{1/x}, 1\}$ or $$\left\{0, \left(\frac{1}{x^7}\right)^{\frac{1}{2}}, \left(\frac{1}{x^6}\right)^{\frac{1}{2}}, \ldots, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\}$$

or $\left\{0, \left(\frac{1}{x}\right)^{\frac{7}{2}}, \left(\frac{1}{x}\right)^{\frac{6}{2}}, \ldots, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$ In one example, $x=10y/10=10y/10$), where $$y = \frac{D}{2^A - 1} = \frac{D}{7}$$

and D is chosen to ensure a fixed dynamic range (in dB). One example is D=18 then x~1.8078 or 1.81. One example is D=21 then x~1.9953 or 2.

In one example, if A=2, then the amplitude codebook $C_{Amp}$ is at least one of the following.

In one example, if Alt YY-0 is used as amplitude codebook, then $C_{Amp}=\{\sqrt[4]{1/x^3}, \sqrt[4]{1/x^2}\sqrt{1/x}, 1\}$ or $\left\{\left(\frac{1}{8}\right)^{\frac{1}{4}}, \left(\frac{1}{4}\right)^{\frac{1}{4}}, \left(\frac{1}{2}\right)^{\frac{1}{4}}, 1\right\}$ or $\left\{\left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$ In one example, if Alt YY-1 is used as amplitude codebook, then $C_{Amp}=\{0, \sqrt[4]{1/x^2}\sqrt{1/x}, 1\}$ or $\left\{0, \left(\frac{1}{4}\right)^{\frac{1}{4}}, \left(\frac{1}{2}\right)^{\frac{1}{4}}, 1\right\}$ or $\left\{0, \left(\frac{1}{2}\right)^{\frac{2}{4}}, \left(\frac{1}{2}\right)^{\frac{1}{4}}, 1\right\}.$ In one example, if Alt YY-2 is used as amplitude codebook, then $C_{Amp}=\{0, \sqrt[4]{1/x^3}, \sqrt[4]{1/x^2}\sqrt{1/x}, 1\}$ or $\left\{0, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\}$ or $\left\{0, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\}.$ In one example, if Alt YY-0 is used as amplitude codebook, then $C_{Amp}=\{\sqrt{1/x^3}, \sqrt{1/x^2}\sqrt{1/x}, 1\}$ or $\left\{\left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\}$ or $\left\{\left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$ In one example, $$x = 10^{\frac{y}{10}} = 10^{\frac{y}{10}},$$

where $$y = \frac{D}{2^A - 1} = \frac{D}{3}$$

and D is chosen to ensure a fixed dynamic range (in dB). One example is D=18 then x~3.9811 or 4.

In one example, if Alt YY-1 is used as amplitude codebook, then $C_{Amp}=\{0, \sqrt{1/x^2}\sqrt{1/x}, 1\}$ or $\left\{0, \left(\frac{1}{x^2}\right)^{\frac{1}{2}}, \left(\frac{1}{x}\right)^{\frac{1}{2}}, 1\right\}$ or $\left\{0, \left(\frac{1}{x}\right)^{\frac{2}{2}}, \left(\frac{1}{x}\right)^{\frac{1}{2}}, 1\right\}.$ In one example, $$x = 10^{\frac{y}{10}} = 10^{\frac{y}{10}},$$

where $$y = \frac{D}{2^A - 1} = \frac{D}{3}$$

and D is chosen to ensure a fixed dynamic range (in dB). One example is D=18 then x~3.9811 or 4.

In one example, if Alt YY-2 is used as amplitude codebook, then $C_{Amp}=\{0, \sqrt{1/x^3}, \sqrt{1/x^2}\sqrt{1/x}, 1\}$ or $\left\{0, \left(\frac{1}{x^3}\right)^{\frac{1}{2}}, \left(\frac{1}{x^2}\right)^{\frac{1}{2}}, \left(\frac{1}{x}\right)^{\frac{1}{2}}, 1\right\}$ or $\left\{0, \left(\frac{1}{x}\right)^{\frac{3}{2}}, \left(\frac{1}{x}\right)^{\frac{2}{2}}, \left(\frac{1}{x}\right)^{\frac{1}{2}}, 1\right\}.$ In one example, $$x = 10^{\frac{y}{10}} = 10^{\frac{y}{10}},$$

where $$y = \frac{D}{2^A - 1} = \frac{D}{3}$$

and D is chosen to ensure a fixed dynamic range (in dB). One example is D=18 then x~3.9811 or 4.

In one example, if A=1, then the amplitude codebook $C_{Amp}$ is at least one of the following.

In one example, if Alt YY-0 is used as amplitude codebook, then $C_{Amp}=\{\sqrt{1/x}, 1\}$ or $\left\{\left(\frac{1}{2}\right)^{\frac{1}{4}}, 1\right\}.$ In one example, if Alt YY-1 is used as amplitude codebook, then $C_{Amp}=\{0, 1\}$.

In one example, if Alt YY-2 is used as amplitude codebook, then $C_{Amp}=\{0, 1/x, 1\}$ or $\left\{0, \left(\frac{1}{2}\right)^{\frac{1}{4}}, 1\right\}.$ In one example, $x=10^{(10^{log_{10}2)/(2\times10)}}=10^{1.5/10}=1.4125 \cong 1.41$ or 1.42. In another example, x=2.

In one embodiment Y1, an A-bit (A1 or A2) amplitude codebook (used to quantized amplitude of coefficients $c_{l,i,m}$) comprises $2^A$ or $2^A+1$ amplitude values whose non-zero (NZ) values have non-uniform spacing in dB domain, i.e., the difference between any two consecutive NZ amplitude values is not constant in dB. In particular, the difference between any two consecutive NZ amplitude values is either one of the two x or $x_0$ in dB.

If A=4, then the amplitude codebook $C_{Amp}$ is at least one of the following.

In one example: $C_{Amp}=\{0, \sqrt{1/x^{14}}, \ldots, \sqrt{1/x^3}, \sqrt{1/x^2}\sqrt{1/x}, \sqrt{1/x_0}, 1\}$ or $$\left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{1}{8}}, 1\right\}$$

$$\text{or } \left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{1}{8}}, 1\right\}.$$

In one example, $C_{Amp}=\{\sqrt{1/x^{14}}, \ldots, \sqrt{1/x^3}, \sqrt{1/x^2}, \sqrt{1/x_0^2}, \sqrt{1/x_0}, 1\}$ or $$\left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{4}\right)^{\frac{1}{6}}, \left(\frac{1}{2}\right)^{\frac{1}{6}}, 1\right\}$$

$$\text{or } \left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{2}{6}}, \left(\frac{1}{2}\right)^{\frac{1}{6}}, 1\right\}.$$

In one example, $C_{Amp}=\{0, \sqrt{1/x^{14}}, \ldots, \sqrt{1/x^3}, \sqrt{1/x^2}, \sqrt{1/x}, \sqrt{1/x_0}, 1\}$ or $$\left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{1}{8}}, 1\right\} \text{ or}$$

$$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{1}{8}}, 1\right\}.$$

In one example, $C_{Amp}=\{0, \sqrt{1/x^{14}}, \ldots, \sqrt{1/x^3}, \sqrt{1/x^2}, \sqrt{1/x_0^2}, \sqrt{1/x_0}, 1\}$ or $$\left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{4}\right)^{\frac{1}{6}}, \left(\frac{1}{2}\right)^{\frac{1}{6}}, 1\right\} \text{ or}$$

$$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{2}{6}}, \left(\frac{1}{2}\right)^{\frac{1}{6}}, 1\right\}.$$

In one example, $C_{Amp}=\{0, \sqrt{1/x^{13}}, \ldots, \sqrt{1/x^3}, \sqrt{1/x^2}, \sqrt{1/x}, \sqrt{1/x_0}, 1\}$ or $$\left\{0, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{1}{8}}, 1\right\}$$

$$\text{or } \left\{0, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{1}{8}}, 1\right\}.$$

In one example, $C_{Amp}=\{0, \sqrt{1/x^{13}}, \ldots, \sqrt{1/x^3}, \sqrt{1/x^2}, \sqrt{1/x_0^2}, \sqrt{1/x_0}, 1\}$ or $$\left\{0, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{4}\right)^{\frac{1}{6}}, \left(\frac{1}{2}\right)^{\frac{1}{6}}, 1\right\}$$

$$\text{or } \left\{0, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{2}{6}}, \left(\frac{1}{2}\right)^{\frac{1}{6}}, 1\right\}.$$

If A=3, then the amplitude codebook $C_{Amp}$ is at least one of the following.

In one example, $C_{Amp}=\{\sqrt{1/x^6}, \ldots, \sqrt{1/x^3}, \sqrt{1/x^2}, \sqrt{1/x}, \sqrt{1/x_0}, 1\}$ or $$\left\{\left(\frac{1}{2^6}\right)^{\frac{1}{2}}, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, \left(\frac{1}{2}\right)^{\frac{1}{4}}, 1\right\}$$

$$\text{or } \left\{\left(\frac{1}{2}\right)^{\frac{6}{2}}, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, \left(\frac{1}{2}\right)^{\frac{1}{4}}, 1\right\}.$$

In on example, $C_{Amp}=\{\sqrt{1/x^6}, \ldots, \sqrt{1/x^3}, \sqrt{1/x^2}, \sqrt{1/x_0^2}, \sqrt{1/x_0}, 1\}$ or $$\left\{\left(\frac{1}{2^6}\right)^{\frac{1}{2}}, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{4}\right)^{\frac{1}{3}}, \left(\frac{1}{2}\right)^{\frac{1}{3}}, 1\right\}$$

$$\text{or } \left\{\left(\frac{1}{2}\right)^{\frac{6}{2}}, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{2}{3}}, \left(\frac{1}{2}\right)^{\frac{1}{3}}, 1\right\}.$$

In one example, $C_{Amp}=\{0, \sqrt{1/x^6}, \ldots, \sqrt{1/x^3}, \sqrt{1/x^2}, \sqrt{1/x}, \sqrt{1/x_0}, 1\}$ or $$\left\{0, \left(\frac{1}{2^6}\right)^{\frac{1}{2}}, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, \left(\frac{1}{2}\right)^{\frac{1}{4}}, 1\right\}$$

$$\text{or } \left\{0, \left(\frac{1}{2}\right)^{\frac{6}{2}}, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, \left(\frac{1}{2}\right)^{\frac{1}{4}}, 1\right\}.$$

In one example, $C_{Amp}=\{0, \sqrt{1/x^6}, \ldots, \sqrt{1/x^3}, \sqrt{1/x^2}, \sqrt{1/x_0^2}, \sqrt{1/x_0}, 1\}$ or $$\left\{0, \left(\frac{1}{2^6}\right)^{\frac{1}{2}}, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{4}\right)^{\frac{1}{3}}, \left(\frac{1}{2}\right)^{\frac{1}{3}}, 1\right\}$$

$$\text{or } \left\{0, \left(\frac{1}{2}\right)^{\frac{6}{2}}, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{2}{3}}, \left(\frac{1}{2}\right)^{\frac{1}{3}}, 1\right\}.$$

In one example, $C_{Amp}=\{0, \sqrt{1/x^6}, \ldots, \sqrt{1/x^3}, \sqrt{1/x^2}, \sqrt{1/x_0^2}, \sqrt{1/x_0}, 1\}$ or $$\left\{0, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, \left(\frac{1}{2}\right)^{\frac{1}{4}}, 1\right\}$$

$$\text{or } \left\{0, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{1}{2}}, \left(\frac{1}{2}\right)^{\frac{1}{4}}, 1\right\}.$$

In one example, $C_{Amp} = \{0, \sqrt{1/x^5}, \ldots, \sqrt{1/x^3}, \sqrt{1/x^2}, \sqrt{1/x_0^2}, \sqrt{1/x_0}, 1\}$ or $$\left\{0, \left(\frac{1}{2^5}\right)^{\frac{1}{2}}, \ldots, \left(\frac{1}{8}\right)^{\frac{1}{2}}, \left(\frac{1}{4}\right)^{\frac{1}{2}}, \left(\frac{1}{4}\right)^{\frac{1}{3}}, \left(\frac{1}{2}\right)^{\frac{1}{3}}, 1\right\}$$

$$\text{or } \left\{0, \left(\frac{1}{2}\right)^{\frac{5}{2}}, \ldots, \left(\frac{1}{2}\right)^{\frac{3}{2}}, \left(\frac{1}{2}\right)^{\frac{2}{2}}, \left(\frac{1}{2}\right)^{\frac{2}{3}}, \left(\frac{1}{2}\right)^{\frac{1}{3}}, 1\right\}.$$

In one example, $x = 10^{(10 \ log_{10}2)/(2 \times 10)} = 10^{1.5/10} = 1.4125 \cong 1.41$ or $1.42$. In another example, $x=2$. In one example, $x = 10^{(10 \ log_{10}2)/(3 \times 10)} = 10^{1/10} = 1.2589 \cong 1.26$. In one example, $x = 10^{(10 \ log_{10}2)/(4 \times 10)} = 10^{0.75/10} = 1.1885 \cong 1.19$ or $1.2$.

In one embodiment Y1A, if A=4, then the amplitude codebook $C_{Amp}$ is at least one of the following.

In one example, $$C_{Amp} = \left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{3}{8}}, 1\right\}$$

$$\text{or } \left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{3}{8}}, 1\right\}.$$

In one example, $$C_{Amp} = \left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{3}{8}}, 1\right\}$$

$$\text{or } \left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{3}{8}}, 1\right\}.$$

In one example, $$C_{Amp} = \left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{9}{8}}, 1\right\} \text{ or }$$

$$\left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{9}{8}}, 1\right\}.$$

In one example, $$C_{Amp} = \left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{9}{8}}, 1\right\} \text{ or }$$

-continued $$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{9}{8}}, 1\right\}.$$

In one example, $$C_{Amp} = \left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{5}{8}}, 1\right\} \text{ or }$$

$$\left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{5}{8}}, 1\right\}.$$

In one example, $$C_{Amp} = \left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{5}{8}}, 1\right\} \text{ or }$$

$$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{5}{8}}, 1\right\}.$$

In one example, $$C_{Amp} = \left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{7}{8}}, 1\right\} \text{ or }$$

$$\left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{7}{8}}, 1\right\}.$$

In one example, $$C_{Amp} = \left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, \left(\frac{1}{2}\right)^{\frac{7}{8}}, 1\right\} \text{ or }$$

$$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, \left(\frac{1}{2}\right)^{\frac{7}{8}}, 1\right\}.$$

In one embodiment Y1B, if A=4, then the amplitude codebook $C_{Amp}$ is at least one of the following.

In one example, $$C_{Amp} = \left\{\left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, a1\right\} \text{ or }$$

$$\left\{\left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, a, 1\right\}.$$

In one example, $$C_{Amp} = \left\{0, \left(\frac{1}{2^{14}}\right)^{\frac{1}{4}}, \left(\frac{1}{2^{13}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, a1\right\} \text{ or }$$

-continued $$\left\{0, \left(\frac{1}{2}\right)^{\frac{14}{4}}, \left(\frac{1}{2}\right)^{\frac{13}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, a, 1\right\}.$$

In such examples, where the value $$a \in \left\{\left(\frac{1}{2}\right)^{\frac{1}{8}}, \left(\frac{1}{2}\right)^{\frac{3}{8}}, \left(\frac{1}{2}\right)^{\frac{5}{8}}, \left(\frac{1}{2}\right)^{\frac{7}{8}}, \left(\frac{1}{2}\right)^{\frac{9}{8}}, \left(\frac{1}{2}\right)^{\frac{11}{8}}, \ldots\right\},$$

and is fixed depending on the rank. For example, $$a = \left(\frac{1}{2}\right)^{\frac{9}{8}}$$

when rank 1, and $$a = \left(\frac{1}{2}\right)^{\frac{3}{8}}$$

when rank 2. In a variation, the value a is reported by the UE. In another variation, the value α is configured to the UE. Also, the reporting or configuration of the value a can be layer-common (one value common for all layers) or layer-independent (one value for each layer).

In one embodiment Y1C, if A=4, then the amplitude codebook $C_{Amp}=\{R, \sqrt{1/x^{14}}, \ldots, \sqrt{1/x^3}, \sqrt{1/x^2\sqrt{1/x}}, 1\}$ or $$\left\{R, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\} \text{ or}$$

$$\left\{R, \left(\frac{1}{2}\right)^{\frac{14}{4}}, \ldots, \left(\frac{1}{2}\right)^{\frac{3}{4}}, \left(\frac{1}{2}\right)^{\frac{2}{4}}, \left(\frac{1}{2}\right)^{\frac{1}{4}}, 1\right\},$$

where R indicates a 'reserved' state, where the reserved state is according to at least one of the following alternatives. Note that $$\left\{R, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\}$$

is equivalent to $$\left\{R, \frac{1}{\sqrt{128}}, \left(\frac{1}{8192}\right)^{1/4}, \frac{1}{8}, \left(\frac{1}{2048}\right)^{1/4}, \frac{1}{2\sqrt{8}}, \left(\frac{1}{512}\right)^{\frac{1}{4}}, \frac{1}{4}, \right.$$
$$\left.\left(\frac{1}{128}\right)^{1/4}, \frac{1}{\sqrt{8}}, \left(\frac{1}{32}\right)^{1/4}, \frac{1}{2}, \left(\frac{1}{8}\right)^{\frac{1}{4}}, \frac{1}{\sqrt{2}}, \left(\frac{1}{2}\right)^{\frac{1}{4}}, 1\right\}.$$

In one example of Alt Y1C-0, the UE is not expected to use this state for amplitude reporting.

In one example of Alt Y1C-1, the reserved state can be turned ON by higher layer signaling. When turned on, the UE can use this state for amplitude reporting and the amplitude value that this state indicates belongs to $$\left\{0, \left(\frac{1}{2^{15}}\right)^{\frac{1}{4}}, \left(\frac{1}{2}\right)^{\frac{1}{8}}, \left(\frac{1}{2}\right)^{\frac{3}{8}}, \left(\frac{1}{2}\right)^{\frac{5}{8}}, \left(\frac{1}{2}\right)^{\frac{7}{8}}, \left(\frac{1}{2}\right)^{\frac{9}{8}}, \left(\frac{1}{2}\right)^{\frac{11}{8}}, \ldots\right\}.$$

In one example of Alt Y1C-2, the reserved state can be turned ON depending on UE capability signaling. For example, the UE reports via capability signaling, whether it can support amplitude reporting for this reserved state. When the UE is capable to do so, the UE can use this state for amplitude reporting and the amplitude value that this state indicates belongs to $$\left\{0, \left(\frac{1}{2^{15}}\right)^{\frac{1}{4}}, \left(\frac{1}{2}\right)^{\frac{1}{8}}, \left(\frac{1}{2}\right)^{\frac{3}{8}}, \left(\frac{1}{2}\right)^{\frac{5}{8}}, \left(\frac{1}{2}\right)^{\frac{7}{8}}, \left(\frac{1}{2}\right)^{\frac{9}{8}}, \left(\frac{1}{2}\right)^{\frac{11}{8}}, \ldots\right\}.$$

In one embodiment Y2, an A-bit (A1 or A2) amplitude codebook (used to quantized amplitude of coefficients comprises $2^A$ or $2^A+1$ amplitude values whose non-zero (NZ) values have non-uniform spacing in dB domain, i.e., the difference between any two consecutive NZ amplitude values is not constant in dB. In particular, the difference between any two consecutive NZ amplitude values is not the same.

In NR specification, when the UE configured with higher layer parameter codebookType set to "typeII" or "typeII-PortSelection," each PMI value corresponds to the codebook indices $i_1$ and $i_2$. When codebookType="typeII," the first PMI $i_1$ comprises two layer-common (i.e., reported common for two layers if UE reports RI=2) components indicating: orthogonal basis set comprising $N_1N_2$ orthogonal discrete Fourier transform (DFT) beams/vectors (indicated using indicator i1,1 indicating the rotation factors ($q_1$, $q_2$)); and L out of $N_1N_2$ beam/vector selection (indicated using indicator $i_{1,2}$), and two layer-specific (i.e., reported for each of the two layers if UE reports RI=2) components indicating: strongest coefficient (indicated using indicators $i_{1,3,1}$ and $i_{1,3,2}$); and WB amplitude coefficient $p_{l,i}^{(1)}$ (indicated using indicators $i_{1,4,1}$ and $i_{1,4,2}$).

When codebookType="typeII-PortSelection," the first PMI $i_1$ comprises a layer-common (i.e., reported common for two layers if UE reports RI=2) component indicating L out of $P_{CSI-RS}/2$ port selection (indicated using indicator $i_{1,1}$).

The values of $N_1$ and $N_2$ are configured with the higher layer parameter n1-n2-codebookSubsetRestriction. The supported configurations of ($N_1$, $N_2$) for a given number of CSI-RS ports and the corresponding values of ($O_1,O_2$). The number of CSI-RS ports $2N_1N_2$. The number of CSI-RS ports is given by $P_{CSI-RS} \in \{4, 8, 12, 16, 24, 32\}$ as configured by higher layer parameter nrofPorts. The value of L is configured with the higher layer parameter numberOfBeams.

So, the first PMI $i_1$ is given by:

$$i_1 = \begin{cases} [i_{1,1} i_{1,2} i_{1,3,1} i_{1,4,1}] & v = 1 \\ [i_{1,1} i_{1,2} i_{1,3,1} i_{1,4,1} i_{1,3,2} i_{1,4,2}] & v = 2 \end{cases} \text{ if } codebookType \text{ set to "typeII"}$$

-continued $$i_1 = \begin{cases} [i_{1,1} i_{1,3,1} i_{1,4,1}] & \upsilon = 1 \\ [i_{1,1} i_{1,3,1} i_{1,4,1} i_{1,3,2} i_{1,4,2}] & \upsilon = 2 \end{cases}$$

if *codebookType* set to '"*typeII-PortSelection.*"

The second PMI $$i_2 = \begin{cases} [i_{2,1,1}] & subbandAmplitude = \text{'false'}, \upsilon = 1 \\ [i_{2,1,1}\ i_{2,1,2}] & subbandAmplitude = \text{'false'}, \upsilon = 2 \\ [i_{2,1,1}\ i_{2,2,1}] & subbandAmplitude = \text{'true'}, \upsilon = 1 \\ [i_{2,1,1}\ i_{2,2,1}\ i_{2,1,2}\ i_{2,2,2}] & subbandAmplitude = \text{'true'}, \upsilon = 2 \end{cases}$$

comprises two layer-specific components indicating: SB phase coefficient $c_{l,i}$ indicated using indicators $i_{2,1,1}$ and $i_{2,1,2}$; and SB amplitude coefficient $p_{l,i}^{(2)}$ (which can be turned ON or OFF by RRC signaling via subbandAmplitude) indicated using indicators $i_{2,2,1}$ and $i_{2,2,2}$.

The first PMI is reported in a wideband (WB) manner and the second PMI can be reported in a wideband or subband (SB) manner.

Figure 15:
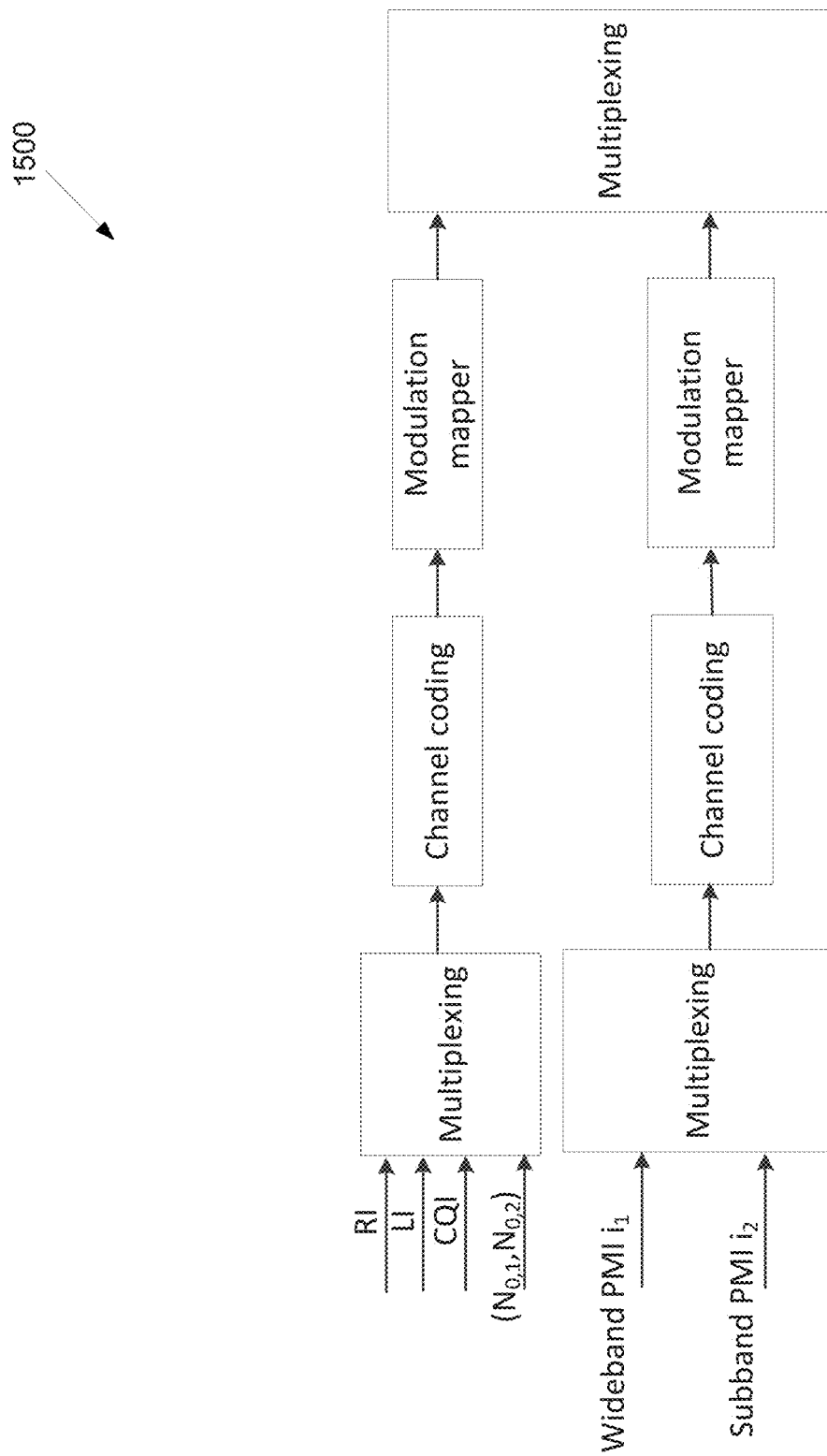
FIG. 15 illustrates an example two-part UCI multiplexing according to embodiments of the present disclosure.

FIG. 15 illustrates an example two-part UCI multiplexing 1500 according to embodiments of the present disclosure. The embodiment of the two-part UCI multiplexing 1500 illustrated in FIG. 15 is for illustration only. FIG. 15 does not limit the scope of the present disclosure to any particular implementation.

As shown in FIG. 15, a two-part UCI multiplexing is used to report Type II CSI on PUSCH (or PUCCH) when codebookType="typeII" or "typeII-PortSelection," wherein CQI, RI, layer indicator (LI), and ($N_{0,1}$, $N_{0,2}$) are multiplexed and encoded together in part 1, where $N_{0,1}$ and $N_{0,2}$ respectively indicate the number of reported WB amplitudes that are non-zero for layer 1 and layer 2 respectively, i.e., $p_{l,i}^{(1)} \neq 0$; and remaining CSI are multiplexed and encoded together in part 2, where the remaining CSI includes the first PMI and the second PMI ($i_2$).

The part 1 UCI may also include CRI if the UE is configured with more than one CSI-RS resources. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

Based on the value of the reported ($N_{0,1}$,$N_{0,2}$) in part 1, the CSI reporting payload (bits) for part 2 is determined. In particular, the components of the second PMI $i_2$ are reported only for the coefficients whose corresponding reported WB amplitudes are non-zero.

In one embodiment AA, the codebooks for 1-4 layers (cf. Equation 5) are given in TABLE 4, where $m_1^{(i)}$, $m_2^{(i)}$, for i=0, 1, ..., L−1, $u_n$ and $v_{m,n}$ are obtained as NR specification for Type II CSI, and the quantities $\varphi_{l,i,f}$ and $y_t$ are given by:

$$\varphi_{l,i,f} = e^{j\frac{2\pi c_{l,i,f}}{16}}$$

is a phase value
$y_{t,l} = [y_{t,l}^{(0)}\ y_{t,l}^{(1)}\ \ldots\ y_{t,l}^{(M-1)}]$ is a vector comprising the t-th element of the M FD basis vectors, $w_k$, each $N_3 \times 1$, where k=t={0, 1, ..., $N_3$−1} is the SB index for PMI, l= {1, ..., $\upsilon$}, and with $$y_{t,l}^{(f)} = e^{j\frac{2\pi t m_{3,l}^{(f)}}{N_3}}$$

for f=0, 1, ..., M−1.

TABLE 4-A

Codebook for 1-layer, 2-layer, 3-layer, and 4-layer reporting using antenna ports 3000 to 2999 + PCSI RS

| layers | |
|---|---|
| v = 1 | $W^{(1)}_{q_1,q_2,n_1,n_2,n_{3,1},p_1^{(1)},p_1^{(2)},i_{2,5,1},t} = W^1_{q_1,q_2,n_1,n_2,n_{3,1},p_1^{(1)},p_1^{(2)},i_{2,5,1},t}$ |
| v = 2 | $W^{(2)}_{q_1,q_2,n_1,n_2,n_{3,1},p_1^{(1)},p_1^{(2)},i_{2,5,1},n_{3,2},p_2^{(1)},p_2^{(2)},i_{2,5,2},t} =$ $\frac{1}{\sqrt{2}}\left[W^1_{q_1,q_2,n_1,n_2,n_{3,1},p_1^{(1)},p_1^{(2)},i_{2,5,1},t}\ W^2_{q_1,q_2,n_1,n_2,n_{3,2},p_2^{(1)},p_2^{(2)},i_{2,5,2},t}\right]$ |
| v = 3 | $W^{(3)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} =$ $\frac{1}{\sqrt{3}}\left[W^1_{q_1,q_2,n_1,n_2,n_{3,1},p_1^{(1)},p_1^{(2)},i_{2,5,1},t}\ W^2_{q_1,q_2,n_1,n_2,n_{3,2},p_2^{(1)},p_2^{(2)},i_{2,5,2},t}\ W^3_{q_1,q_2,n_1,n_2,n_{3,3},p_3^{(1)},p_3^{(2)},i_{2,5,3},t}\right]$ |

TABLE 4-B

Codebook for 1-layer, 2-layer, 3-layer, and 4-layer reporting using antenna ports 3000 to 2999 + PCSI RS

| layers | |
|---|---|
| v = 4 | $W^{(4)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} =$ $\frac{1}{2}\left[W^1_{q_1,q_2,n_1,n_2,n_{3,1},p_1^{(1)},p_1^{(2)},i_{2,5,1},t}\ W^2_{q_1,q_2,n_1,n_2,n_{3,2},p_2^{(1)},p_2^{(2)},i_{2,5,2},t}\ W^3_{q_1,q_2,n_1,n_2,n_{3,3},p_3^{(1)},p_3^{(2)},i_{2,5,3},t}\ W^4_{q_1,q_2,n_1,n_2,n_{3,4},p_4^{(1)},p_4^{(2)},i_{2,5,4},t}\right]$ |

TABLE 4-B-continued

Codebook for 1-layer, 2-layer, 3-layer, and 4-layer reporting using antenna ports 3000 to 2999 + PCSI RS $$\text{Where } W^l_{q_1,q_2,n_1,n_2,n_3,p_l^{(1)},p_l^{(2)},i_{2,5,l},t} = \frac{1}{\sqrt{N_1 N_2 \gamma_{t,l}}} \begin{bmatrix} \sum_{i=0}^{L-1} v_{m_1^{(i)},m_2^{(i)}} p_{l,0}^{(1)} \sum_{f=0}^{M-1} y_{t,l}^{(f)} p_{l,i,f}^{(2)} \varphi_{l,i,f} \\ \sum_{i=0}^{L-1} v_{m_1^{(i)},m_2^{(i)}} p_{l,1}^{(1)} \sum_{f=0}^{M-1} y_{t,l}^{(f)} p_{l,i+L,f}^{(2)} \varphi_{l,i+L,f} \end{bmatrix}, l=1,2,3,4$$

$$\gamma_{t,l} = \sum_{i=0}^{2L-1} \left(p_{l,\lfloor \frac{i}{L} \rfloor}^{(1)}\right)^2 \left|\sum_{f=0}^{M-1} y_{t,l}^{(f)} p_{l,i,f}^{(2)} \varphi_{l,i,f}\right|^2$$

and the mappings from to $i_1$ to $q_1$, $q_2$, $n_1$, $n_2$, $n_{3,1}$, $n_{3,2}$, $n_{3,3}$, $n_{3,4}$, $p_1^{(1)}$, $p_2^{(1)}$, $p_3^{(1)}$ and $p_4^{(1)}$, and from $i_2$ to $i_{2,5,1}$, $i_{2,5,2}$, $i_{2,5,3}$, $i_{2,5,4}$, $p_1^{(2)}$, $p_2^{(2)}$, $p_3^{(2)}$ and $p_4^{(2)}$ are as described below, including the ranges of the constituent indices of $i_1$ and $i_2$.

Each PMI value corresponds to the codebook indices $i_1$ and $i_2$ where $i_1 =$

| | |
|---|---|
| $[i_{1,1} i_{1,2} i_{1,5} i_{1,6,1} i_{1,7,1} i_{1,8,1}]$ | $v=1$ |
| $[i_{1,1} i_{1,2} i_{1,5} i_{1,6,1} i_{1,7,1} i_{1,8,1} i_{1,6,2} i_{1,7,2} i_{1,8,2}]$ | $v=2$ |
| $[i_{1,1} i_{1,2} i_{1,5} i_{1,6,1} i_{1,7,1} i_{1,8,1} i_{1,6,2} i_{1,7,2} i_{1,8,2} i_{1,6,3} i_{1,7,3} i_{1,8,3}]$ | $v=3$ |
| $[i_{1,1} i_{1,2} i_{1,5} i_{1,6,1} i_{1,7,1} i_{1,8,1} i_{1,6,2} i_{1,7,2} i_{1,8,2} i_{1,6,3} i_{1,7,3} i_{1,8,3} i_{1,6,4} i_{1,7,4} i_{1,8,4}]$ | $v=4$ |

$i_2 =$

| | |
|---|---|
| $[i_{2,3,1} i_{2,4,1} i_{2,5,1}]$ | $v=1$ |
| $[i_{2,3,1} i_{2,4,1} i_{2,5,1} i_{2,3,2} i_{2,4,2} i_{2,5,2}]$ | $v=2$ |
| $[i_{2,3,1} i_{2,4,1} i_{2,5,1} i_{2,3,2} i_{2,4,2} i_{2,5,2} i_{2,3,3} i_{2,4,3} i_{2,5,3}]$ | $v=3$ |
| $[i_{2,3,1} i_{2,4,1} i_{2,5,1} i_{2,3,2} i_{2,4,2} i_{2,5,2} i_{2,3,3} i_{2,4,3} i_{2,5,3} i_{2,3,4} i_{2,4,4} i_{2,5,4}]$ | $v=4$ | where: $i_{1,1}$ are the rotation factors for the SD basis; $i_{1,2}$ is the SD basis indicator; $i_{1,5}$ is the $M_{initial}$ indicator; $i_{1,6,l}$ is the FD basis indicator for layer l; $i_{1,7,l}$ is the bitmap for layer l; $i_{1,8,l}$ is the Strongest coefficient indicator (SCI) for layer l; $i_{2,3,l}$ are the reference amplitudes ($p_{l,0}^{(1)}$) for layer l; $i_{2,4,l}$ is the matrix of the diff. amplitude values ($p_{l,i,f}^{(2)}$) for layer l; and $i_{2,5,l}$ is the matrix of the phase values ($\varphi_{l,i,f}$) for layer l. $\gamma_{t,l}$ is the normalisation factor for the t-th column of $W^l$, which normalizes it to norm one. Note that the term $p_{l,0}^{(1)} \Sigma_{f=0}^{M-1} y_{t,l}^{(f)} p_{l,i,f}^{(2)} \varphi_{l,i,f}$ in the precoder equation in Table maps to $\Sigma_{f=0}^{M-1} c_{l,i,f} b_f^H$ in Equation (2) as follows: $p_{l,0}^{(1)} \Sigma_{f=0}^{M-1} y_{t,l}^{(f)} p_{l,i,f}^{(2)} \varphi_{l,i,f} = \Sigma_{f=0}^{M-1} y_{t,l}^{(f)} p_{l,i,f}^{(1)} p_{l,i,f}^{(2)} \varphi_{l,i,f} = \Sigma_{f=0}^{M-1} c_{l,i,f} b_f^H$ = t-th entry of $\Sigma_{f=0}^{M-1} c_{l,i,f} b_f^H$, where $b_{t,f} = y_{t,l}^{(f)}$ = the t-th entry off-th FD basis vector $b_f$; and $c_{l,i,f} = p_{l,0}^{(1)} p_{l,i,f}^{(2)} \varphi_{l,i,f}$.

In embodiment AB, which is equivalent to example Alt 14-1-0 or example Alt 16-5 in this disclosure, the amplitude of the $K_{NZ}$ coefficients is quantized and reported as $p_{l,i,m}^{(1)}$ $p_{l,i,m}^{(2)}$, where $p_{l,i,m}^{(1)} = p_{l,r}^{(1)}$ is a reference or first amplitude value and $p_{l,i,m}^{(2)}$ is a differential or second amplitude value (as explained in Scheme 14 and 16). For each layer $l=1, 2, \ldots, v$, the strongest coefficient $c_{l,i^*_l,m^*_l}$ is reported in the UCI via the strongest coefficient indicator (SCI). In one example, SCI indicates an index $(i^*_l, m^*_l)$ of the strongest NZ coefficient which equals 1. Let $r^*$ be the antenna polarization of the strongest coefficient $c_{l,i^*_l,m^*_l}$, i.e., $$r^* = \left\lfloor \frac{i^*_l}{L} \right\rfloor$$

indicating that $r^*=0$ when $i^*_l \in \{0, 1, \ldots, L-1\}$ and $r^*=1$ when $i^*_l \in \{L, L+1, \ldots, 2L-1\}$. For a group of coefficients with polarization $r^*$, the strongest coefficient is a reference amplitude, i.e., $p_{l,i,m}^{(1)} = p_{l,r^*}^{(1)} = 1$, hence it need not be reported, and a differential amplitude $p_{l,i,m}^{(2)}$ is reported for each NZ coefficient that has the same antenna polarization $r^*$.

For the other polarization $$r = \left\lfloor \frac{2L-1-i^*_l}{L} \right\rfloor = (r^*+1) \bmod 2 \neq r^*:$$

a reference amplitude $$p_{l,i,m}^{(1)} = p_{l,r}^{(1)} = p_{l,\lfloor \frac{2L-1-i^*_l}{L} \rfloor}^{(1)} = p_{l,(r^*+1) \bmod 2}^{(1)}$$

is reported, which is common for all NZ coefficients $\{c_{l,i,m}\}$ that have the same antenna polarization r; and a differential amplitude $p_{l,i,m}^{(2)}$ is reported for each NZ coefficient that has the same antenna polarization r.

Since the location of the strongest coefficient is explicitly indicated via the SCI, there is no need for including the differential amplitude $p_{l,i^*,m^*}^{(2)}$ and phase $\phi_{l,i^*,m^*}$ (since the location is known and both values are 1). Therefore, for each layer, 1 reference amplitude, ($K_{NZ}-1$) differential amplitudes and ($K_{NZ}-1$) phase values are reported. For v layers, v reference amplitudes, ($K_{NZ}-v$) differential amplitudes and ($K_{NZ}-v$) phase values are reported. The quantization scheme can be explained in details as follows.

The amplitude coefficient indicators $i_{2,3,l}$ and $i_{2,4,l}$ for the reference and differential amplitudes, respectively, are:

$i_{2,3,l} = [k_{l,0}^{(1)} k_{l,1}^{(1)}]$ $i_{2,4,l} = [k_{l,0}^{(2)} \ldots k_{l,M-1}^{(2)}]$ $k_{l,m}^{(2)} = [k_{l,0,m}^{(2)} \ldots k_{l,2L-1,m}^{(2)}]$ $k_{l,r}^{(1)} \in \{1, \ldots, 15\}$ $k_{l,i,m}^{(2)} \in \{0, \ldots, 7\}$ for $l=1, \ldots, v$.

The phase coefficient indicator $i_{2,5,l}$ is:

$$i_{2,5,l} = [x_{l,0} \ldots x_{l,M-1}]$$

$$x_{l,n} = [x_{l,0,m} \ldots x_{l,M-1}]$$

$$x_{l,i,n} \in \{0, \ldots, 15\}$$

for $l=1, \ldots, v$.

Let $K_0 = \lceil \beta 2LM \rceil$. The bitmap associated with the coefficients in $i_{2,4,l}$ is indicated by $i_{1,7,l}$:

$$i_{1,7,l} = [k_{l,0}^{(3)} \ldots k_{l,M-1}^{(3)}]$$

$$k_{l,m}^{(3)} = [k_{l,0,m}^{(3)} \ldots k_{l,2L-1,m}^{(3)}]$$

$$k_{l,i,m}^{(3)} \in \{0,1\}$$

for $l=1, \ldots, v$, such that $K_l^{NZ} = \sum_{i=0}^{2L-1} \sum_{m=0}^{M-1} k_{l,i,m}^{(3)}$ ($l=1, \ldots, v$) $\leq K_0$ is the number of nonzero coefficients for layer l and $K^{NZ} = \sum_{l=1}^{v} K_l^{NZ} \leq 2K_0$ is the total number of nonzero coefficients.

The mapping from $k_{l,r}^{(1)}$ to the reference amplitude coefficient $p_{l,r}^{(1)}$ is given in Table A-1 and the mapping from $k_{l,i,m}^{(2)}$ to the differential amplitude coefficient $p_{l,i,m}^{(2)}$ is given in Table A-2. The reference and differential amplitude coefficients are represented by:

$$p_l^{(1)} = [p_{l,0}^{(1)} p_{l,1}^{(1)}]$$

$$p_l^{(2)} = [p_{l,0}^{(2)} \ldots p_{l,M-1}^{(2)}]$$

$$p_{l,m}^{(2)} = [p_{l,0,m}^{(2)} \ldots p_{l,2L-1,m}^{(2)}]$$

for $l=1, \ldots, v$. The mapping from $x_{l,i,m}$ to the phase coefficient $\varphi_{l,i,m}$ is given by $$\varphi_{l,i,m} = e^{j\frac{2\pi x_{l,i,m}}{16}}.$$

The amplitude and phase coefficient indicators are reported as follows. In one example, for the strongest coefficient $$c_{l,i_l^*,m_l^*}, k_{l,\lfloor \frac{i_l^*}{L} \rfloor}^{(1)} = 15, k_{l,i_l^*,m_l^*}^{(2)} = 7, k_{l,i_l^*,m_l^*}^{(3)} = 1 \text{ and } x_{l,i_l^*,m_l^*} = 0 (l=1, \ldots, v),$$

i.e., (reference and differential) amplitude and phase and the bit value (in the bitmap) for the strongest coefficient are set to 1. Hence, the indicators $$k_{l,\lfloor \frac{i_l^*}{L} \rfloor}^{(1)}, k_{l,i_l^*,m_l^*}^{(2)} \text{ and } x_{l,i_l^*,m_l^*}$$

are not reported for $l=1, \ldots, v$.

In another example, the indicator $$k_{l,\lfloor \frac{2L-1-i_l^*}{L} \rfloor}^{(1)}$$

is reported for $l=1, \ldots, v$, which indicates the reference amplitude for the other antenna polarization $$r = \left\lfloor \frac{2L-1-i_l^*}{L} \right\rfloor \neq r^*.$$

In yet another example, for the differential amplitude, the $K^{NZ}-v$ indicators $k_{l,i,m}^{(2)}$ for which $i \neq i_l^*, m \neq m_l^*$ (indicating a coefficient other than the strongest coefficient) and $k_{l,i,m}^{(3)} = 1$ (indicating that a coefficient is non-zero) are reported.

In yet another example, for the phase coefficient, the $K^{NZ}-v$ indicators $x_{l,i,m}$ for which $i \neq i_l^*, m \neq m_l^*$ (indicating a coefficient $C_{l,i,m}$ other than the strongest coefficient) and $k_{l,i,m}^{(3)} = 1$ (indicating that a coefficient $C_{l,i,m}$ is non-zero) are reported.

In one example $m_l^* = 0$.

TABLE A-1

Mapping of elements of $i_{2,3,l}$: $k_{l,r}^{(1)}$ to $p_{l,r}^{(1)}$

| $k_{l,r}^{(1)}$ | $p_{l,r}^{(1)}$ |
| --- | --- |
| 0 | — |
| 1 | $\frac{1}{\sqrt{128}}$ |
| 2 | $\sqrt[4]{\frac{1}{8192}}$ |
| 3 | $\frac{1}{8}$ |
| 4 | $\sqrt[4]{\frac{1}{2048}}$ |
| 5 | $\frac{1}{2\sqrt{8}}$ |
| 6 | $\sqrt[4]{\frac{1}{512}}$ |
| 7 | $\frac{1}{4}$ |
| 8 | $\sqrt[4]{\frac{1}{128}}$ |
| 9 | $\sqrt{\frac{1}{8}}$ |
| 10 | $\sqrt[4]{\frac{1}{32}}$ |
| 11 | $\frac{1}{2}$ |
| 12 | $\sqrt[4]{\frac{1}{8}}$ |
| 13 | $\frac{1}{\sqrt{2}}$ |

TABLE A-1-continued

Mapping of elements of $i_{2,3,l}$: $k_{l,r}^{(1)}$ to $p_{l,r}^{(1)}$

| $k_{l,r}^{(1)}$ | $p_{l,r}^{(1)}$ |
|---|---|
| 14 | $\sqrt[4]{\frac{1}{2}}$ |
| 15 | 1 |

TABLE A-2

Mapping of elements of $i_{2,4,l}$: $k_{l,i,m}^{(2)}$ to $p_{l,i,m}^{(2)}$

| $k_{l,i,m}^{(2)}$ | $p_{l,i,m}^{(2)}$ |
|---|---|
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one embodiment 0A, let $(N_{0,1}, \ldots, N_{0,2}, \ldots, N_{0,v})$ be number of non-zero (NZ) coefficients (each out of a maximum $K_0$ coefficients) reported by the UE for layers l=1, 2, ... v, where v indicates the maximum of rank values allowed (or configured via higher layer signaling, e.g. RI restriction) for CSI reporting, and $N_{0,1}$ indicates number of non-zero (NZ) coefficients for layer l.

The coefficients that are not reported are set to zero: when v=1, then the UE reports $N_{0,1}$ which indicates that the number of NZ coefficients for rank 1 CSI reporting; when v=2, then the UE reports $(N_{0,1}, N_{0,2})$ which indicates that the number of NZ coefficients for layer 1 and layer 2 of rank 2 CSI reporting; when v=3, then the UE reports $(N_{0,1}, N_{0,2}, N_{0,3})$ which indicates that the number of NZ coefficients for layers 1, ... 3 of rank 3 CSI reporting; and when v=4, then the UE reports $(N_{0,1}, N_{0,2}, N_{0,3}, N_{0,4})$ which indicates that the number of NZ coefficients for layers 1, ... , 4 of rank 4 CSI reporting.

In scheme 0A-0, the maximum number of NZ coefficients is fixed, i.e., $K_0=2LM$, and the number of candidate values for $N_{0,1}$ reporting depends on the value of L and M.

In one example 0A-0-0 of scheme 0A-0, when UE is configured with max rank=1 (v=1), at least one of the following alternatives is used to report $N_{0,1}$. In one alternative (Alt A), $N_{0,1}$ takes a value from $\{0, 1, \ldots, 2LM-1\}$, where the strongest coefficient (per layer) is included in $N_{0,1}$. In another alternative (Alt B), $N_{0,1}$ takes a value from $\{0, 1, \ldots, 2LM-2\}$, where since the strongest coefficient (indicated by $i_{1,3}$) can't be zero, it is excluded in reporting $N_{0,1}$ and hence the range of values for $N_{0,1}$ can be reduced by 1.

In example 0A-0-1 of scheme 0A-0, a UE is configured with max rank=2 (v=1 or 2), at least one of the following alternatives is used to report $(N_{0,1}, N_{0,2})$. In one alternative (Alt AA), $N_{0,1}$ and $N_{0,2}$ takes a value from $\{0, 1, \ldots, 2LM-1\}$, where the strongest coefficient (per layer) is included in $N_{0,1}$ and $N_{0,2}$. In another alternative (Alt BA), $N_{0,1}$ and $N_{0,2}$ takes a value from $\{0, 1, \ldots, 2LM-2\}$, where since the strongest coefficient (indicated by $i_{1,3}$) can't be zero, it is excluded in reporting $N_{0,1}$ and $N_{0,2}$ and hence the range of values for $N_{0,1}$ and $N_{0,2}$ can be reduced by 1.

In example 0A-0-2 of scheme 0-0, a UE is configured with max rank=R (v=1, ... R), at least one of the following alternatives is used to report $(N_{0,1}, \ldots, N_{0,R})$. In one alternative (Alt AA), $N_{0,1} \ldots N_{0,R}$ takes a value from $\{0, 1, \ldots, 2LM-1\}$, where the strongest coefficient (per layer) is included in $N_{0,1} \ldots N_{0,R}$. In another alternative (Alt BA), $N_{0,1} \ldots N_{0,R}$ takes a value from $\{0, 1, \ldots, 2LM-2\}$, where since the strongest coefficient (indicated by $i_{1,3}$) can't be zero, it is excluded in reporting $N_{0,1} \ldots N_{0,R}$ and hence the range of values for $N_{0,1} \ldots N_{0,R}$ can be reduced by 1. In one example, R=3 or 4.

In scheme 0A-1, the maximum number of NZ coefficients is fixed, i.e., $K_0<2LM$, and the number of candidate values for $N_{0,1}$ reporting depends on the value of $K_0$.

In one example 0A-1-1 of scheme 0A-1, when a UE is configured with max rank=1 (v=1), at least one of the following alternatives is used to report $N_{0,1}$. In one alternative (Alt AA), $N_{0,1}$ takes a value from $\{0, 1, \ldots, K_0-1\}$, where the strongest coefficient (per layer) is included in $N_{0,1}$. In another alternative (Alt BA), $N_{0,1}$ takes a value from $\{0, 1, \ldots, K_0-2\}$, where since the strongest coefficient (indicated by $i_{1,3}$) can't be zero, it is excluded in reporting $N_{0,1}$ and hence the range of values for $N_{0,1}$ can be reduced by 1.

In one example 0A-1-1 of scheme 0-1, a UE is configured with max rank=2 (v=1 or 2), at least one of the following alternatives is used to report $(N_{0,1}, N_{0,2})$. In one alternative (Alt AA), $N_{0,1}$ and $N_{0,2}$ takes a value from $\{0, 1, \ldots, K_0-1\}$, where the strongest coefficient (per layer) is included in $N_{0,1}$ and $N_{0,2}$. In another alternative (Alt BA), $N_{0,1}$ and $N_{0,2}$ takes a value from $\{0, 1, \ldots, K_0-2\}$, where since the strongest coefficient (indicated by $i_{1,3}$) can't be zero, it is excluded in reporting $N_{0,1}$ and $N_{0,2}$ and hence the range of values for $N_{0,1}$ and $N_{0,2}$ can be reduced by 1.

In one example 0A-1-1 of scheme 0A-1, a UE is configured with max rank=R (v=1, ... R), at least one of the following alternatives is used to report $(N_{0,1}, \ldots, N_{0,R})$. In one alternative (Alt AA), $N_{0,1} \ldots N_{0,R}$ takes a value from $\{0, 1, \ldots, K_0-1\}$, where the strongest coefficient (per layer) is included in $N_{0,1} \ldots N_{0,R}$. In another alternative (Alt BA), $N_{0,1} \ldots N_{0,R}$ takes a value from $\{0, 1, \ldots, K_0-2\}$, where since the strongest coefficient (indicated by $i_{1,3}$) can't be zero, it is excluded in reporting $N_{0,1} \ldots N_{0,R}$ and hence the range of values for $N_{0,1} \ldots N_{0,R}$ can be reduced by 1. In one example, R=3 or 4.

TABLE 5

The payload (a number of bits) to report $N_{0,l}$.

| Scheme 0A-0 | Indicator of the number of non-zero coefficients $N_{0,l}$ for layer l | Alt AA: $\lceil \log_2 (2LM) \rceil$; Alt BA: $\lceil \log_2 (2LM - 1) \rceil$ |
|---|---|---|
| Scheme 0A-1 | Indicator of the number of non-zero coefficients $N_{0,l}$ for layer l | Alt AA: $\lceil \log_2 (K_0) \rceil$; Alt BA: $\lceil \log_2 (K_0 - 1) \rceil$ |

In one variation of embodiment 0A, the maximum number of coefficients ($K_0$) is configured (e.g. via higher layer RRC signaling).

In one variation of embodiment 0A, a maximum number of coefficients ($K_0$) is used independently for each layer l.

In one variation of embodiment 0A, the number of NZ coefficients ($N_{0,l}$) is partitioned into two parts, a first part and a second part, where the indices of the first part of NZ coefficients are fixed (hence not reported), and the indices of the second part of NZ coefficients are dynamically selected by the UE (hence they are reported). Let $N_{0,l,1}$ and $N_{0,l,2}$ be the number of NZ coefficients comprising the first part and the second part, respectively. Then, they are determined according to at least one of the following alternatives.

In one example of Alt 1, $N_{0,l,1}$ is fixed, and $N_{0,l,2}=N_{0,l}-N_{0,l,1}$, where either $N_{0,l}$ or $N_{0,l,2}$ needs to be reported.

In one example of Alt 2, $N_{0,l,1}$ is configured, and $N_{0,l,2}=N_{0,l}-N_{0,l,1}$ where either $N_{0,l}$ or $N_{0,l,2}$ needs to be reported.

In one example of Alt 3, $N_{0,l,1}$ is reported by the UE, and $N_{0,l,2}=N_{0,l}-N_{0,l,1}$, where either $N_{0,l}$ or $N_{0,l,2}$ needs to be reported.

Figure 16:
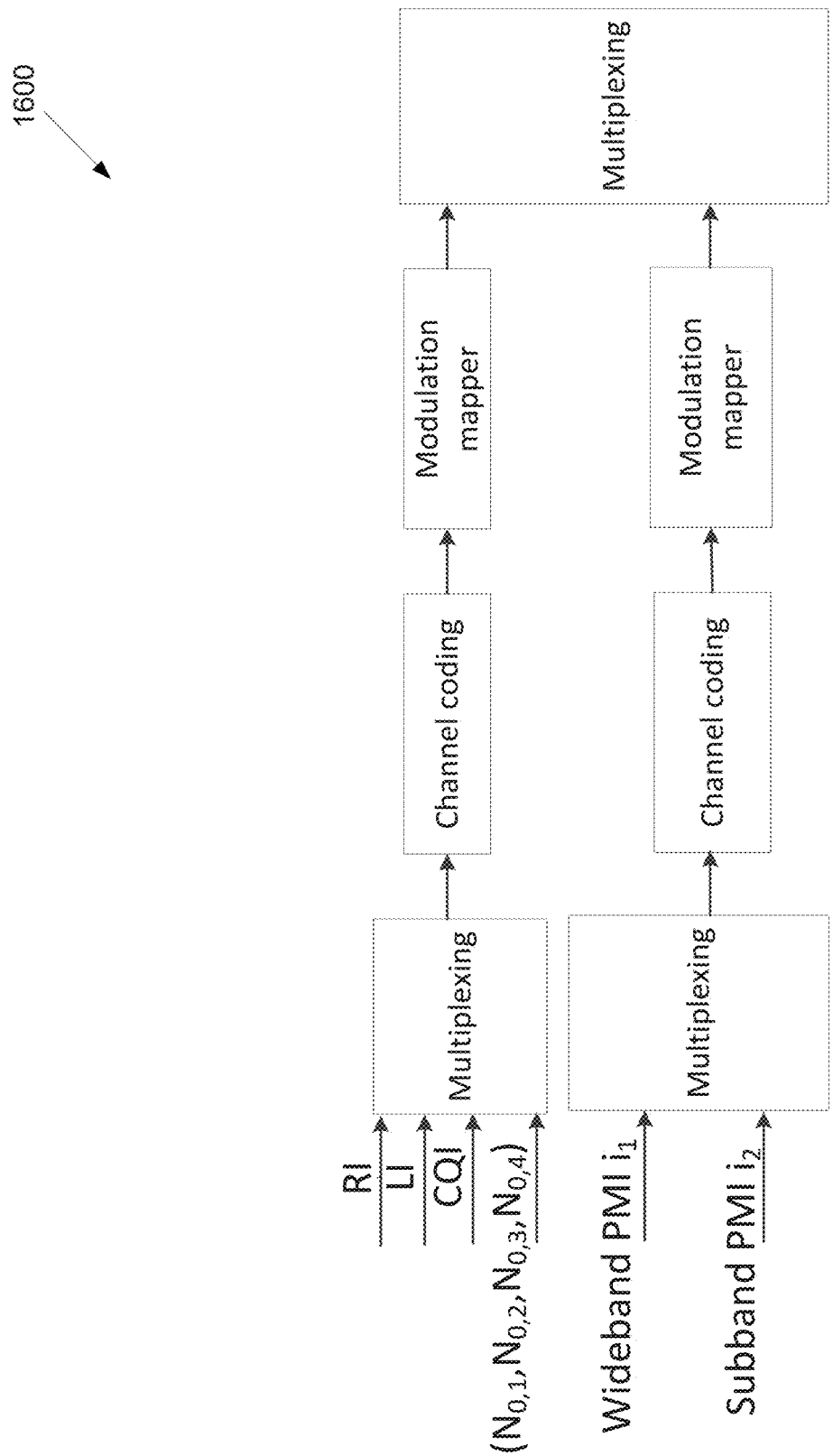
FIG. 16 illustrates another example two-part UCI multiplexing according to embodiments of the present disclosure.

FIG. 16 illustrates another example two-part UCI multiplexing 1600 according to embodiments of the present disclosure. The embodiment of the two-part UCI multiplexing 1600 illustrated in FIG. 16 is for illustration only. FIG. 16 does not limit the scope of the present disclosure to any particular implementation.

In one embodiment 2A, as shown in FIG. 15 for v=2 and in FIG. 16 for v=4, two-part UCI multiplexing is used wherein: CQI, RI, LI, and ($N_{0,1}, \ldots, N_{0,v}$) are multiplexed and encoded together in UCI part 1; and remaining CSI are multiplexed and encoded together in UCI part 2, where the remaining CSI includes the first PMI $i_1$ and the second PMI (i2).

The part 1 UCI may also include CRI if the UE is configured with more than one CSI-RS resources. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

Based on the value of the reported ($N_{0,1}, \ldots, N_{0,v}$) in part 1, the CSI reporting payload (bits) for part 2 is determined. In particular, the components of the second PMI $i_2$ are reported only for the coefficients that are non-zero.

In one example, for v=2, the first PMI $i_1=[i_{1,1}, i_{1,2}, i_{1,3}, i_{1,4}]$ comprises two layer-common (i.e., reported common for two layers if a UE reports RI=2) components: orthogonal basis set for $W_1$ and $W_f$ (which for example, can be indicated using index i1,1 indicating the rotation factors ($q_1, q_2, q_3$)), $q_i \in \{0, 1, \ldots, O_i-1\}$; and L beam selection for $W_1$ and M beam selection for $W_f$ (which for example, can be indicated using index $i_{1,2}$), and two layer-specific (i.e., reported for each of the two layers if UE reports RI=2) components: strongest coefficient (indicated using index $i_{1,3}$); and indices of $N_{0,k}$ NZ coefficients (indicated using index $i_{1,4}$).

The indices of NZ coefficients are reported either explicitly using a bitmap of length 2LM or a combinatorial index $$\left\lceil \log_2 \binom{2LM}{N_{0,l}} \right\rceil$$

or is derived implicitly, for example, based on amplitude or power of beams comprising $W_1$ or/and $W_f$.

The indices $i_{1,3}$ and $i_{1,4}$ can be expressed further as $$i_{1,3} = \begin{cases} [i_{1,3,1}] & RI = 1 \\ [i_{1,3,1} \quad i_{1,3,2}] & RI = 2 \end{cases} \text{ and}$$

$$i_{1,4} = \begin{cases} [i_{1,4,1}] & RI = 1 \\ [i_{1,4,1} \quad i_{1,4,2}] & RI = 2 \end{cases}.$$

The second PMI $i_2=[i_{2,1}, i_{2,2}]$ comprises two layer-specific components: phase $c_{l,i,m}$ indicated using index $i_{2,1}$ and amplitude $p_{l,i}^{(2)}$ indicated using index $i_{2,2}$, which can expressed as $$i_{2,1} = \begin{cases} [i_{2,1,1}] & RI = 1 \\ [i_{2,1,1} \quad i_{2,1,2}] & RI = 2 \end{cases} \text{ and}$$

$$i_{2,2} = \begin{cases} [i_{2,2,1}] & RI = 1 \\ [i_{2,2,1} \quad i_{2,2,2}] & RI = 2 \end{cases}.$$

Note that $i_{1,3,2}$ $i_{1,4,2}$, $i_{2,1,2}$, and $i_{2,1,2}$ are reported only when RI=2 is reported. The first PMI is reported in a wideband (WB) manner and the second PMI can be reported in a wideband or subband (SB) manner.

Any of the above variation embodiments can be utilized independently or in combination with at least one other variation embodiment.

Figure 17:
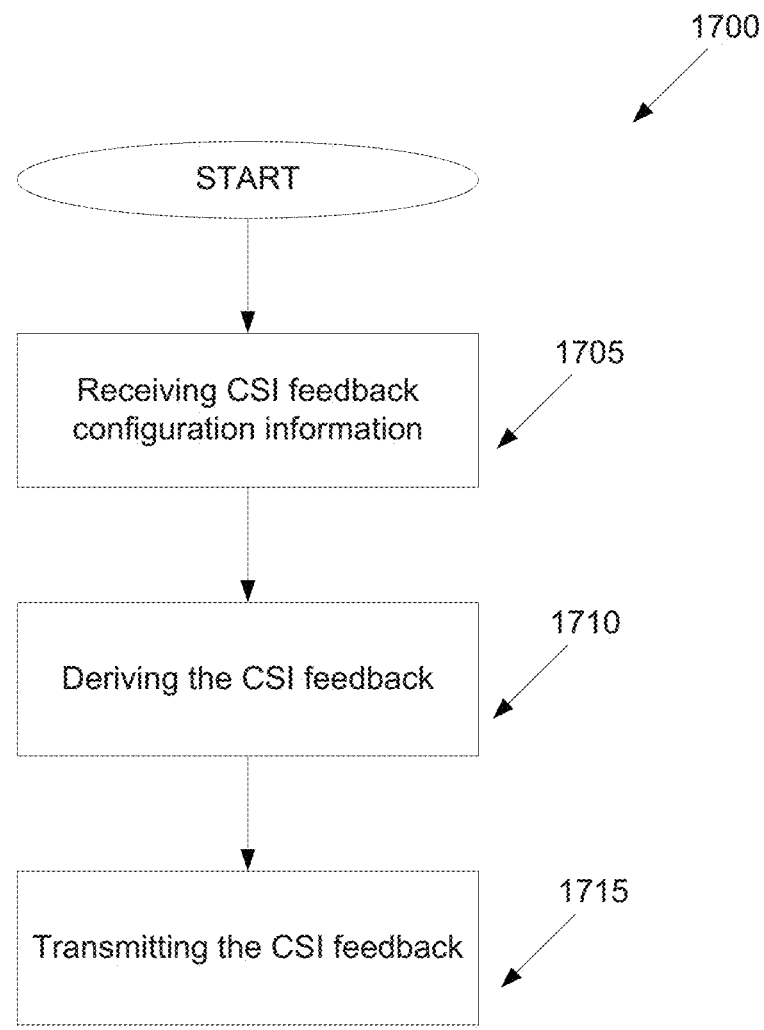
FIG. 17 illustrates a flowchart of a method for CSI reporting according to embodiments of the present disclosure.

FIG. 17 illustrates a flowchart of a method 1700 for CSI reporting according to embodiments of the present disclosure, as may be performed by a user equipment (e.g., 111-116 as illustrated in FIG. 1). The embodiment of the method 1700 illustrated in FIG. 17 is for illustration only. FIG. 17 does not limit the scope of the present disclosure to any particular implementation.

As illustrated in FIG. 17, the method 1700 begins at step 1705. In step 1705, a UE receives, from a base station (BS), CSI feedback configuration information.

Next, in step 1710, the UE derives, based on the CSI feedback configuration information, the CSI feedback including a precoding matrix indicator (PMI).

Finally, in step 1715, the UE transmits, to the BS via an uplink channel, the CSI feedback including the PMI.

In one embodiment, for each layer l=1, 2, ..., v, the PMI indicates $K_{NZ,l}$ non-zero (NZ) coefficients out of a total of $2LM_v$ coefficients, each of which is represented as $c_{l,i,m} = p_{l,i,m}^{(1)} p_{l,i,m}^{(2)} \phi_{l,i,m}$, the $K_{NZ,l}$ NZ coefficients are partitioned into two groups ($G_0$ and $G_1$), and for each group $G_r$, $r \in \{0,1\}$, one $p_{l,i,m}^{(1)}$ value is indicated, where v is a rank value, $p_{l,i,m}^{(1)}$ is a first amplitude coefficient, $p_{l,i,m}^{(2)}$ is a second amplitude coefficient, and $\phi_{l,i,m}$ is a phase coefficient.

In one embodiment, the total of $2LM_v$ coefficients forms a 2L×M coefficient matrix $C_l$ comprising 2L rows and $M_v$ columns; the group $G_0$ comprises all coefficients $c_{l,i,m}$ with an index $i \in \{0, 1, \ldots, L-1\}$; the group $G_1$ comprises all coefficients with an index $i \in \{L, L+1, \ldots, 2L-1\}$; and the one $p_{l,i,m}^{(1)}$ value indicated for the group $G_r$ is given by $p_{l,i,m}^{(1)} = p_{l,r}^{(1)}$, where $$r = \left\lfloor \frac{i}{L} \right\rfloor.$$

In one embodiment, the PMI includes amplitude coefficient indicators $i_{2,3,l}$ and $i_{2,4,l}$ for first amplitude coefficients and second amplitude coefficients, respectively, given by:

$$i_{2,3,l}=[k_{l,0}^{(1)}k_{l,1}^{(1)}],$$

$$i_{2,4,l}=[k_{l,0}^{(2)} \ldots k_{l,M-1}^{(2)}],$$

$$k_{l,m}^{(2)}=[k_{l,0,m}^{(2)} \ldots k_{l,2L-1,m}^{(2)}],$$

$$k_{l,r}^{(1)} \in \{1, \ldots, 15\}, \text{ and}$$

$$k_{l,i,m}^{(2)} \in \{0, \ldots, 7\},$$

where the first amplitude coefficients and the second amplitude coefficients are represented by:

$$p_l^{(1)}=[p_{l,0}^{(1)}p_{l,1}^{(1)}],$$

$$p_l^{(2)}=[p_{l,0}^{(2)} \ldots p_{l,M-1}^{(2)}], \text{ and}$$

$$p_{l,m}^{(2)}=[p_{l,0,m}^{(2)} \ldots p_{l,2L-1,m}^{(2)}],$$

a mapping from $k_{l,r}^{(1)}$ to the first amplitude coefficient $p_{l,r}^{(1)}$ is given by:

| $k_{l,r}^{(1)}$ | $p_{l,r}^{(1)}$ |
|---|---|
| 0 | Reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 | and a mapping from $k_{l,i,m}^{(2)}$ to the second amplitude coefficient $p_{l,i,m}^{(2)}$ is given by:

| $k_{l,i,m}^{(2)}$ | $p_{l,i,m}^{(2)}$ |
|---|---|
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one embodiment, for each layer $l=1, \ldots, v$: the UE determines a strongest coefficient indicator $i_{1,8,l}$ indicating an index $(i^*_l, m^*_l)$ that jointly indicates: a location of a strongest coefficient $c_{l,i^*_l,m^*_l}=1$, and a first amplitude coefficient indicator $k_{l,r^*}^{(1)}$ indicating $p_{l,r^*}^{(1)}=1$ for the group $G_{r^*}$ to which the strongest coefficient belongs, where $$r^* = \left\lfloor \frac{i_l^*}{L} \right\rfloor.$$

In such embodiment, the UE transmits, to the BS, the CSI feedback including the PMI that includes the determined strongest coefficient indicator $i_{1,8,l}$.

In one embodiment, for each layer $l=1, \ldots, v$: the UE determines another group $G_r$, where $r \neq r^*$ and determines a first amplitude coefficient indicator $k_{l,r}^{(1)}$ indicating $p_{l,r}^{(1)}$ for the other group $G_r$.

In such embodiment, the UE transmits, to the BS, the CSI feedback including the PMI that includes $i_{2,3,l}$ indicating the first amplitude coefficient indicator for the other group.

In one embodiment, the UE transmits, using the CSI feedback, the PMI including, for each layer $l=1, \ldots, v$: one indicator for the first amplitude coefficient associated with the other group $G_r$; $K_{NZ,l}-1$ indicators for the second amplitude coefficients; and $K_{NZ,l}-1$ indicators for phase coefficients, where for remaining $2LM_v-K_{NZ,l}$ coefficients, the second amplitude coefficients and the phase coefficients are set to $p_{l,i,m}^{(2)}=\phi_{l,i,m}=0$.

In such embodiment, the PMI further includes indicators for a spatial domain (SD) basis matrix A and a frequency domain (FD) basis matrix $B_l$ for each layer l=1, . . . , v.

In such embodiment, a precoding matrix for each FD unit of a total number ($N_3$) of FD units is determined by columns of $$W = \frac{1}{\sqrt{v}}[W^1 \quad W^2 \quad \ldots \quad W^v],$$

where $$W^l = \begin{bmatrix} A & 0 \\ 0 & A \end{bmatrix}$$

$$C_l B_l^H = \begin{bmatrix} \sum_{i=0}^{L-1} a_i \sum_{m=0}^{M_v-1} c_{l,i,m}(b_{l,m}^H) \\ \sum_{i=0}^{L-1} a_i \sum_{m=0}^{M_v-1} c_{l,i+L,m}(b_{l,m}^H) \end{bmatrix} =$$

$$\begin{bmatrix} \sum_{i=0}^{L-1} a_i p_{l,0}^{(1)} \sum_{m=0}^{M_v-1} p_{l,i,m}^{(2)} \varphi_{l,i,m}(b_{l,m}^H) \\ \sum_{i=0}^{L-1} a_i p_{l,1}^{(1)} \sum_{m=0}^{M_v-1} p_{l,i+L,m}^{(2)} \varphi_{l,i+L,m}(b_{l,m}^H) \end{bmatrix}$$

is a pre-coding matrix for layer l, whose t-th column is a pre-coding matrix for FD unit t and is given by $$W_t^l = \frac{1}{\sqrt{N_1 N_2 \gamma_{t,l}}} \begin{bmatrix} \sum_{i=0}^{L-1} a_i p_{l,0}^{(1)} \sum_{m=0}^{M_v-1} y_{t,l}^{(m)} p_{l,i,m}^{(2)} \varphi_{l,i,m} \\ \sum_{i=0}^{L-1} a_i p_{l,1}^{(1)} \sum_{m=0}^{M_v-1} y_{t,l}^{(m)} p_{l,i+L,m}^{(2)} \varphi_{l,i+L,m} \end{bmatrix}.$$

where $$\gamma_{t,l} = \sum_{i=0}^{2L-1} \left(p_{l,\lfloor \frac{i}{L} \rfloor}^{(1)}\right)^2 \left| \sum_{m=0}^{M-1} y_{t,l}^{(m)} p_{l,i,m}^{(2)} \varphi_{l,i,m} \right|^2$$

normalizes t-th column to norm one;

$$A = [a_0 \quad a_1 \quad \ldots \quad a_{L-1}], a_i = v_{m_1^{(i)}, m_2^{(i)}}$$

is a $N_1 N_2 \times 1$ column vector for SD antenna ports where $N_1$ and $N_2$ are number of antenna ports, respectively, with a same antenna polarization in a first and a second dimensions of a two-dimensional dual-polarized channel state information-reference signal (CSI-RS) antenna ports at the BS; $B_l = [b_{l,0} \, b_{l,1} \, \ldots \, b_{l,M_v-1}]$ is a $N_3 \times 1$ column vector for FD units, and $y_{t,l}^{(m)}$=the t-th entry of m-th FD basis vector $b_{l,m}$; and a number (L) of column vectors for the SD antenna ports, a number ($M_v$) of column vectors for the FD units, and the total number ($N_3$) of the FD units are configured via higher layer signaling.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a terminal in a communication system, the method comprising;
   receiving, from a base station, codebook configuration information for reporting of information associated with a precoding matrix indicator (PMI);
   identifying first amplitude coefficients $p_l^{(1)}$ and second amplitude coefficients $p_{l,i,m}^{(2)}$ based on the codebook configuration information; and
   transmitting, to the base station, the information associated with the PMI for indicating the first amplitude coefficients $p_l^{(1)}$ and second amplitude coefficients $p_{l,i,m}^{(2)}$,
   wherein, for each layer l=1, 2, . . . , v, each of two first amplitude coefficients $p_l^{(1)}$ corresponds to each of a first group of coefficients and a second group of coefficients, and
   wherein the first group of coefficients includes a first subset of the second amplitude coefficients $p_{l,i,m}^{(2)}$ with an index i=0, 1, . . . , L−1, and the second group of coefficients includes a second subset of the second amplitude coefficients $p_{l,i,m}^{(2)}$ with an index i=L, L+1, . . . , 2L−1.

2. The method of claim 1, wherein, for each layer l=1, 2, . . . , v, one of the two first amplitude coefficients $p_l^{(1)}$ corresponding to a group including a strongest coefficient among the second amplitude coefficients $p_{l,i,m}^{(2)}$ equals to 1 and is not reported.

3. The method of claim 2, wherein, for each layer l=1, 2, . . . , v,
   a remaining first amplitude coefficient $p_l^{(1)}$ is reported using an indicator with 4 bits, and
   $K^{NZ}$−1 second amplitude coefficients $p_{l,i,m}^{(2)}$ are reported using indicators each with 3 bits, where $K^{NZ}$ is a number of non-zero second amplitude coefficients.

4. The method of claim 3, wherein,
   the indicator with 4 bits indicates one of $$\left\{ R, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1 \right\},$$

where R denotes a reserved state, and
   the indicators each with 3 bits indicate one of $$\left\{ \left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1 \right\}.$$

5. The method of claim 1, wherein the information associated with the PMI further indicates phase coefficients $\phi_{l,i,m}$, and
   wherein the first group of coefficients further includes a first subset of the phase coefficients $\phi_{l,i,m}$ with an index i=0, 1, . . . , L−1, and the second group of coefficients further includes a second subset of the phase coefficients $\phi_{l,i,m}$ with an index i=L, L+1, . . . , 2L−1.

6. A method performed by a base station in a communication system, the method comprising:
- transmitting, to a terminal, codebook configuration information for reporting of information associated with a precoding matrix indicator (PMI); and
- receiving, from the terminal, the information associated with the PMI for indicating a first amplitude coefficients $p_l^{(1)}$ and second amplitude coefficients $p_{l,i,m}^{(2)}$ identified based on the codebook configuration information,
- wherein, for each layer $l=1, 2, \ldots, v$, each of two first amplitude coefficients $p_l^{(1)}$ corresponds to each of a first group of coefficients and a second group of coefficients, and
- wherein a first group of coefficients includes a first subset of the second amplitude coefficients $p_{l,i,m}^{(2)}$ with an index $i=0, 1, \ldots, L-1$, and a second group of coefficients includes a second subset of the second amplitude coefficients $p_{l,i,m}^{(2)}$ with an index $i=L, L+1, \ldots, 2L-1$.

7. The method of claim 6, wherein, for each layer $l=1, 2, \ldots, v$, one of the two first amplitude coefficients $p_l^{(1)}$ corresponding to a group including a strongest coefficient among the second amplitude coefficients $p_{l,i,m}^{(2)}$ equals to 1 and is not reported.

8. The method of claim 7, wherein, for each layer $l=1, 2, \ldots, v$,
- a remaining first amplitude coefficient $p_l^{(1)}$ is reported using an indicator with 4 bits, and
- $K^{NZ}-1$ second amplitude coefficients are reported using indicators each with 3 bits, where $K^{NZ}$ is a number of non-zero second amplitude coefficients.

9. The method of claim 8, wherein,
the indicator with 4 bits indicates one of $$\left\{R, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\},$$

where R denotes a reserved state, and
the indicators each with 3 bits indicate one of $$\left\{\left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\}.$$

10. The method of claim 6, wherein the information associated with the PMI further indicates phase coefficients $\phi_{l,i,m}$, and
- wherein the first group of coefficients further includes a first subset of the phase coefficients $\phi_{l,i,m}$ with an index $i=0, 1, \ldots, L-1$, and the second group of coefficients further includes a second subset of the phase coefficients $\phi_{l,i,m}$ with an index $i=L, L+1, \ldots, 2L-1$.

11. A terminal in a communication system, the terminal comprising:
- a transceiver; and
- a controller configured to:
  - receive, from a base station, codebook configuration information for reporting of information associated with a precoding matrix indicator (PMI),
  - identify first amplitude coefficients $p_l^{(1)}$ and second amplitude coefficients $p_{l,i,m}^{(2)}$ based on the codebook configuration information,
  - transmit, to the base station, the information associated with the PMI for indicating) the first amplitude coefficients $p_l^{(1)}$ and second amplitude coefficients $p_{l,i,m}^{(2)}$,
- wherein, for each layer $l=1, 2, \ldots, v$, each of two first amplitude coefficients $p_l^{(1)}$ corresponds to each of a first group of coefficients and a second group of coefficients, and
- wherein the first group of coefficients includes a first subset of the second amplitude coefficients $p_{l,i,m}^{(2)}$ with an index $i=0, 1, \ldots, L-1$, and the second group of coefficients includes a second subset of the second amplitude coefficients $p_{l,i,m}^{(2)}$ with an index $i=L, L+1, \ldots, 2L-1$.

12. The terminal of claim 11, wherein, for each layer $l=1, 2, \ldots, v$, one of the two first amplitude coefficients $p_l^{(1)}$ corresponding to a group including a strongest coefficient among the second amplitude coefficients $p_{l,i,m}^{(2)}$ equals to 1 and is not reported.

13. The terminal of claim 12, wherein, for each layer $l=1, 2, \ldots, v$,
- a remaining first amplitude coefficient $p_l^{(1)}$ is reported using an indicator with 4 bits, and
- $K^{NZ}-1$ second amplitude coefficients $p_{l,i,m}^{(2)}$ are reported using indicators each with 3 bits, where $K^{NZ}$ is a number of non-zero second amplitude coefficients.

14. The terminal of claim 13, wherein,
the indicator with 4 bits indicates one of $$\left\{R, \left(\frac{1}{2^{14}}\right)^{\frac{1}{4}}, \ldots, \left(\frac{1}{8}\right)^{\frac{1}{4}}, \left(\frac{1}{4}\right)^{\frac{1}{4}}, \left(\frac{1}{2}\right)^{\frac{1}{4}}, 1\right\},$$

where R denotes a reserved state, and
the indicators each with 3 bits indicate one of $$\left\{\left(\frac{1}{128}\right)^{\frac{1}{2}}, \left(\frac{1}{64}\right)^{\frac{1}{2}}, \ldots, \left(\frac{1}{8}\right)^{\frac{1}{2}}, \left(\frac{1}{4}\right)^{\frac{1}{2}}, \left(\frac{1}{2}\right)^{\frac{1}{2}}, 1\right\}.$$

15. A base station in a communication system, the base station comprising:
- a transceiver; and
- a controller configured to:
  - transmit, to a terminal, codebook configuration information for reporting of information associated with a precoding matrix indicator (PMI),
  - receive, from the terminal, the information associated with the PMI for indicating a first amplitude coefficients $p_l^{(1)}$ and second amplitude coefficients $p_{l,i,m}^{(2)}$ identified based on the codebook configuration information,
- wherein, for each layer $l=1, 2, \ldots, v$, each of two first amplitude coefficients $p_l^{(1)}$ corresponds to each of a first group of coefficients and a second group of coefficients, and
- wherein a first group of coefficients includes a first subset of the second amplitude coefficients $p_{l,i,m}^{(2)}$ with an index $i=0, 1, \ldots, L-1$, and a second group of coefficients includes a second subset of the second amplitude coefficients $p_{l,i,m}^{(2)}$ with an index $i=L, L+1, \ldots, 2L-1$.

* * * * *